US005709607A

United States Patent [19]
Mowers et al.

[11] Patent Number: 5,709,607
[45] Date of Patent: Jan. 20, 1998

[54] AUTOMATIC BOWLING CENTER SYSTEM

[75] Inventors: David L. Mowers, Muskegon, Mich.;
David J. Mueller, Naperville, Ill.;
Gerald Apffel Pierce, Redwood City;
David C. Wyland, San Jose, both of Calif.

[73] Assignee: Brunswick Bowling & Billiards Corp., Muskegon, Mich.

[21] Appl. No.: 449,498

[22] Filed: May 24, 1995

Related U.S. Application Data

[63] Continuation of Ser. No. 177,610, Jan. 5, 1994, Pat. No. 5,446,894, which is a continuation of Ser. No. 962,492, Nov. 23, 1993, Pat. No. 5,450,318, which is a continuation of Ser. No. 724,793, Jul. 2, 1991, Pat. No. 5,255,185, which is a division of Ser. No. 182,977, Apr. 18, 1988, Pat. No. 5,101,354.

[51] Int. Cl.$^6$ ........................................................ A63D 5/04
[52] U.S. Cl. ........................................ 473/58; 473/55; 473/70
[58] Field of Search ............................... 473/54, 55, 58, 473/64, 65, 67, 69, 70, 71; 364/410, 411; 340/323 R, 323 B; 273/DIG. 28, DIG. 26

[56] References Cited

U.S. PATENT DOCUMENTS

| Re. 28,503 | 8/1975 | Townsend et al. | 473/70 |
|---|---|---|---|
| 2,949,300 | 8/1960 | Huck et al. | |
| 3,219,345 | 11/1965 | Rogers | 473/57 |
| 3,314,678 | 4/1967 | Conklin et al. | 473/57 |
| 3,582,071 | 6/1971 | Grosvenor et al. | 473/70 |
| 3,715,480 | 2/1973 | Levine | 348/29 |
| 3,841,633 | 10/1974 | Walsh et al. | 473/58 |
| 4,005,261 | 1/1977 | Sato et al. | 473/58 |
| 4,025,718 | 5/1977 | Paretti | 358/448 |
| 4,092,727 | 5/1978 | Warner | 473/70 |
| 4,131,948 | 12/1978 | Kaenel | 473/70 |
| 4,168,510 | 9/1979 | Kaiser | 348/579 |
| 4,179,704 | 12/1979 | Moore et al. | 348/579 |
| 4,214,263 | 7/1980 | Kaiser | 348/579 |
| 4,218,703 | 8/1980 | Netravali et al. | 348/416 |
| 4,220,967 | 9/1980 | Ichida et al. | 348/169 |
| 4,225,924 | 9/1980 | Trujillo | 364/411 |
| 4,247,100 | 1/1981 | Barbee | 473/58 |

(List continued on next page.)

OTHER PUBLICATIONS

"First Stage Market Test of Brunwick's New Bowling System," Apr. 1986.

*Primary Examiner*—Jessica Harrison
*Assistant Examiner*—Mark A. Sager
*Attorney, Agent, or Firm*—Price, Heneveld, Cooper, DeWitt & Litton

[57] ABSTRACT

A bowling center system includes a plurality of lane pair control systems each including a pinsetting device for each lane, a pinsetter control unit, a game control unit, a bowler input station and a pair of overhead display monitors. The game control unit is operable under the control of a game control program stored in a memory for automatically operating the pinsetter control units during game play to selectively set a sequence of pin patterns on the lane, which patterns may comprise any array of pins. The game control unit responsive to pin fall data received from the gamesetter generates scoring information which is displayed using video graphic displays on the overhead monitors. The game control program can be any one of a plurality of different game programs which may be downloaded to the memory from a memory associated with the manager's control terminal. According to the particular game program, the number of bowling frames the game may vary as well as the number of balls and pins utilized in each frame. The manager's control system provides accounting control over the bowling center system and is operable to override operation of a selected game control unit as necessary. A plurality of remote terminals are provided associated with selected ones of said lane pair control systems. Each remote terminal system includes a keyboard and a display monitor. The remote terminal operates under the control of the game control unit to allow a user thereof to enter requests for video displays. The video displays include, for example, ball trajectory displays which illustrate the path of the ball on the bowling lane, or dynamic displays, such as for training, generated by video source devices associated with the manager's control system.

9 Claims, 40 Drawing Sheets

U.S. PATENT DOCUMENTS

| | | | |
|---|---|---|---|
| 4,270,143 | 5/1981 | Morris | 348/169 |
| 4,302,010 | 11/1981 | Kaenel | 473/70 |
| 4,339,128 | 7/1982 | Multner | 473/58 |
| 4,607,843 | 8/1986 | Signoretti | 473/58 |
| 4,626,891 | 12/1986 | Achiha | 348/702 |
| 4,630,114 | 12/1986 | Bergmann et al. | 348/415 |
| 4,661,846 | 4/1987 | Kondo | 348/669 |
| 4,736,318 | 4/1988 | Delyani et al. | 364/DIG. 1 |
| 4,887,813 | 12/1989 | Chiles, III et al. | 473/70 |
| 4,893,182 | 1/1990 | Gautraud et al. | 473/58 |
| 4,908,750 | 3/1990 | Jablow | 364/DIG. 1 |
| 4,954,948 | 9/1990 | Hira et al. | 364/DIG. 1 |
| 5,118,105 | 6/1992 | Brim et al. | 473/58 |

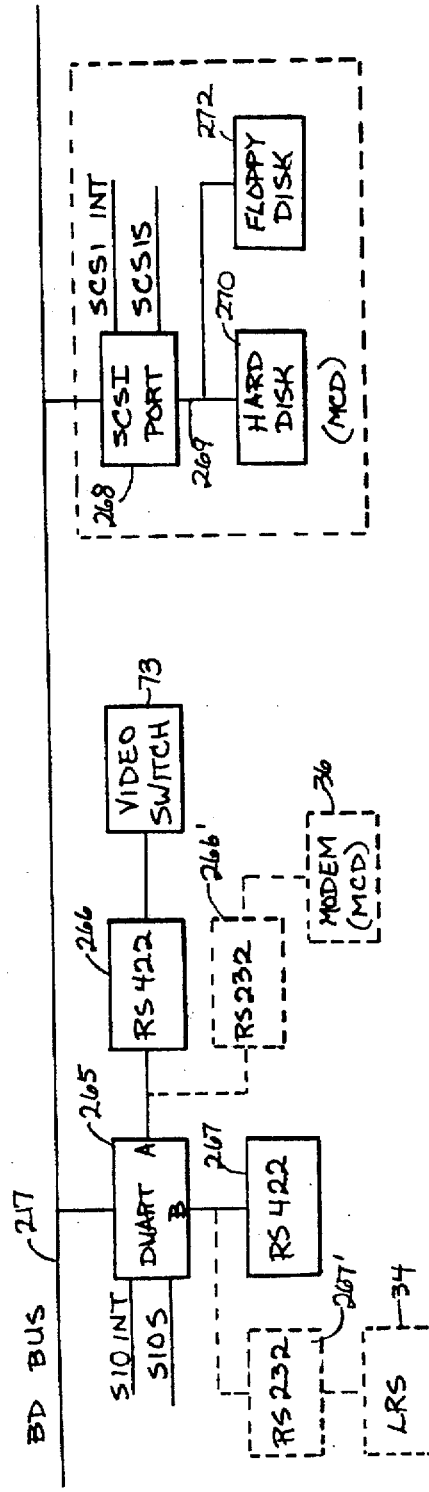
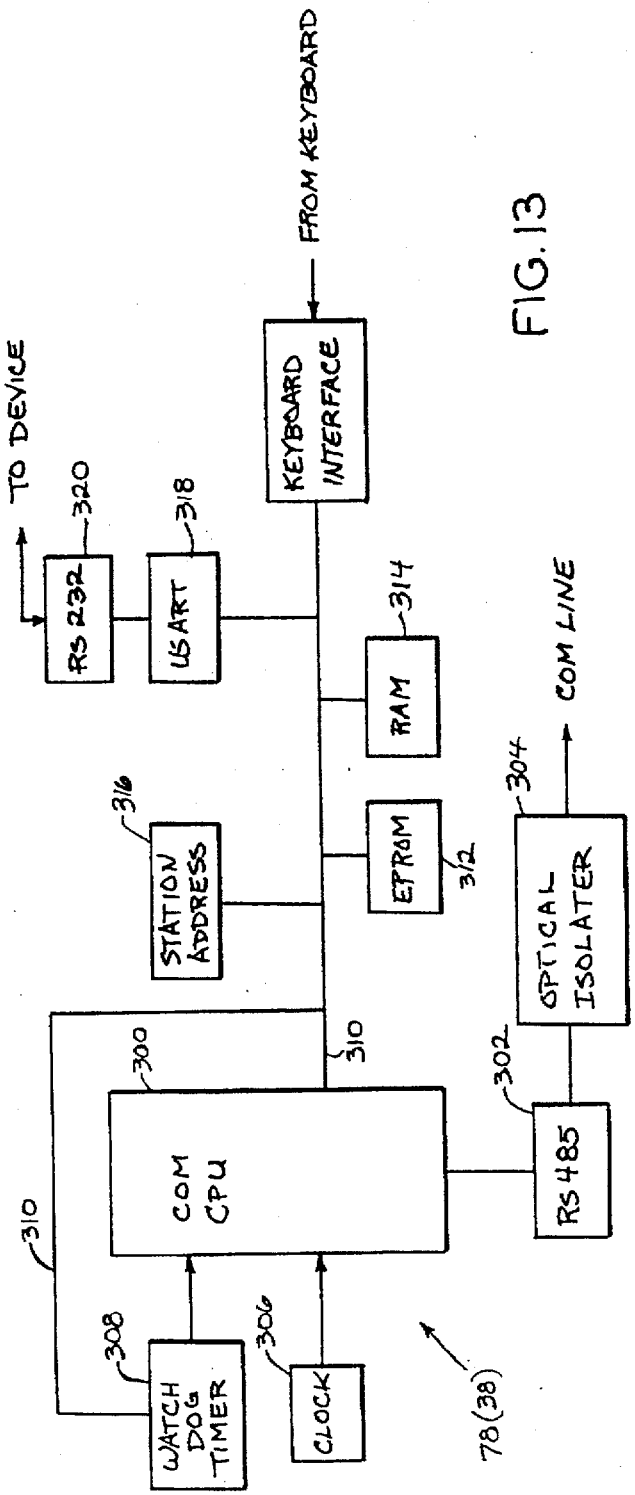
FIG.12D
FIG.13

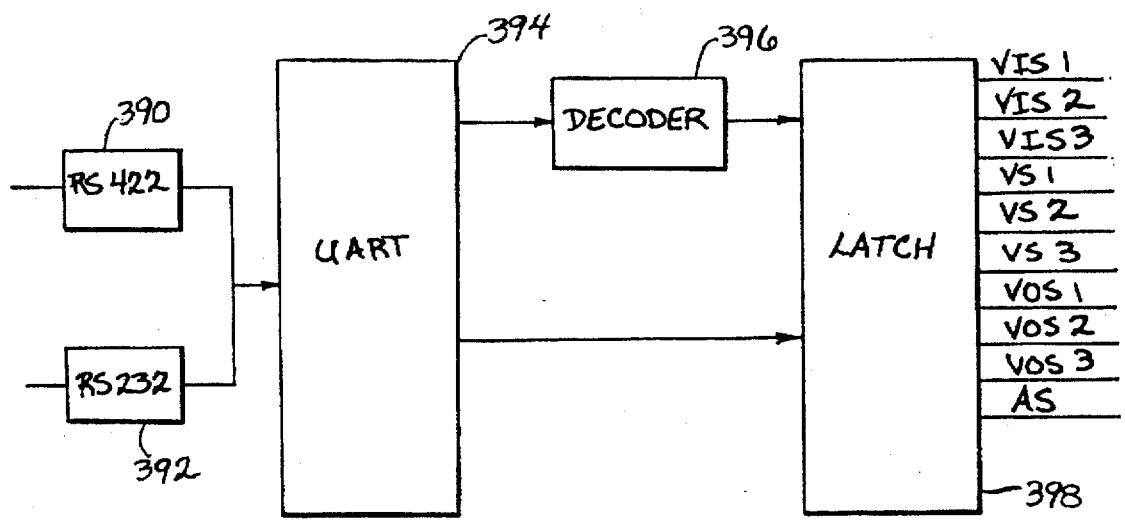
FIG. 19
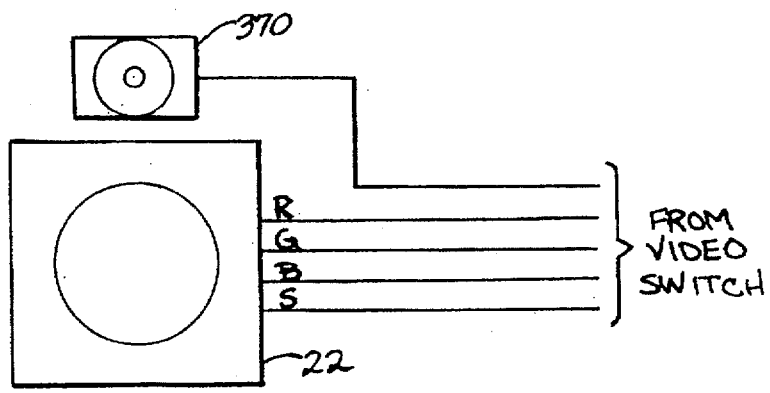
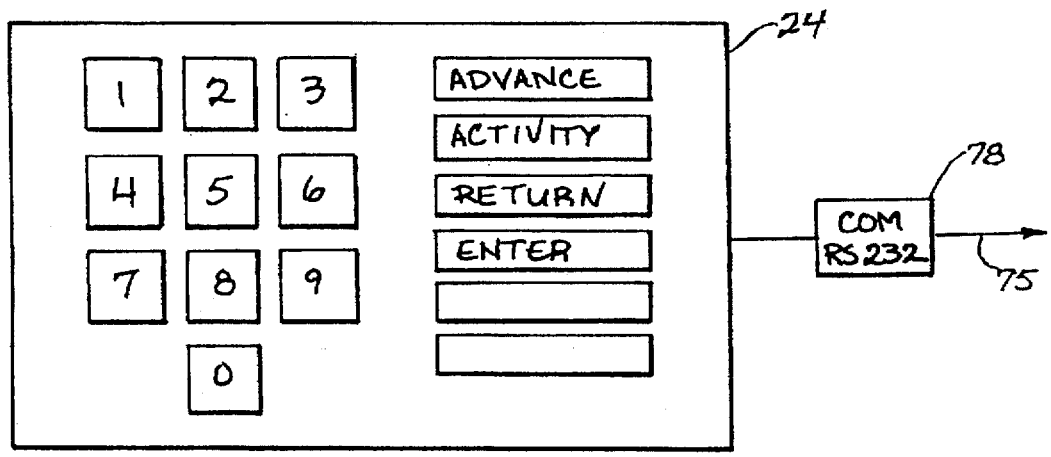
FIG. 20

| FLAG | ADDRESS | CONTROL | INFORMATION | FCS | FLAG |
|------|---------|---------|-------------|-----|------|
| 1 | 1 | 1 | N | 2 | 1 |

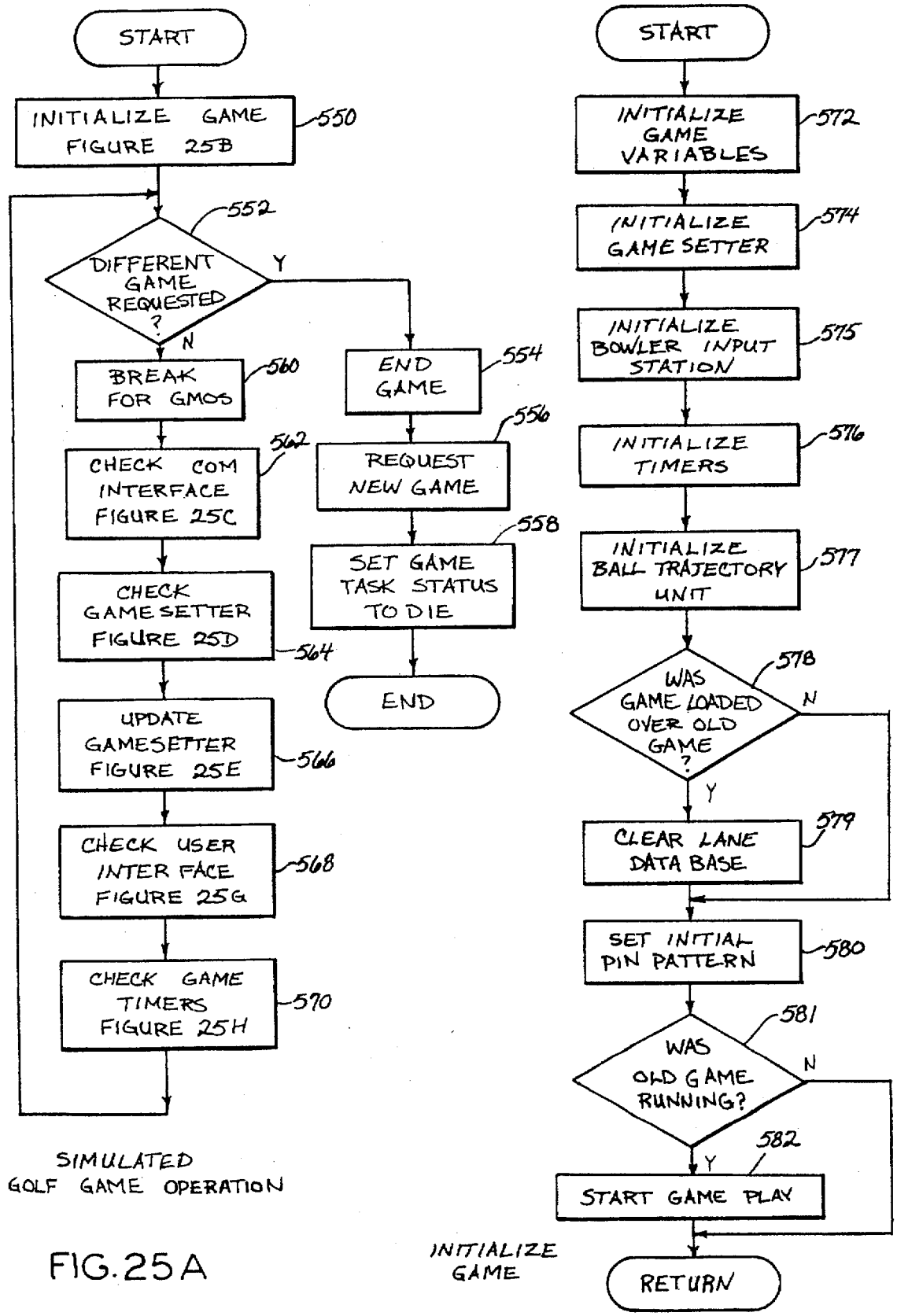

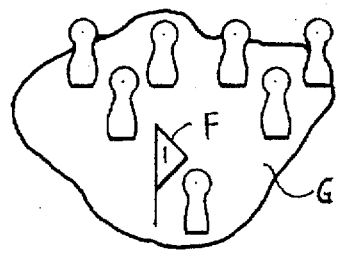
PAR 3
| | 1 | 2 | 3 | 4 | 5 | 6 | 7 | 8 | 9 | TOTAL OUT |
|---|---|---|---|---|---|---|---|---|---|---|
| PAR | 3 | 4 | 3 | 3 | 2 | 3 | 3 | 4 | 2 | |
| SMITH | | | | | | | | | | |
| JONES | | | | | | | | | | |
| | | | | | | | | | | |
| | | | | | | | | | | |
FIG.26
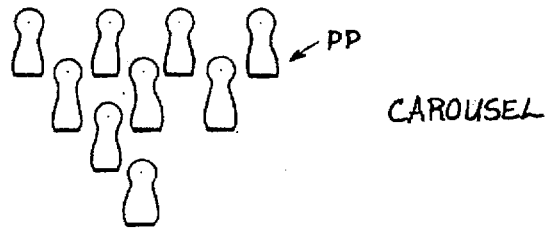
CAROUSEL
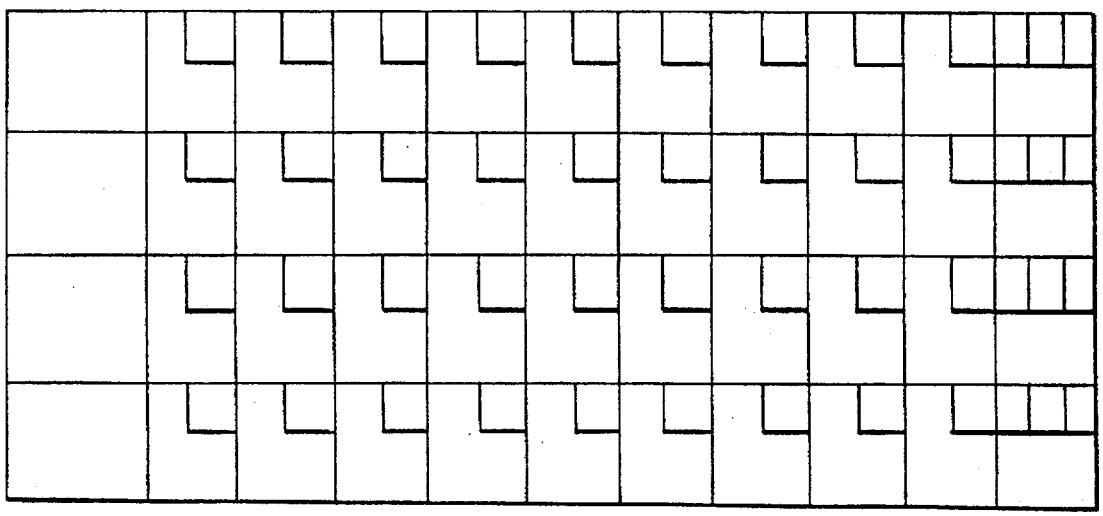
FIG.27

AUTOMATIC BOWLING CENTER SYSTEM

This is a continuation of application Ser. No. 08/177,610 filed Jan. 5, 1994, now U.S. Pat. No. 5,146,894, which is a continuation of prior patent application Ser. No. 07/962,492, filed Nov. 23, 1992, now U.S. Pat. No. 5,450,318, which is a continuation of prior application Ser. No. 07/724,793, filed Jul. 2, 1995 now U.S. Pat. No. 5,255,185, which is a division of prior application Ser. No. 07/182,977, filed Apr. 18, 1988, now U.S. Pat. No. 5,101,354.

FIELD OF THE INVENTION

This invention relates generally to a bowling center system, and more particularly to an automated bowling center system operable to automatically control the operation of a pinsetter under control of a bowling game program, to play a plurality of different bowling games and to provide bowling game instructional facilities.

BACKGROUND OF THE INVENTION

Bowling centers have evolved from systems which required the manual setting of ten pins on the lane and manual scoring during game play, to systems which utilize automatic pinsetting devices, such as described in Huck, et al U.S. Pat. No. 2,949,300, and ultimately to systems which utilize automatic bowling scoring systems, such as described in Grosvenor et al U.S. Pat. No. 3,582,071.

Such prior bowling center systems often included a plurality of pairs of bowling lanes, with each lane including an automatic pinsetter. The automatic pinsetter was operable to automatically control pinsetter cycles within a bowling game. Particularly, under automatic control, the pinsetter at the beginning of each frame would set ten pins on the deck. The player would be permitted to roll a maximum of two balls to knock down all of the pins. The frame ended after all of the pins were knocked down or after two balls were thrown, whichever occurred first. The game consisted of ten such frames.

Prior automatic score consoles were coupled to both pinsetters in the lane pair for automatically processing pin fall information for the two lanes and displaying bowler's scores on score console monitors and on overhead CRT displays. Suitable interconnections were provided between the score console and pinsetter so that pin fall information could be transmitted from sensing devices associated with the pinsetter to the scoring console.

In order for such prior automatic pinsetters to be utilized in a practice bowling mode, a selective pinsetting control mechanism, such as described in Rogers, U.S. Pat. No. 3,219,345, permitted a bowler to manually select which pins would be set on the deck for practice bowling. With such a mechanism, the bowler could selectively play a single ball, or two balls, in order to try and knock down all of the selected pins. Such a mechanism is operable to set a selected array of pins only responsive to a manual request from the bowler.

Certain known automatic pinsetters include hard wired control circuits designed to implement the operation of the conventional ten pin bowling game, or provide for practice bowling. These control circuits are not operable to selectively set different arrays of pins during the playing of a bowling game. Therefore, such automatic pinsetters are limited in their ability to provide variation in the method of operation of a particular bowling game.

Prior bowling center systems also included a manager's control console in electrical communication with the score consoles. The primary function of the manager's control console was to provide administrative control over the operation of the automatic pinsetters and the score consoles. For example, the prior manager's control console was utilized to provide lane status report information, to upload the video score display from any score console and to provide score correction for a particular score console. Such score correction necessitated that bowling at the particular lane be halted until the score correction was complete and sent back to the score console. The manager's control console also included provision for displaying messages at a preselected score console, to transfer lane scoring information from one score console to another, and provide for tournament display as by displaying a pair of lane scores on any selected number of overhead CRT's throughout the system. Additionally, the manager's score console provided for activity and error logging related to system operation.

SUMMARY OF THE INVENTION

In accordance with one aspect of the present invention, a bowling lane system is operable to automatically control the operation of a pinsetter during game play to automatically set a preselected array of bowling pins which may comprise any number less than a predetermined number of bowling pins.

A bowling center system according to the one aspect of the invention is operable to automatically control the operation of a bowling game, which bowling game may use less then ten pins in any frame. The system includes a pinsetting apparatus for setting up to ten bowling pins on a bowling lane. Means are coupled to the pinsetting apparatus for controlling the pinsetting apparatus to set a preselected array of bowling pins, which preselected array may comprise less than ten bowling pins. A game control means is coupled to the controlling means for implementing the operation of a bowling game, the game control means including means for automatically preselecting an array of pins to be set during operation of the bowling game.

More specifically, a bowling center system according to the one aspect includes an automatic pinsetter operable under the control of a programmed pinsetter control unit to set up to ten pins on the bowling lane. The pinsetter control unit is electrically connected to a game control unit. The game control unit includes a central processing unit and a memory, the central processing unit being operable to implement a bowling game according to a bowling game program stored in the memory. The game control unit is also electrically connected to a video display unit for displaying bowler scoring information as determined by a pin sensing device associated with the pinsetter control unit. A bowler input station is also connected to the game control unit for entering bowler information. The game control program is operable during game play to periodically command the pinsetter control unit to set a preselected array of pins, which array may comprise less than ten pins, according to the logic of the particular game being played.

Another feature of the present invention is that the game control unit is operable to play any one of a plurality of different bowling games. Means are included for selecting which of the bowling games are to be played at any given time by the game control unit.

Another feature of the present invention is that the game control unit automatically determines the score of a bowling game dependent on a scoring algorithm for the selected bowling game being played.

According to another aspect of the invention, a bowling center system is provided which is operable to download any one of a plurality of different bowling game programs from a manager's control terminal to a game control unit.

More specifically, the bowling center system includes a plurality of bowling lanes and an electrically controlled pinsetting device for each lane. A plurality of game control units are provided, each electrically connected to one or more of the pinsetting devices. Each game control unit includes a central processing unit, a display device, an operator input station and a memory for storing a game control program. A manager's control terminal unit includes a programmed central processing unit connected to a memory, the memory storing one or more game control programs. Communication means are provided for electrically connecting the processing unit of the manager's control terminal with the processing units for each of the game control units. Means are included electrically connected to the communication means for requesting the manager's terminal processing unit to transfer one of the game control programs stored in the memory thereof over the communication means to the memory coupled to one of the game control units so that the game control unit operates the pinsetter connected thereto to play the one game.

According to still another aspect of the present invention, a bowling center system is provided including a manager's control terminal having an input terminal connected thereto which is operable to interact directly with any game control unit.

More specifically, the bowling center system includes a plurality of bowling lanes, each having a pinsetting device associated therewith. A plurality of game control units, each connected to one or more of the pinsetting devices, include a central processing unit coupled to a display device and a bowler input device for providing bowler interaction with the game control unit operation. A manager's control terminal includes a central processing unit coupled to a display device and an operator input terminal. Communication means are provided for electrically connecting the central processing unit of the manager's control terminal with the central processing unit for each of the game control units. Switching means are provided coupled to the game control units and the display devices for selectively coupling the manager's input terminal and display device to a selected one of said game control units so that said manager's control terminal input device interacts directly with the bowling game for the selected game control unit.

It is still another feature of the present invention that a bowling game can continue to be played even after the manager's control input terminal is operable to interact directly with the operation of the selected bowling lane.

According to still another aspect of the invention, a bowling center system includes a manager's control device which is operable to control the transmission of video display signals from a plurality of video display sources over a communication network to any one of a plurality of video display terminals.

Broadly, according to this aspect of the invention, there is disclosed herein a manager's control terminal for operatiny a video display system including means for generating a plurality of video display signals each representing a dynamic video display. A plurality of video display terminals remotely located from the manager's control terminal are operable to display dynamic video displays responsive to a received video signal. Means are included for selecting one of the dynamic video displays to be displayed on one of the display terminals. A video communication network is coupled to the manager's control terminal, the selecting means and the display terminals. The manager's control terminal includes means responsive to the selecting means for commanding the generating means to transmit over the network the video signal representing the selected one of the displays. Switching means coupled in the communication network are provided for switching the communication network to cause a selected one of the display terminals to receive the selected transmitted video signal in order to display the selected video display.

More specifically, the video display system includes a memory device for storing data which represents a plurality of dynamic video displays. Such memory means may include video disks. The video source, such as a disk player converts the data on the memory means to a video signal representative thereof. The manager's control terminal is in electrical communication with the video source devices and includes commands for instructing the sources to generate a display signal representing a selected dynamic video display. One or more video switches are connected to the video sources using a plurality of video communication lines. Each switch is also connected to one or more video display monitors. Operator input means are provided for selecting a video display to be displayed on a selected video monitor. The video switches are in communication with the manager's control terminal and are operable to selectively connect a video source to a video monitor so that the selected video monitor can display a selected video display responsive to a received video signal from the video source.

Another feature of this aspect of the invention is that the video display system is utilized in a bowling center system wherein a plurality of automatic scoring terminals are connected to the manager's control terminal. A plurality of video display terminals associated with each scoring terminal are connected to a video switch. The video switch is operable under the command of manager's control terminal to display a selected video display at any video display terminal in the bowling center system.

According to a yet another aspect of the invention, a bowling center system is provided including a plurality of bowling lane pairs and a score control unit for each lane pair having a score display device. A manager's control terminal has a central controller device, a display device and a memory storage device. The manager's control terminal is connected with each of the score units for transferring data therebetween. A plurality of display terminals are remotely located relative to the manager's control terminal and the score control unit, and are connected to the transferring means to display information representing data received from the transferring means. A plurality of operator input means, one for each of the display terminals, is coupled to the transferring means for transmitting requests to the manager's control terminal or the scoring terminals. A switching means is coupled to the transferring means for transmitting data from the transferring means to one of the display terminals responsive to a request from the one display terminals associated operator input means.

Further features and advantages of the invention will readily be apparent from the specification and from the drawings.

BRIEF DESCRIPTION OF THE DRAWINGS

FIGS. 12A–12D comprise a detailed block diagram for a gamemaker game control unit and manager's computer according to the invention;

FIG. 13 is a block diagram representation of a communications interface circuit:

FIG. 19 is a block diagram of a circuit for the control decoder block of FIG. 16;

FIG. 20 is a block diagram of a remote area terminal;

FIG. 26 illustrates a graphic display format for the simulated golf game for display on the overhead monitor;

FIG. 27 illustrates a graphic display format utilized in conjunction with an alternative golf game program;

DETAILED DESCRIPTION OF THE INVENTION

GENERAL DESCRIPTION

The game of bowling is played on a bowling lane which typically includes an automatic pinsetter operable for setting ten pins on the lane at the start of a game. In a conventional ten pin bowling game, each bowler is allowed to roll two balls in an attempt to knock all of the pins down. The throwing of two balls constitutes what is known as a frame, except that three balls may be permitted in the tenth frame, and the completion of ten frames comprises one game. The player's score is determined according to the number of pins which are knocked down in each frame. The scoring may be accomplished by manually counting the number of pins which have been knocked down. In a bowling center including an automatic scoring system, the score is automatically computed and displayed on a suitable displaying screen or printed out using a printing device.

A bowling center system according to the present invention includes provisions for playing numerous different bowling games utilizing an automatic pinsetter and automatic scoring system wherein each frame may permit the throwing of more or less than two balls, and may utilize any number less than or equal to ten bowling pins comprising any pattern that the pinsetter is capable of setting. Also, the system is provided with an interactive display system which enables dynamic video graphics to be selectively displayed on various system display monitors for training purposes and the like.

OVERVIEW

General System Overview

Figure 1:
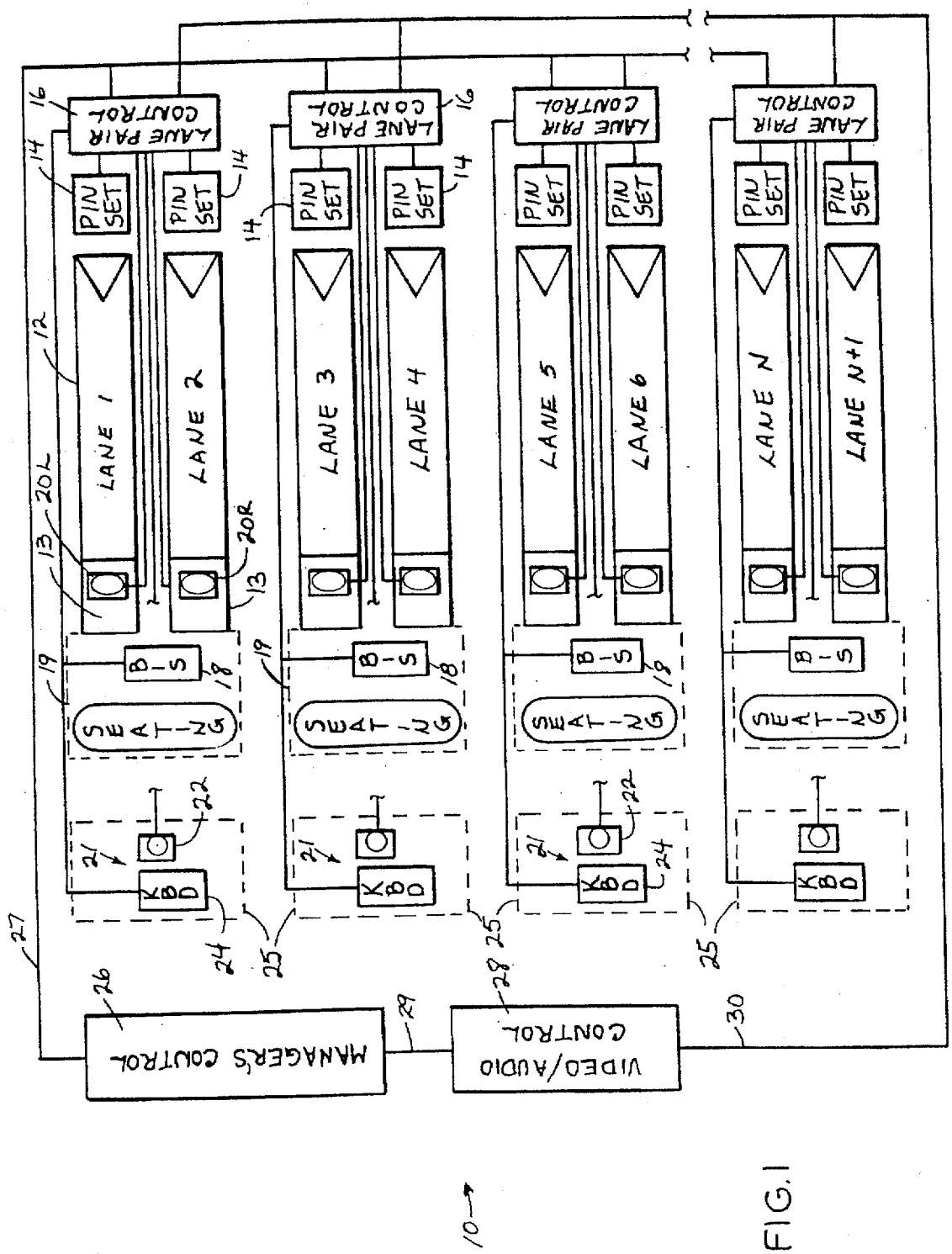
FIG. 1 is a generalized block diagram representing an overview of a bowling center system according to the present invention.

With reference to FIG. 1, a generalized blocked diagram represents an overview of a bowling center system 10 according to the present invention. The bowling center system 10 includes a plurality of bowling lanes 12, each having a conventional approach 13. Particularly, a total of N+1 lanes are provided, wherein lanes are grouped in pairs. Particularly, lanes 1 and 2 comprise a lane pair, lanes 3 and 4 comprise a lane pair, lanes 5 and 6 comprise a lane pair, etc., etc., and lanes N and N+1 comprise a lane pair.

Associated with each lane is an automatic pinsetter 14. The two pinsetters 14 of each lane pair are electrically connected to a lane pair control system 16. The lane pair control system 16 operates both pinsetters 14 to set a desired array of pins according to the bowling game being played, and to provide automatic scoring for the bowling game being played. Also connected to each lane pair control system 16 is a bowler input station 18 which is used by a bowler to enter information to be transmitted to the lane pair control 16. The bowler input station 18 is physically located near a bowler staging area 19 immediately adjacent the associated approach 13. Conventionally, this is the area occupied by the bowlers as they await their turn to bowl, keep score, etc. A respective overhead display monitor 20L and 20R is provided for the left and right lanes of each lane pair to display scoring and other types of information. Additionally, a remote, or social area, terminal 21 including a display monitor 22 and an associated keyboard 24 are electrically connected to the lane pair control 16 but are remotely located relative to the bowling lane 12. The remote terminal 21 may be utilized, as discussed more specifically below, to permit nonbowlers to be provided with training or other information relative to bowling in general or to a particular bowling game. Such remote terminals 21 might be located anywhere in a bowling center, including possibly social areas 25. Social areas 25 may be provided for all or less than all of the lane pairs as desired, but generally, each will include both a remote monitor 22 and a keyboard 24. Each social area 25 is a less active area than a bowler staging area 19 in the sense that occupants of the social area may be there for any of a variety of purposes including bowling and nonbowling purposes. For example, for bowling purposes, they may receive game information, instructional information or even video information depicting a game being played elsewhere in the bowling establishment on the monitor 22. Alternatively, other video information, such as TV or cable TV programs may be displayed on the monitor 22. As still a further alternative, the social areas 25 may be utilized solely for relaxation, the consumption of food or beverages, conversation or the like.

Generally speaking, a social area 25 is more remote from the associated lane pair than is the corresponding staging area 19. This is due to the nature of a number of the uses mentioned above. At the same time, it is frequently desirable that a social area 15 be in fairly close proximity to at least the associated staging area so that a person receiving instruction in a social area 25 may readily move to the associated staging area 19 and begin to make use of that instruction on one or both of the lanes of the lane pair.

Frequently, but not always, a social area 25 may be disposed in an area of a bowling establishment conventionally utilized to house spectators, i.e., immediately adjacent a staging area 19 on the side thereof that is remote from the lane pair.

To the extent that a social area 25 is utilized in such a way as to require interaction with the automatic bowling center system of the present invention, the associated keyboard 24 is utilized for that purpose.

A manager's control system 26 communicates with each of the lane pair control systems 16 over a global communication line, or COM line, 27. The manager's control system 26 is typically located at a bowling center manager's control desk, or MCD, and provides accounting control of the bowling lanes as well as the ability to download game information to the lane pair control system 16. The manager's control system 26 communicates over a manager's local communication line, or COM line, 29 to a video/audio control system 28. The video/audio control system 28 is connected over a global video/audio distribution bus 30 to each of the lane pair control systems 16. The video/audio control system 28 is controlled responsive to commands from the manager's control system 26 to transmit video/audio information to the lane pair control system 16 for subsequent display on the monitors 20L, 20R or 22.

Various of the devices, components, circuits or the like described herein are utilized in the bowling center system associated with the left lane and the right lane of each lane pair, and the remote or social area. Accordingly, any similar elements are referenced using identical reference numerals including the respective suffixes L, R or S when associated with the left lane, right lane or remote or social area. For simplicity of discussion, the suffixes may be omitted in the specification wherein the particular discussion relates equally to any of the like devices. Similarly, the manager's control system 26 includes devices, components, circuits or the like corresponding to those at lane pair control 16. Although the manager's control system 26 is not broken down as is the lane control unit 16, i.e., left, right or social area, similar suffixes are utilized relative thereto to maintain consistency between any discussion relating to a lane pair control system 16 and the manager's control system 26.

Manager's Control/Video Control

Figure 2:
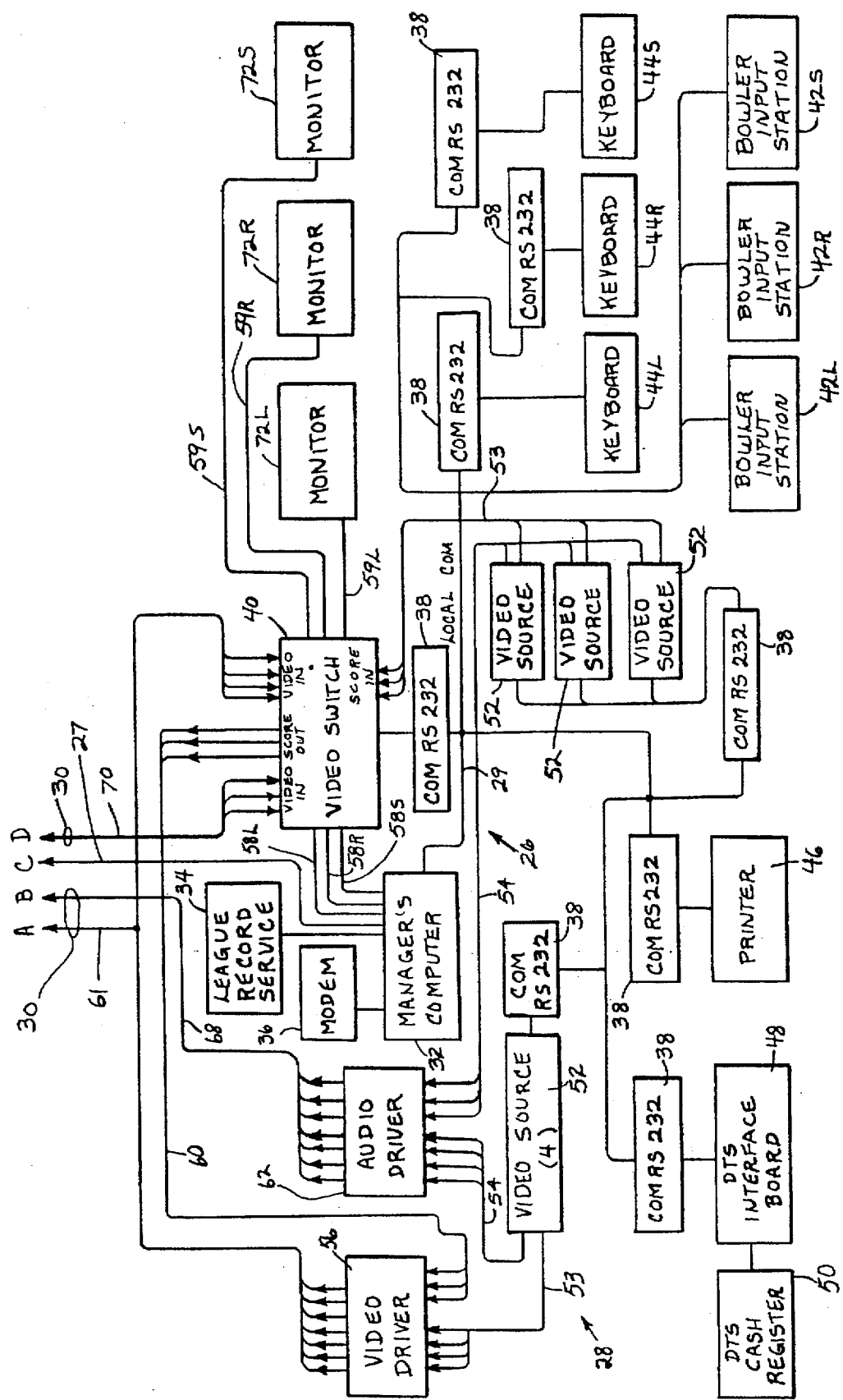
FIG. 2 is a more detailed block diagram representation for the manager's control system and the video/audio control system of FIG. 1.

With reference to FIG. 2, there is illustrated a more detailed block diagram representation for the manager's control system 26 and the video/audio control system 28.

A programmed manager's computer 32 is connected to the global COM line 27, as discussed above, to communicate with up to sixty-four lane pair control systems 16, for a total of one hundred twenty eight lanes of bowling. According to the preferred embodiment of the invention, a maximum of sixty-four lane pair control systems 16 are utilized. However, the COM line 27 can support up to two hundred and fifty lane pair control systems, as is discussed more specifically below. The peripheral devices connected to the manager's computer 32 include a league record service, or LRS, computer 34 and a modem 36. The league record service computer 34 provides the ability to transfer scoring information which is utilized for operating a bowling league. The modem 36 permits a remotely located service facility to diagnose and correct problems in the manager's computer 32. A detailed description of the manager's computer 32 is provided below.

A plurality of RS232 type communication interface units 38 and up to three bowler input stations 42 are connected to the manager's local COM line 29. Electrically connected to the interface units 38 are up to three keyboards 44, a video switch 40, up to ten score sheet and/or ten coupon printers 46, a DTS interface board 48 and multiple DTS cash registers 50 coupled thereto, and up to seven video source devices 52, such as video disk or tape players. Score sheet printers are used to print bowler score sheets in a graphic format. Coupon printers are used to provide coupons or prize awards according to, for example, a bowler's performance. Illustratively, a bowler may be awarded a free soft drink for exceeding a preselected score.

Each of the video source devices 52 transmits a composite video signal on a conventional video transmission line 53 and an audio output signal on a conventional audio line 54. The video lines 53 for three of the video devices 52 are connected to SCORE IN terminals of the video switch 40. The video lines 53 of the remaining video sources 52 are connected to input ports of a video driver 56. Also connected to input ports of the video driver 56 over a line 60 are three SCORE OUT ports of the video switch 40. The video driver 56 includes seven output ports connected to a video transmission line 61 of the global video/audio bus 30. Four of the video driver output ports are also connected to four VIDEO IN ports of the video switch 40. An audio driver 62 includes seven input ports connected to the video source audio lines 54. The audio driver 62 includes seven output ports connected to an audio transmission line 68 for transmitting audio information over the global video/audio bus 30. The video switch 40 includes three additional VIDEO IN ports connected to a score video transmission line 70, also part of the global video/audio bus 30.

The manager's computer 32 develops RGB video signals over video lines 58L, 58R and 58S which are connected to the video switch 40. Also connected to the video switch 40 over video lines 59L, 59R and 59S are respective RGB monitors 72L, 72R and 72S.

The manager's computer 32 controls switching of the video switch 40 and operation of the video sources 52, as is discussed more specifically below, responsive to requests from lane pair control systems 16 to allocate the transmission of audio and video signals to selected monitors 20L, 20R, 22 or 72 in the system.

Associated with each monitor 72 is a keyboard 44 and a remote bowler input station 42. The monitor 72 can be used in conjunction therewith for displaying such information as the status at any or all lanes at any given time. For example, an overview display indicates the status of the current game being played at all lanes. Also, the keyboard is utilized to enter commands to download game software from the manager's computer 32 to a lane pair control system 16, and also to start, stop or continue operation of a game. The monitors 72 are also utilized to display scoring information which is transmitted from a lane pair control system 16, and provide for correction of the scoring information. Particularly, the keyboard 44 or bowler input station 42 may be utilized to enter corrected data which can then be transmitted back to the particular lane pair control system 16.

Lane Pair Control

Figure 3:
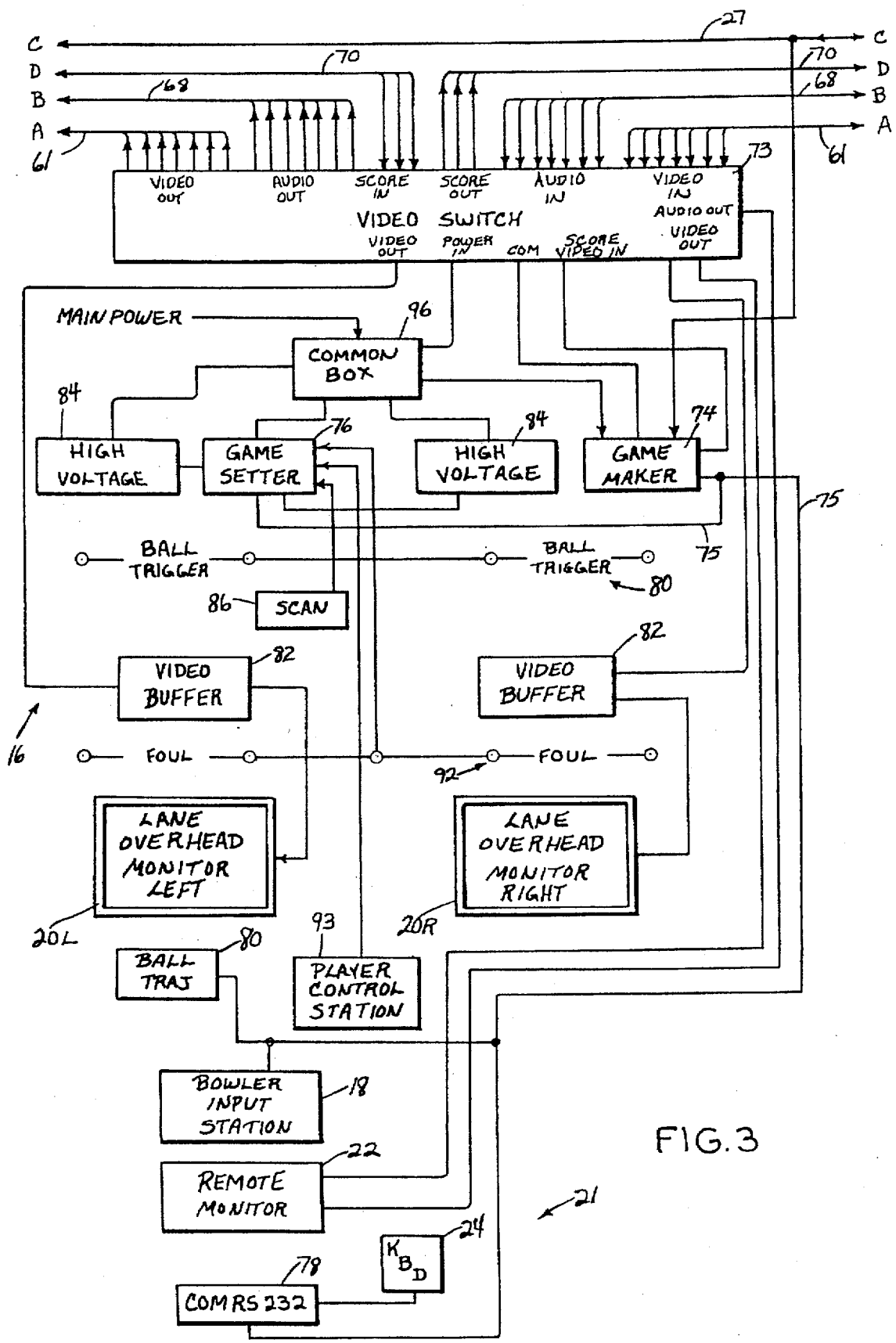
FIG. 3 is a more detailed block diagram of the lane pair control system of FIG. 1.

With reference to FIG. 3, there is illustrated a more detailed block diagram representation for the lane pair control system 16 of FIG. 1.

The lane pair control system 16 is operable for each lane pair to automatically control the operation of the pinsetters 14 in accordance with commands and software received from the manager's computer 32 over the global COM line 27 and operator input requests made at the bowler input station 18. Particularly, the lane pair control system 16 operates the pinsetter 14 for each lane independently to play any one of a plurality of different bowling games. Although the lane pair control system 16 is described herein as controlling two pinsetters 14, the lane pair control system 16 could be used to control any number of pinsetters 14.

Each lane pair control system 16 includes a video switch 73 which is similar to the video switch 40 at the manager's control desk. The video switch 73 is connected to and is controlled by a game and scoring control unit 74, referred to hereinafter as a gamemaker, and includes seven VIDEO IN ports connected in series with seven VIDEO OUT ports to the global video transmission line 61. Similarly, seven AUDIO IN ports and series connected AUDIO OUT ports are connected to the global audio transmission line 68. Accordingly, the video and the audio signals from the manager's control desk video driver 56 and audio driver 62 are transmitted over the respective global video and audio lines 61 and 68 to the video switch 73 at each lane pair, in a multidrop configuration. The score transmission line 70 is also connected to three SCORE IN and three SCORE OUT ports on the video switch 73. The score video transmission line 70 is used to transmit display information from any lane pair control system 16 to the manager's computer 32 for display on the monitors 72 and for retransmission to other lane pair control systems 16 in tournament bowling.

The global COM line 27 from the manager's computer 32 is electrically connected to the gamemaker 74 of each lane pair control system 16. The gamemaker 74 is a computing device similar to the manager's computer 32. The gamemaker 74 acts as a master station on a gamemaker local COM line 75 which is connected to a pinsetter control unit 76, referred to hereinafter as a gamesetter, for the two lane pair pinsetters 14. The gamemaker 74 and gamesetter 76 together control automatic operation of the pinsetters 14, as is discussed in greater detail below, to implement operation of any one of a plurality of different bowling games and to provide scoring information for the particular game.

The gamemaker local COM line 75 is connected to the bowler input station 18, a ball trajectory unit 80 and to an RS 232 communication interface circuit 78 which is connected to the remote keyboard 24. The ball trajectory unit 80 tracks the passage of the ball as it moves down the lane and provides ball tracking data to the gamemaker 74.

The remote monitor 22 associated with the remote keyboard 24 is connected to AUDIO OUT and VIDEO OUT ports on the video switch 73 for receiving respective audio and video signals therefrom. Additional VIDEO OUT ports from the video switch 73 are connected to the left and right lane overhead monitors 20L and 20R through conventional video buffer circuits 82, if necessary, or desired. The lane overhead monitors 20L and 20R are utilized to display scoring and other information relative to a bowling game being played on its associated lane. The remote monitor 22 may be utilized in conjunction with its keyboard 24 for training purposes or for providing information relative to a bowling game being played at either its associated left or right lane.

The gamesetter 76 receives commands from the gamemaker 74 to operate the automatic pinsetters 14 in accordance with a bowling game program. Particularly, the gamesetter 76 is connected to the pinsetters 14 through high voltage converting circuits 84. Also connected to the gamesetter 76 are a pin scanner 86, a ball trigger sensor 88, a foul detector 92, a player control station 93 and a common box 96. The pin scanner 86 is an optical type scanner of known form which senses the pins standing on the deck at any given time. The foul detector 92, which may be an optical sensor of known form, provides an indication when a bowler has stepped over the foul line while throwing a ball. The ball trigger sensor 88 triggers when the bowling ball has been played by the bowler. The common box 96 is connected to a main power source for providing power to the video switch 73, the gamemaker 74, the gamesetter 76 and the high voltage converters 84.

System Description—Lane Pair

Pinsetter

The pinsetter 14 for each lane is an automatic bowling pin handling apparatus. The pinsetter 14 is operable to set up to a maximum of ten pins in the conventional bowling triangular configuration or array. In the preferred embodiment, the pinsetter 14 comprises the Brunswick Model GS10 pinsetter. The machine operation of the GS10 pinsetter is described in the Brunswick GS10 Operation and Service Manual dated July, 1986, Part No. 47-902705, which is incorporated by reference herein. However, the electronic control system of the GS10 pinsetter is replaced by the gamesetter 76 described in detail herein.

Figure 4:
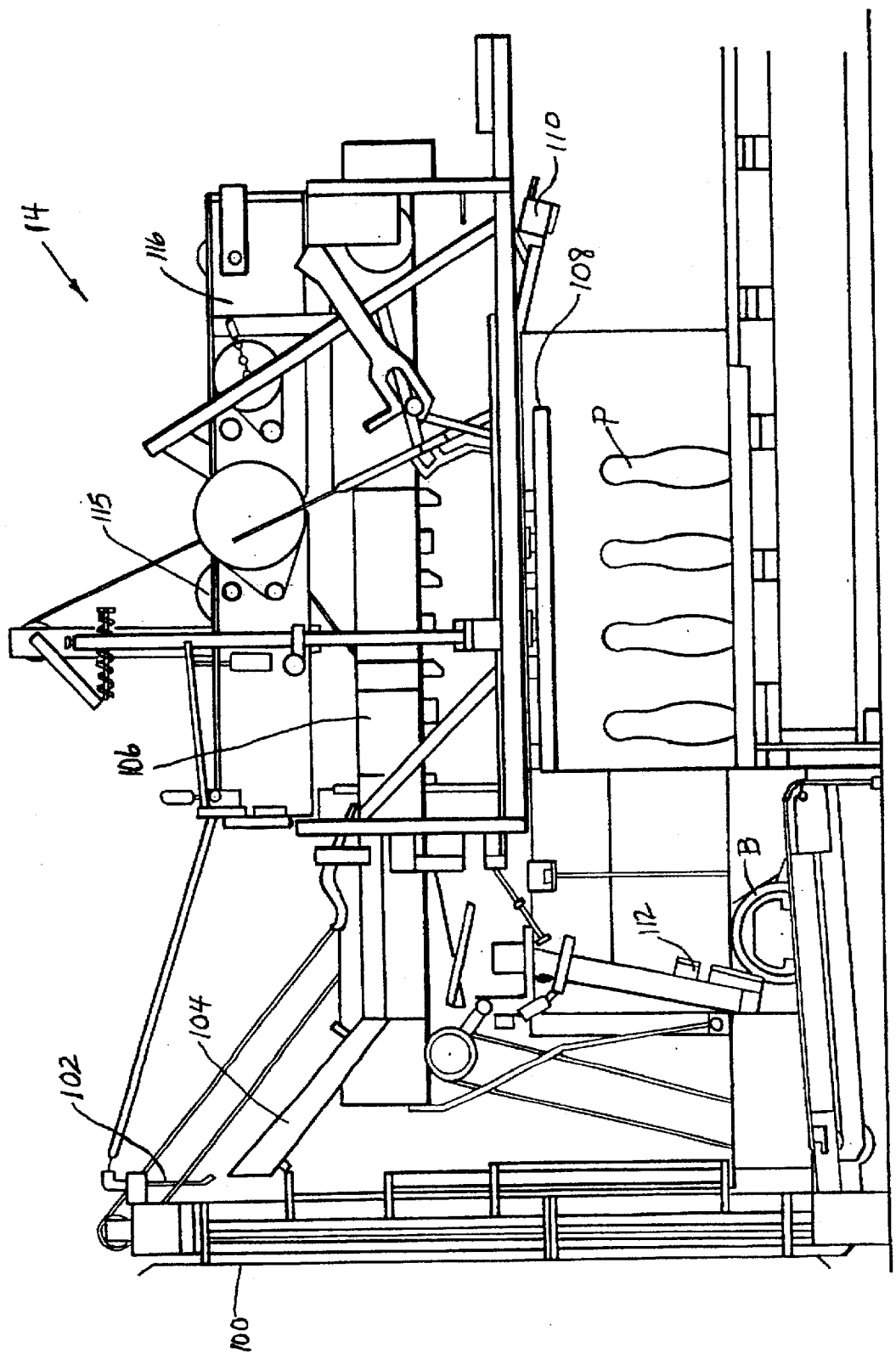
FIG. 4 is an elevational view, with parts removed for clarity, of an automatic pinsetting apparatus.
Figure 5:
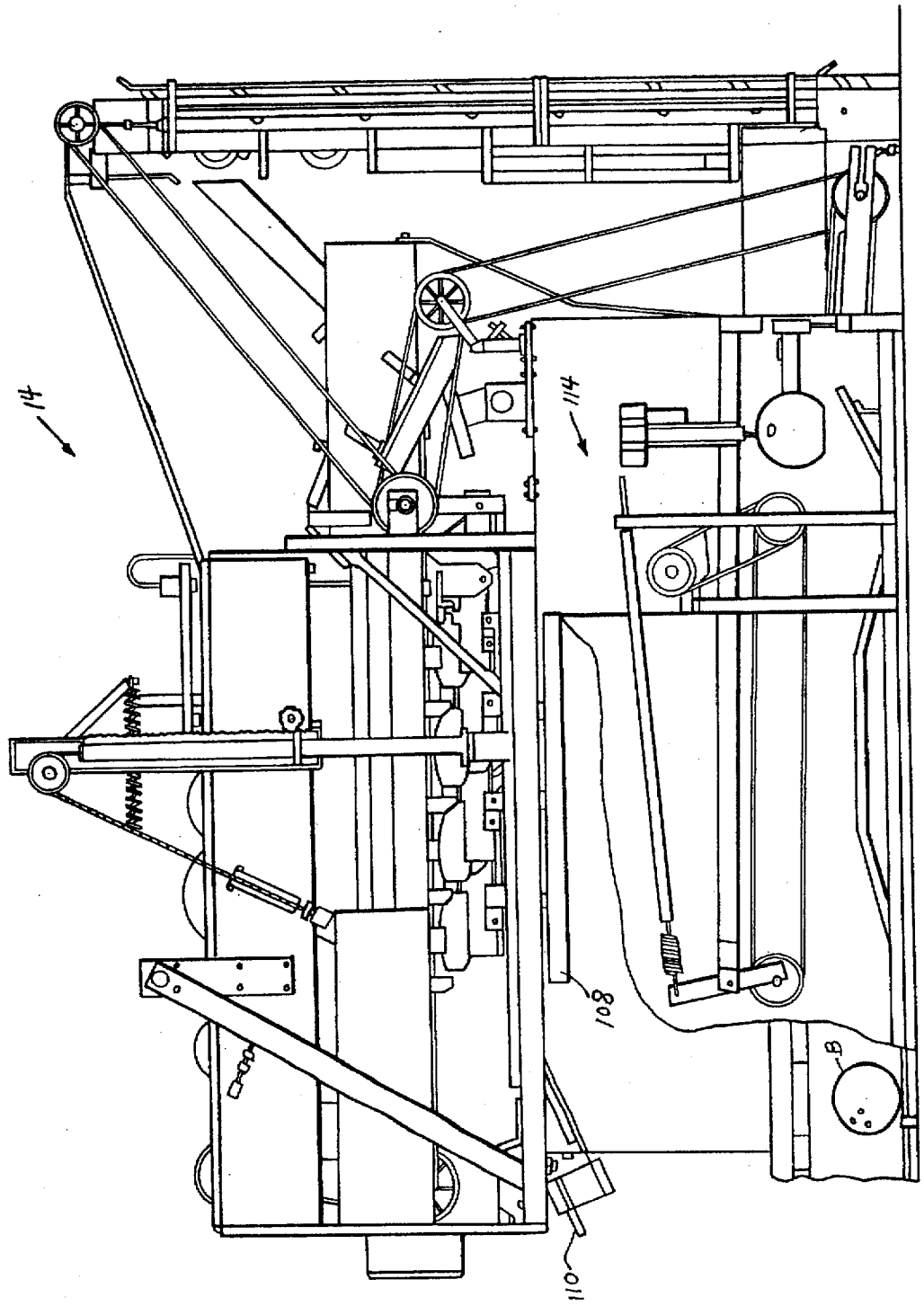
FIG. 5 is an elevational view similar to that of FIG. 4 taken from an opposite side of the pinsetting apparatus.

With reference to FIGS. 4 and 5, selected portions of the Brunswick Model GS10 pinsetter are illustrated in order to describe operation thereof which may be necessary to the understanding of the operation of the bowling center system according to the present invention.

The pinsetter 14 includes a pin elevator 100 which receives pins randomly from a conventional pit conveyor (not shown) and elevates them to a pin turn 102 which orients the pins base first and deposits them into a pin chute 104 which, in turn, delivers them into a distributor 106. The distributor 106 delivers the pins to ten pin stations for eventual unloading to a setting table 108. The setting table 108 includes ten tipping baskets, one for each pin, for holding bowling pins which are to be set on the lane. Such a tipping basket is described in Schmid et al, U.S. Pat. No.

3,809,398, the specification of which is hereby incorporated by reference herein. Each tipping basket includes a switch operable to sense the presence of a pin P, and a solenoid which operates a pair of flaps which controllably engage the neck of a pin P prior to setting it on the deck. A scissors is used to lift a standing pin when the deck is to be swept and to release a pin for respotting.

The setting table 108 is movably mounted so that it may be lowered to detect a strike or standing pin condition, to pick up and then respot standing pins after a rake 110 has removed fallen pins, or to set new pins. Accordingly, the setting table 108 moves in a controlled short stroke for detecting, picking up and resetting standing pins, and moves in a longer stroke for setting new pins.

After a ball B has been played, a ball cushion 112 stops forward motion of the ball and subsequently passes the ball B to a ball accelerator 114, common to both lanes in a pair, which propels the ball down the track to a ball lift (not shown) at the bowler staging area 19 or approach 13.

A gear train assembly 116 positioned above the distributor 106 is provided as a drive mechanism responsible for operating moving parts on the pinsetter 14. The gear train assembly 116 includes a distributor motor, a sweep motor, a setting table motor, and associated shafts, gears, belts, chains, etc. Also, the gear train includes a switch cam cluster assembly 115 which includes four setting table position normally open contact switches (not shown), Switches A, B, C and D, which are attached to sense four preselected setting table positions. Specifically, Switch A represents the highest table position, Switch B the middle table position, Switch C the lowest table position, and Switch D also the middle table position. The switches are operated by a cam shaft driven by the setting table motor. Two middle position switches are provided, Switch B and Switch D, in order to determine the direction of rotation of the setting table motor which is dependent on the particular cycle being performed. Particularly, when the setting table motor is moving left the order of switch closures is A-B-C-D-A. Conversely, when the setting table motor is moving right the order of switch closures is A-D-C-B-A.

Gamesetter

Figure 6:
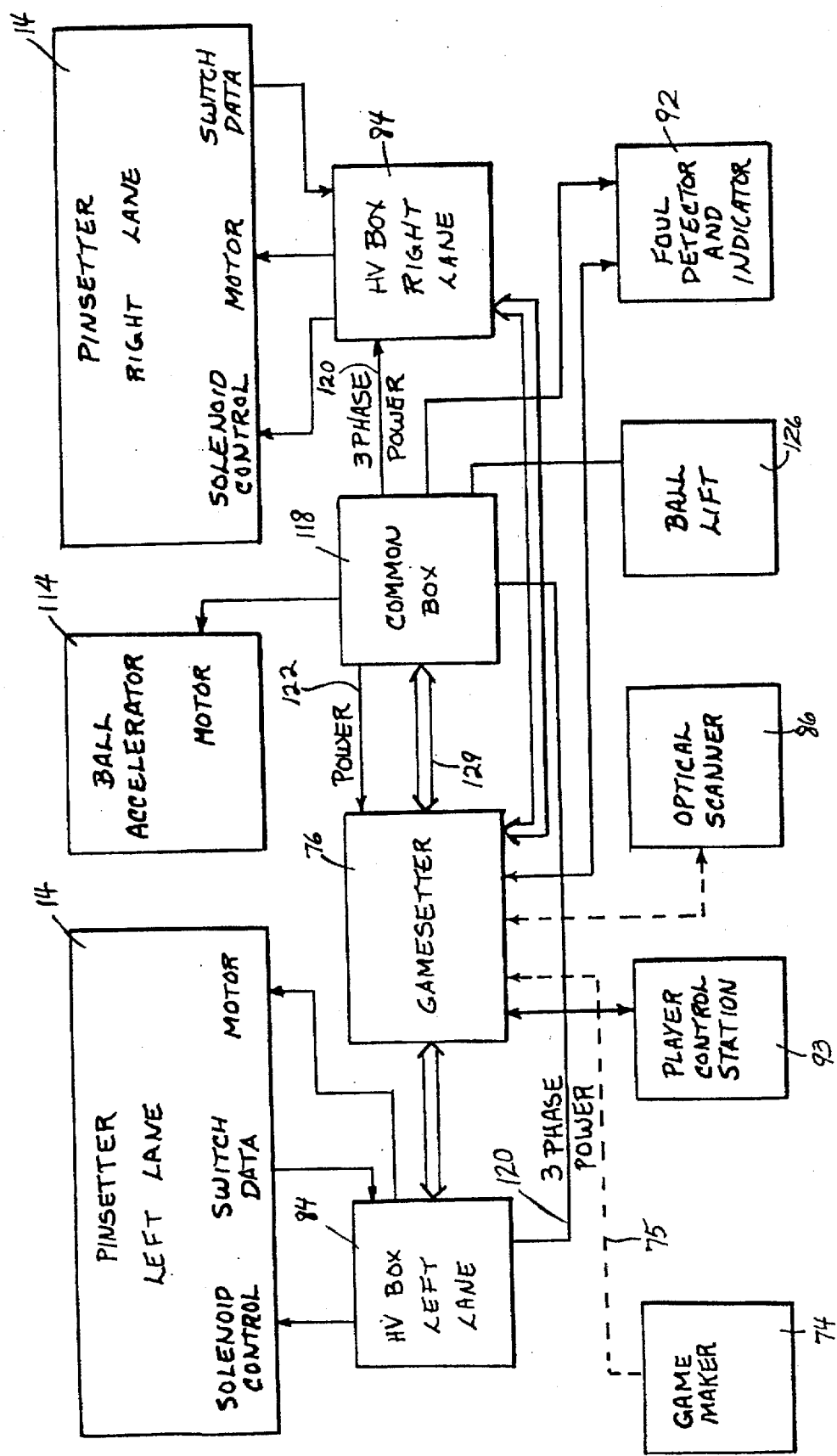
FIG. 6 is a generalized block diagram representation of a gamesetter electrical control for controlling a pair of pinsetters.

With reference to FIG. 6 there is illustrated a generalized block diagram representation of the electrical and electronic components utilized in conjunction with the gamesetter 76 for controlling two pinsetters 14 for a left lane and a right lane in a lane pair. Since the specific components related to either lane are identical, only those for one lane are discussed in detail herein.

As discussed above, the gamesetter 76 communicates data to and from the gamemaker 74 over the local COM line 75. The gamesetter 76 is also connected to the pin detecting optical scanner 86, the foul detector 92, the player control station 93, the high voltage box 84 and the common box 18. The high voltage box 84 acts as a high voltage interface between the gamesetter 76 and input and output devices associated with the pinsetter 14.

Figure 7:
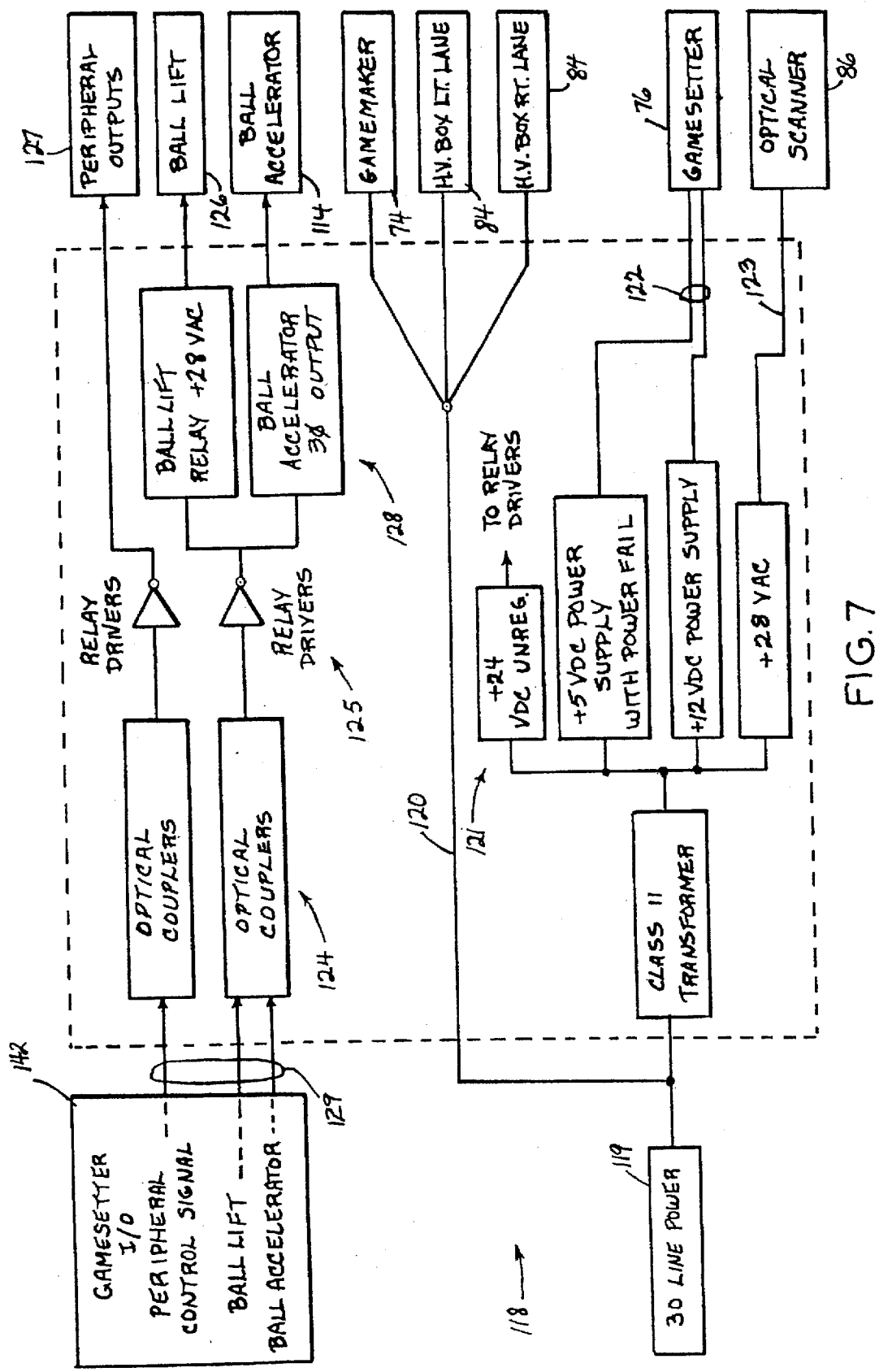
FIG. 7 is a block diagram for the common box of FIG. 6.

With reference also to FIG. 7, the common box 18 includes suitable provisions for coupling to a source 119 of three phase line power. A single phase of the power is supplied to the gamemaker 74. The three phase power is supplied directly therefrom to the high voltage boxes 84 over conventional power lines 120. The common box 118 includes conventional DC power converter circuits 121 for providing regulated DC power to the gamesetter 76 over a power line 122 and AC power to the optical scanner 86 over a power line 123. A plurality of conventional optical coupler circuits 124 are connected to a gamesetter I/O board 142, See FIG. 9, and receive control signals therefrom. The optical coupler circuits 124 are connected to conventional relay driver circuits 125. Certain of the relay driver circuits are connected to peripheral output devices 127, such as a foul detector unit 92. The foul detector unit 92 provides an indication when a bowler has stepped over the foul line. Conventional interface circuits 128 are connected to the relay driver circuits 125 for converting control signals to suitable voltage levels for operating a conventional ball lift device 126 and the ball accelerator 114.

Figure 8:
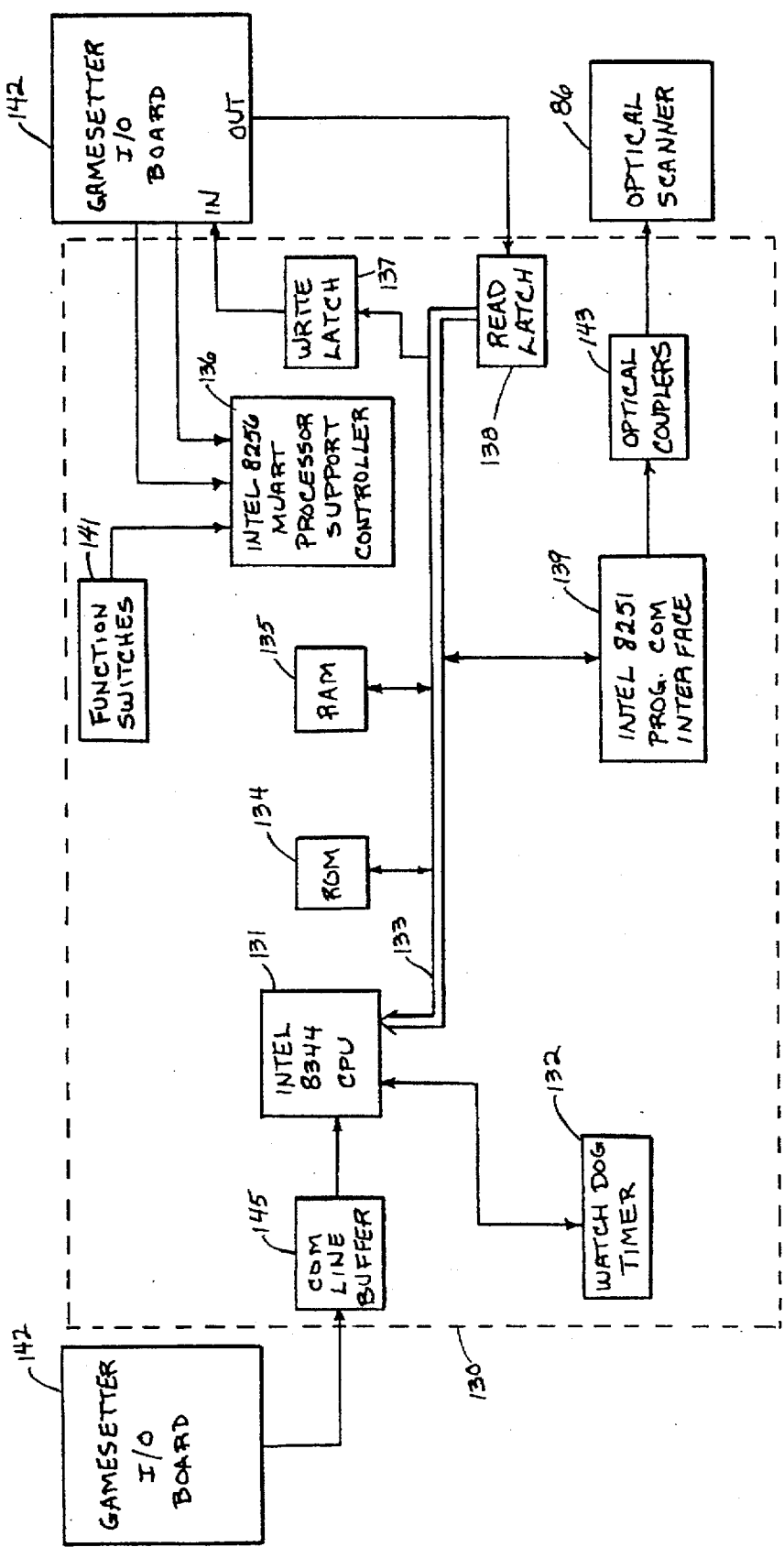
FIG. 8 is a block diagram for the gamesetter CPU board of FIG. 6.

With reference also to FIG. 8, a block diagram for a gamesetter CPU board 130 is illustrated. Particularly, the CPU board 130 includes an Intel 8344 CPU 131 connected to a watchdog timer circuit 132 and to a bus 133. The bus 133 transmits both address and data information. Connected to the bus 133 is a read only memory, or ROM, 134, a random access memory, or RAM, 135, a multiple universal asynchronous receiver transmitter, or MUART, 136, respective write and read latch circuits 137 and 138, and a programmable communications interface, or PCI, circuit 139.

The Intel type 8344 CPU is a remote universal interface processor which includes a type 8051 CPU incorporated therein. The 8344 CPU 131 is connected through a COM line buffer circuit 145 to the gamesetter I/O board 142 for connection to the gamemaker local COM line 75. As such, the CPU 131 serves as a communication sub-system controller on the local COM line 75. Also, the CPU 131 operates in accordance with a control program, described in greater detail below, for implementing control of the pinsetter 14.

The ROM 134 stores the CPU program which controls pinsetter operations in any one of five modes. A normal mode of operation requires communications between the CPU 131 and the gamemaker 74. In the remaining four modes the gamesetter 76 operates the pinsetter 14 as a stand-alone system for playing a bowling game without the use of the features associated with the gamemaker 74. The RAM 135 temporarily stores data for use by the CPU 131 such as pin fall data received from the optical scanner 86 or the pinsetter switches. The RAM 135 also operates as a buffer for storing data to or from the local COM line 75.

The MUART 136 is an Intel 8256 multifunction microprocessor support controller which provides multiple port bidirectional serial to parallel conversion of data. The MUART 136 is connected to function switches 141 which are used to set the mode of operation of the gamesetter 76. The MUART 136 is also connected to the I/O board 142 for interfacing peripheral devices such as the ball detector 88 and foul detector 92 to the bus 133.

The write latch circuit 137 is connected to the gamesetter I/O board 142 and transmits data as commanded by the CPU 131 to be output through suitable conversion circuits on the I/O board 142, as discussed below. The read latch circuit 138 is also connected to the gamesetter I/O board 142 and acts as a buffer for storing information to be read from input devices connected to the gamesetter I/O board, as discussed below.

The PCI 139 is an Intel 8251 programmable communications interface which is connected through an optical coupler circuit 143 to the optical scanner 86. The optical scanner 86 is a photoelectric pin fall detection system such as is described in Gautraud et al, U.S. Pat. No. 3,825,749 owned by the assignee of the present invention, the specification of which is hereby incorporated by reference herein. The scanner 86 transmits serial pin fall data to the PCI 139. The 8251 is a universal synchronous/asynchronous receiver transmitter designed for converting serial data to parallel and vice versa, and signals the CPU 131 whenever it is ready to accept data for transmission or whenever it has received data to be read by the CPU 131. The CPU 131 accordingly controls the operation of the scanner 86 and reads pin fall data therefrom. The CPU 131 can also transmit information to the scanner 86 such as for identifying standing pins in order to calibrate the scanner 86 to the existing pin pattern. Identification of the standing pins for such calibration may be determined by the pinsetter setting table switches.

Figure 9:
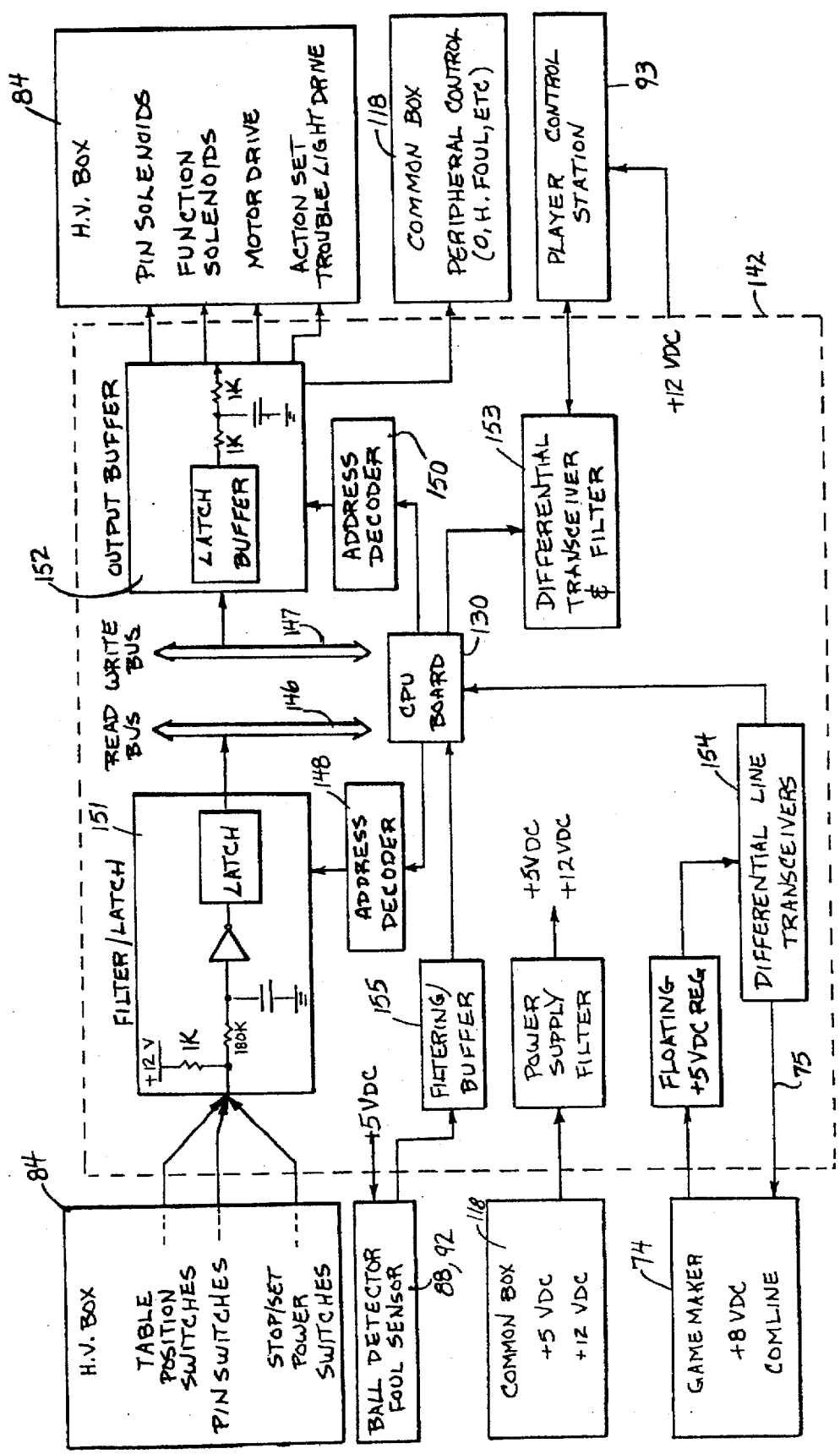
FIG. 9 is a block diagram of the gamesetter I/O board of FIG. 6.

With reference to FIG. 9, a block diagram represents the interconnection of elements for the gamesetter I/O Board 142. For simplicity, the gamesetter I/O board 142 illustrates the CPU board 130 as a block thereon. A CPU read bus 146 and a CPU write bus 147 are shown as being connected to the CPU board 130. Particularly, the read bus 146 is connected to the CPU board read latch 138, and the write bus 147 is connected to the CPU board write latch 137, see FIG. 8. Respective read and write address decoders 148 and 150 are operatively connected to the bus 133 on the CPU board 130. A filter/latch circuit 151 includes a plurality of input ports connected through the high voltage box 84 to a plurality of pinsetter input devices, such as for example the pin switches, setting table position switches and stop/set and power switches. Suitable filtering is provided to protect the circuits from static problems and the high voltages required to operate the pinsetters 14. The filter/latch circuit 151 continuously reads the on/off status of each input device and stores the status using conventional latch circuits. When instructed to by the read address decoder circuit 148, the filter/latch circuit 151 transmits the status from the latch circuits to the read bus 146 for transmission to the CPU board 130.

The write address decoder 150 is connected to an output buffer circuit 152. The output buffer circuit 152 is connected to the write bus 147 and includes latch buffer circuits for storing information received from the write bus 147, and a plurality of output ports connected through the high voltage box 84 to various output devices on the pinsetter, such as the pin solenoids and motors. Also, output ports are connected to the common box 118 to operate selected peripheral control devices, as discussed above.

When the address decoder circuit 150 reads an address corresponding to a particular output device, the address decoder circuit 150 commands the output buffer to read new data from he write bus 147 for controlling operation of the particular output devices.

A differential transceiver and filter circuit 153 connects the player control station 93 to the MUART 136 on the CPU board 130. The player control station 93 comprises an array of manually operated push buttons and LED's, one for each pin, used to manually select an array of pins to be set for practice bowling and to provide an indication to the bowler of the current standing pins. The differential transceiver and filter circuit 153 comprises a bidirectional serial communication port for transmitting the pin standing information to the bowler, as well as for receiving the manual pin setting selections for transmission to the CPU 131.

A differential line transceiver circuit 154 is a bidirectional serial communication port which is connected to the gamemaker local COM line 75 and is coupled through the COM line buffer 145 to the CPU 131. This circuit 154 includes a COM line disconnect switch (not shown) for permitting isolation from the gamemaker 74 if it is desired to operate the gamesetter 76 in the stand-alone mode. The stand-alone mode may be utilized, for example, when the system is being serviced or when the gamemaker 74 is inoperative. A filtering/buffer circuit 155 is coupled to the ball detector 88 and foul detector 92 for reading the status of these input devices. Both the ball detector 88 and foul detector 92 comprise optical sensors which transmit converted DC level signals. The DC amplitude changes when the respective sensor senses that the ball has been thrown or a foul has occurred. The filtering/buffer circuit 155 is connected to the MUART 146 on the CPU board 130.

Figure 10:
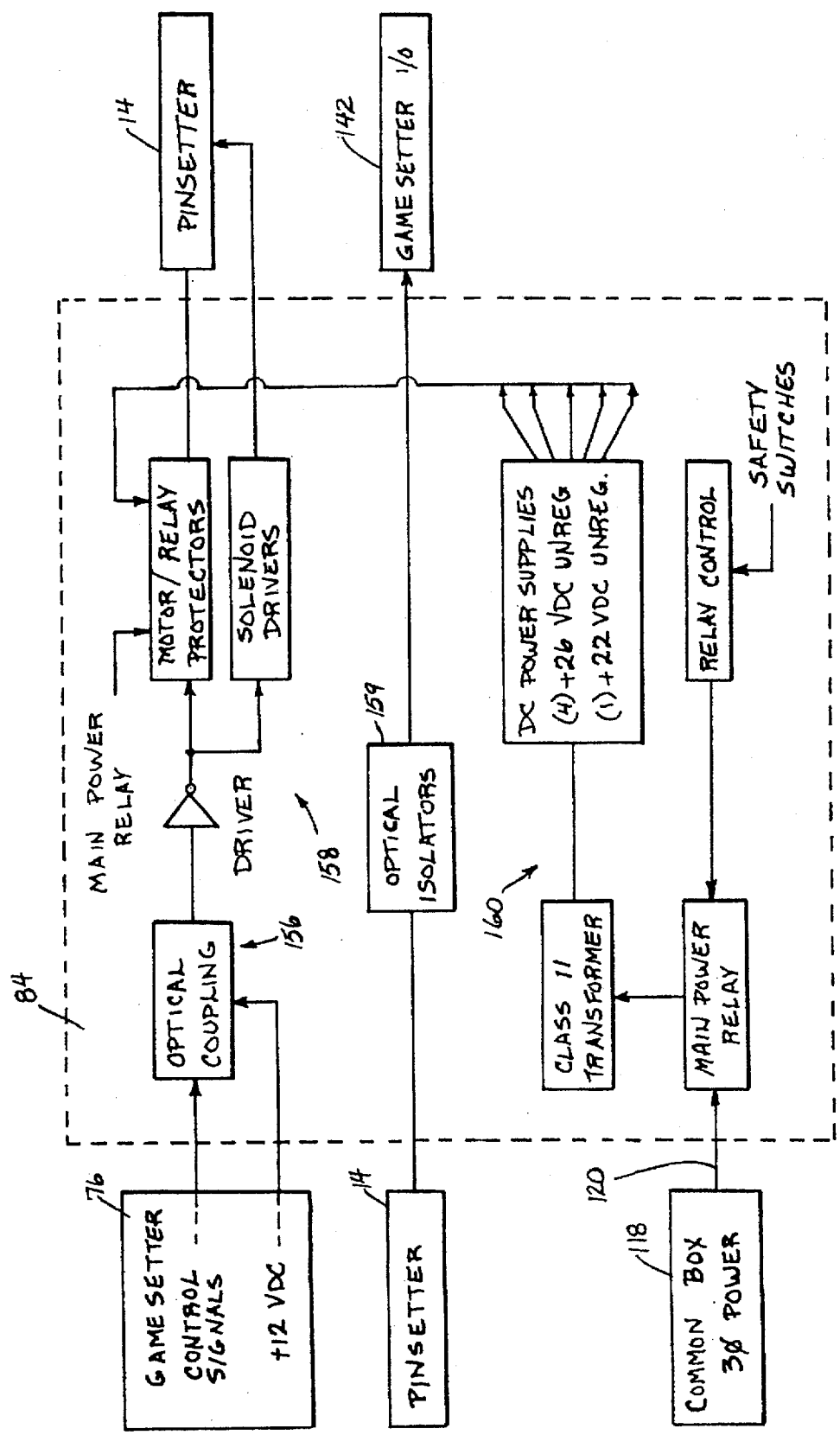
FIG. 10 is a block diagram of the high voltage interface box of FIG. 6.

With reference to FIG. 10, a block diagram illustrates a circuit for the high voltage boxes 84. Each high voltage box 84 includes interface circuits which convert relatively low voltage signals from the gamesetter 76 to suitable voltages for operating the pinsetter 14. The high voltage box 84 includes conventional optical coupler circuits 156 connected to the output buffer circuits 152 of the I/O board 142. The optical coupler circuits 156 isolate the gamesetter 76 from the high voltage box 84. The optical coupler circuits 156 are connected to conventional output driver circuits 158 for converting to necessary voltage to drive the pinsetter pin solenoids, motors and other devices. All input and output connections between the gamesetter 76 and pinsetter 14 are made through a similar optical coupler circuit 159 in the high voltage box 84. A conventional power circuit 160 is connected to the three phase line 120 from the common box 118 for converting to the necessary voltages utilized to drive the output driver circuits 158.

Gamesetter Operation

As discussed above, the gamesetter 76 is programmed to operate two separate pinsetters 14, one for the left lane and one for the right lane. The two pinsetters 14 can be operated together to play a cross lane bowling game on two lanes, or can be operated independently to play two distinct bowling games.

The gamesetter ROM 134 stores software instructions to operate the pinsetters 14 to perform conventional machine operations used in a bowling game. These machine operations include operations for reading the pins, picking up the pins and sweeping the deck after a ball has been thrown, and setting a new compliment of pins. In the normal mode of operation, discussed above, the gamesetter 76 receives commands from the gamemaker 74 to implement selective ones of the machine operations. Additionally, the ROM 134 stores four complete game programs which are used to operate the gamesetter 76 in a stand-alone mode. These four games include ten pin bowling, figures bowling, figures clearing bowling and a bowling game used for diagnostics. The function switches 141, see FIG. 8, are used to select whether the gamesetter operates in accordance with one of the four stand-alone bowling games in the stand-alone mode, or in accordance with instructions from the gamemaker 74 in the normal mode. If the function switches 141 are set to play one of the stand-alone games, then the system is operable to run the game program associated with the selected stand-alone game directly from the ROM 134. The CPU 131 thereafter operates in a conventional manner to control operation of the pinsetter 14 responsive to the various input signals and commands.

The stand-alone ten pin bowling game is the standard ten frame game which is discussed above. Figures bowling comprises utilizing the player control station 93 to select a particular pin pattern for practice bowling. Figures clearing is similar to figures bowling except that the bowler has as many chances as necessary to knock down all of the pins.

In the normal mode of operation, the gamesetter 76 communicates with the gamemaker 74 over the local COM line 75 to operate the pinsetter 14 to play a game. Particularly, the gamemaker 74 transmits command signals to the gamesetter 76 to control machine operations of the pinsetter to play a bowling game according to a program being implemented by the gamemaker, as discussed below. The gamesetter 76 in turn provides status information from the pinsetter 14 to the gamemaker 74 according to the results of the particular game being played.

The machine operation of the pinsetter 14, under program control, can be characterized in three basic machine operations. These operations are identical whether the pinsetter 14 is operating in the normal mode under the command of the gamemaker 74, or in the stand-alone mode.

The first operation is a cycle for reading the pins that utilizes the setting table 108 to determine which pins are standing. This operation is used, for example, in a system which does not include the optical scanner 86 and relies on conventional pin detecting switches on the setting table 108. Movement starts with the deck in the uppermost or home position, the scissors open and the rake up. Particularly, the "read the pins" operation performs the following steps:

1. Lock the ball door;
2. Start the distributor elevator;
3. Wait 0.5 seconds;
4. Drop the rake;
5. Wait 0.5 seconds;
6. Be sure that the rake is down and forward;
7. Wait 1.8 seconds;
8. Open the ball door;
9. Start the setting table motor turning left;
10. Four seconds after the start of the cycle, the setting table should be in contact with the pin heads and the Switch B contact should be closed;
11. Wait 240 milliseconds for the pin detecting switches to settle;
12. Read the status of the pin detecting switches and then store the status of each switch in the RAM 135; and
13. End read cycle.

A "pick up and sweep" operation may continue directly from the "read the pins" operation. Alternatively, if the "read the pins" operation is not necessary, and the setting table 108 is in the home position, then the "pick up and sweep" operation utilizes steps 1, 4, 5, 6, 8, 9 and 10, above, and thereafter continues as follows:

14. Start setting table motor moving left;
15. Start to close scissors;
16. Look for closure of Switch D indicating that the pins have been lifted from the deck;
17. Stop scissors closure;
18. Wait for Switch A to close, and then stop the setting table motor;
19. Start the rake to clear the fallen pins;
20. Wait 1 second;
21. Be sure that the rake is forward;
22. Turn the rake off;
23. Start the setting table motor moving right;
24. Look for switch D Closure;
25. Unlock the scissors;
26. Look for Switch B closure indicating that the pins are on the deck;
27. Release the scissors;
28. Look for Switch A to close and then turn off the setting table motor; and
29. End of pick up and sweep cycle.

Each of the above described operations is performed by the standard GS10 pinsetter, except for writing the pin status to the RAM 135 in step 12.

Figure 11:
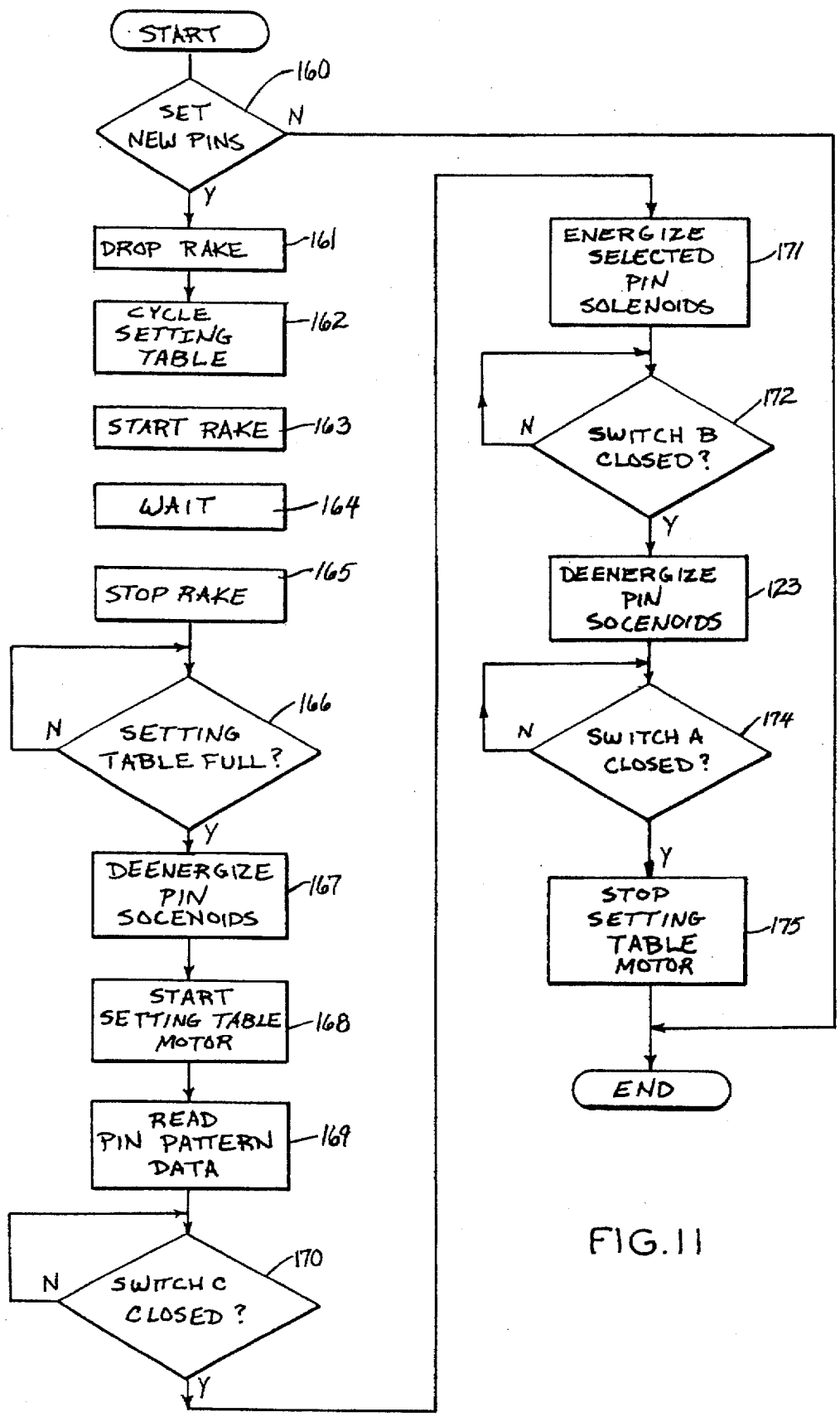
FIG. 11 is a flow diagram of a pinsetting operation performed by the gamesetter of FIG. 6.

With reference to FIG. 11, a flow diagram illustrates the operation of the gamesetter 76 for performing a pin setting operation. This operation begins after the deck has been cleared.

The pin setting operation begins at a decision block 160 which determines whether or not it is necessary to set a new compliment of pins. Normally, the pin setting operation is utilized at the beginning of a game and at the beginning of each frame. Also, if pins have been inadvertently knocked down, or the pinsetter 14 has been accidentally reset then the setting operation may be done. If no pin setting operation is desired, then control exits the pin setting operation. If it is determined that new pins should be set, then at a block 161 the gamesetter 76 operates the pinsetter 14 to drop the rake. Subsequently, the setting table 108 is run through a cycle by starting the setting table motor. When the cycle is performed, the pin solenoids are energized so that the flaps are open. As the setting table moves upwardly at the end of the cycle, the flaps operate a lever which pushes up thereby permitting pins to drop from the distributor 106. At the completion of the setting table cycle, the rake is started at a block 163. After a predetermined wait, at a block 164, the rake 110 is stopped at a block 165. A decision block 166 recycles on itself until all ten pins, or until all pins needed to fulfill the selected pattern, have been loaded into the setting table 108 as determined by the setting table tipping basket pin detect switches, discussed above.

Once the setting table 108 is full, as determined at the block 166, all of the pin solenoids are deenergized at a block 167. Subsequently, the setting table motor is started at a block 168 to begin dropping of the setting table 108 to set pins P on the deck. At a block 169 the preselected pin pattern is read from the gamesetter RAM 135. The preselected pin pattern is ten pins in ten pin bowling, is manually selected by the player control station 93 in figures bowling and is automatically determined by the gamemaker 74 in the normal mode of operation, as discussed in greater detail below.

Once the pattern data has been read, a decision block 170 waits for the pinsetter switch C to be closed indicating that the setting table 108 is in its lowest position. Once the pin setting table 108 is in the lowest position it is ready to release the pins P. Therefore, at a block 171 the pin solenoids corresponding to the pins of the preselected pin pattern, as read at block 169, are turned on. Resultantly, any such selected pins are released and as the movement of the setting table 108 continues, the pins in the positions where the solenoids have been turned on remain on the deck. The non-selected pins are carried away from the deck by the upward movement of the setting table 108. A decision block 172 subsequently waits until the pinsetter switch B is closed indicating that the pin setting table 108 is in its middle position. Thereafter, the pin solenoids are turned off at a block 173. The pin solenoids are not turned off until the Switch B contact closes to prevent any selected pins from being removed from the deck by deenergizing the solenoid too soon. Finally, a decision block 174 waits until the pinsetter switch A has closed indicating the setting table 108 is in the home position. Thereafter, the setting table motor is turned off at a block 175 and the pin setting operation is complete.

GAMEMAKER/MCD

According to the preferred embodiment of the invention, the gamemaker 74 and the manager's computer 32 utilize substantially identical circuits. Therefore, only a single type of device needs to be provided, resulting in the need for fewer spare parts and ease of servicing requirements.

FIGS. 12A-12D illustrate block diagram representations for an electronic circuit for the gamemaker 74 and manager's computer 32. For simplicity, the discussion herein refers only to the gamemaker 74, although all such discussion is also applicable to the manager's computer 32, except where specifically noted.

Figure 12A:
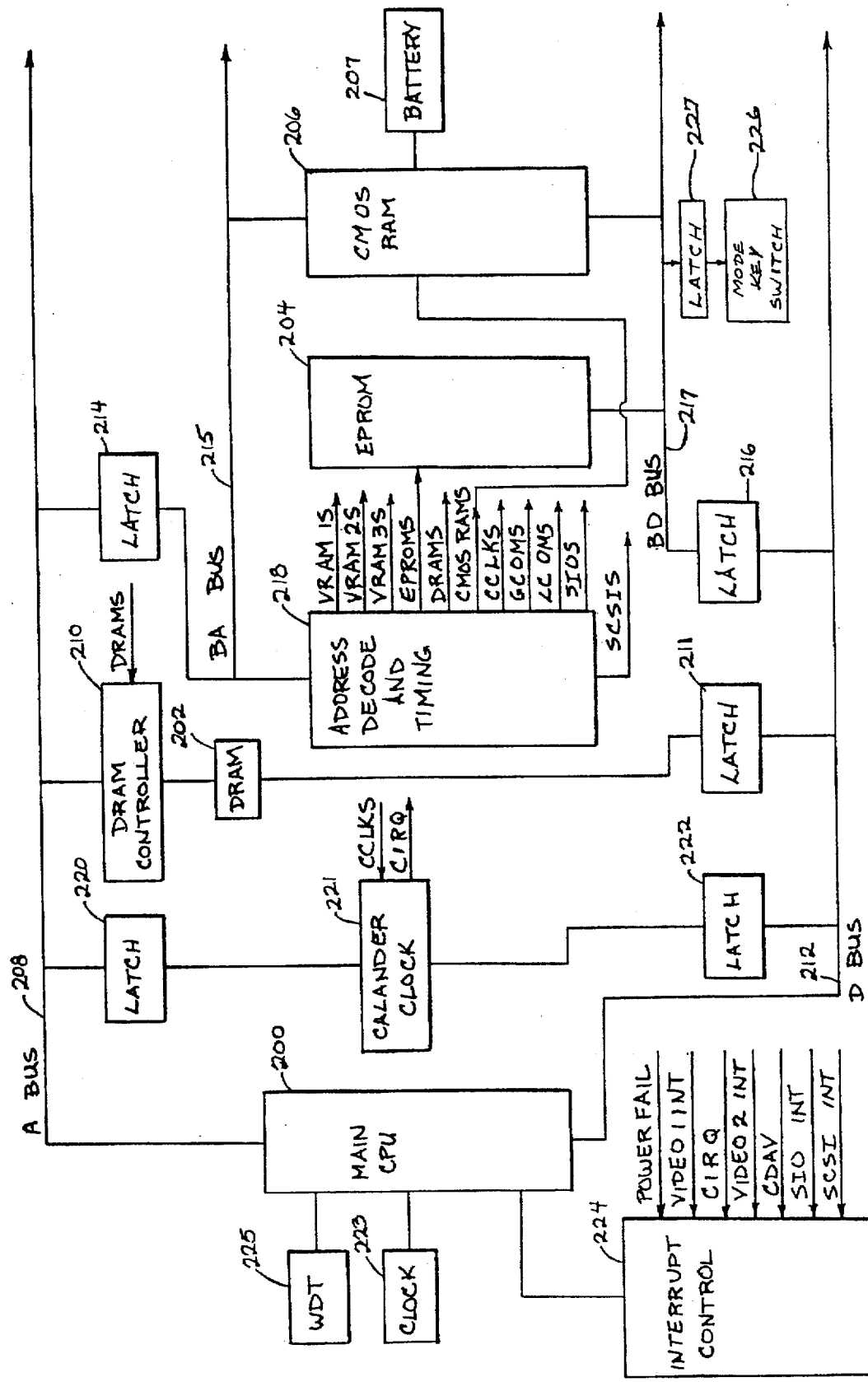

With reference to FIG. 12A, the gamemaker 74 has a type 68000 main central processing unit (CPU) 200. The main CPU 200 operates in a known manner to control all of the address and data lines in the system and generate all the timing strobes required to access the memory and peripheral devices connected thereto. The memory for the main CPU 200 consists of a dynamic random access memory, or DRAM, 202, an electrically programmable read only memory, or EPROM, 204, and a CMOS RAM 206. The main CPU 200 addresses data stored in the DRAM 202 by outputting an address on an address bus, or A BUS, 208 which is coupled to the DRAM 202 through a DRAM controller 210. The DRAM 202 responds to an address by outputting data to the main CPU 200 through a latch circuit 211 to a sixteen bit data bus, or D BUS, 212. The latch circuit 211 comprises a pair of conventional type 245 octal bus transceiver circuits with three state outputs which provide for synchronous two-way communication and also provide isolation when the main CPU 200 does not require access to the DRAM 202.

A latch circuit 214 connects the A BUS 208 to an isolated B address bus, or BA BUS, 215. The latch circuit 214 comprises three conventional type 244 octal buffer and line driver circuits having three state outputs. Similarly, a latch circuit 216, comprising a pair of conventional type 245 latch circuits discussed above, connects the D BUS 212 to an isolated B data bus, or BD BUS, 217. When the latch circuits 214 and 216 are enabled in a conventional manner as instructed by the main CPU 200, the main CPU 200 addresses data stored in the EPROM 204 or the CMOS RAM 206. The EPROM 204 and CMOS RAM 206 respond to an address by outputting data to the main CPU 200 via the BD BUS 217 and the D BUS 212.

Also connected to the BA BUS 215 is an address decode and timing circuit 218. The address decode and timing circuit 218 monitors the addresses output on the A BUS 208 through the BA BUS 215 and generates select signals for enabling devices with which an address is associated with. For example, the address decode and timing circuit 218 generates a DRAMS Signal, an EPROMS signal, and a CMOS RAMS signal respectively coupled to the DRAM Controller 210, the EPROM 204 and the CMOS RAM 206.

A latch circuit 220, which is a type 244 circuit, connects the A BUS 208 to a calendar clock circuit 221. The calendar clock circuit 221 is a Motorola MC146818 calendar clock chip which features the complete time of day with alarm and a one hundred year calendar built in, as well as the ability to generate an interrupt request signal CIRQ. The calendar clock circuit 221 receives an address select signal CCLKS from the address decode and timing circuit 218. The calendar clock circuit 221 responds to an address by outputting date and time data through a latch circuit 222, which is a type 245 latch circuit, to the D BUS 212. The function of the calendar clock circuit 221 is to give a periodic interrupt to the main CPU 200 to drive various software tasks. Particularly, when used as the manager's computer 32, the main CPU 200 requires an accurate calendar clock source in order to tag the events that occur in the system with a time and date stamp.

The calendar clock interrupt CIRQ is connected to an interrupt control circuit 224. The interrupt control circuit 224 responds to interrupt requests and Prioritizes the requests which are then transmitted to the main CPU 200. Once an interrupt level has been received by the main CPU 200, then processing of the tasks associated with the specific interrupt can be accomplished.

Also connected to the main CPU 200 is a conventional clock generator circuit 223 and two conventional watch dog timer circuits 225. The clock circuit 223 operates at 10 MHz as required for the main CPU 200. The watchdog timer circuits 225 monitor the proper execution of the program and instructions from the main CPU 200.

In application as a gamemaker 74, the DRAM memory 202 stores a program downloaded from the manager's computer 32, as discussed in greater detail below, to implement the operation of a bowling game. The EPROM 204 stores an initialization program for initializing the main CPU 200, the gamemaker operating system program, a default character set, and a game program for a stand-alone ten pin bowling game. The CMOS RAM 206 which is connected to a battery 207 stores pin fall data which is utilized in scoring. As a result, the CMOS RAM 206 operates as a non-volatile memory which retains pin fall data even in the event of a power failure.

The gamemaker may operate in any one of four modes of operation. These four modes include the normal mode where the gamemaker receives a game program from the manager's computer 32, a stand-alone league mode where the gamemaker utilizes a program stored in the EPROM 204 for operating the gamemaker to implement a cross lane ten pin league type bowling game, a stand-alone open mode where the EPROM 204 stores a standard ten pin bowling game program which can be moved independently on each lane, and a diagnostics mode where routine diagnostics are performed on the gamemaker hardware and software. More specifically, a mode key operated switch 226 is manually set in any one of four positions, one for each of the modes. The mode key switch 226 is connected through a type 373 latch circuit 227 to the BD BUS 217.

Figure 12B:
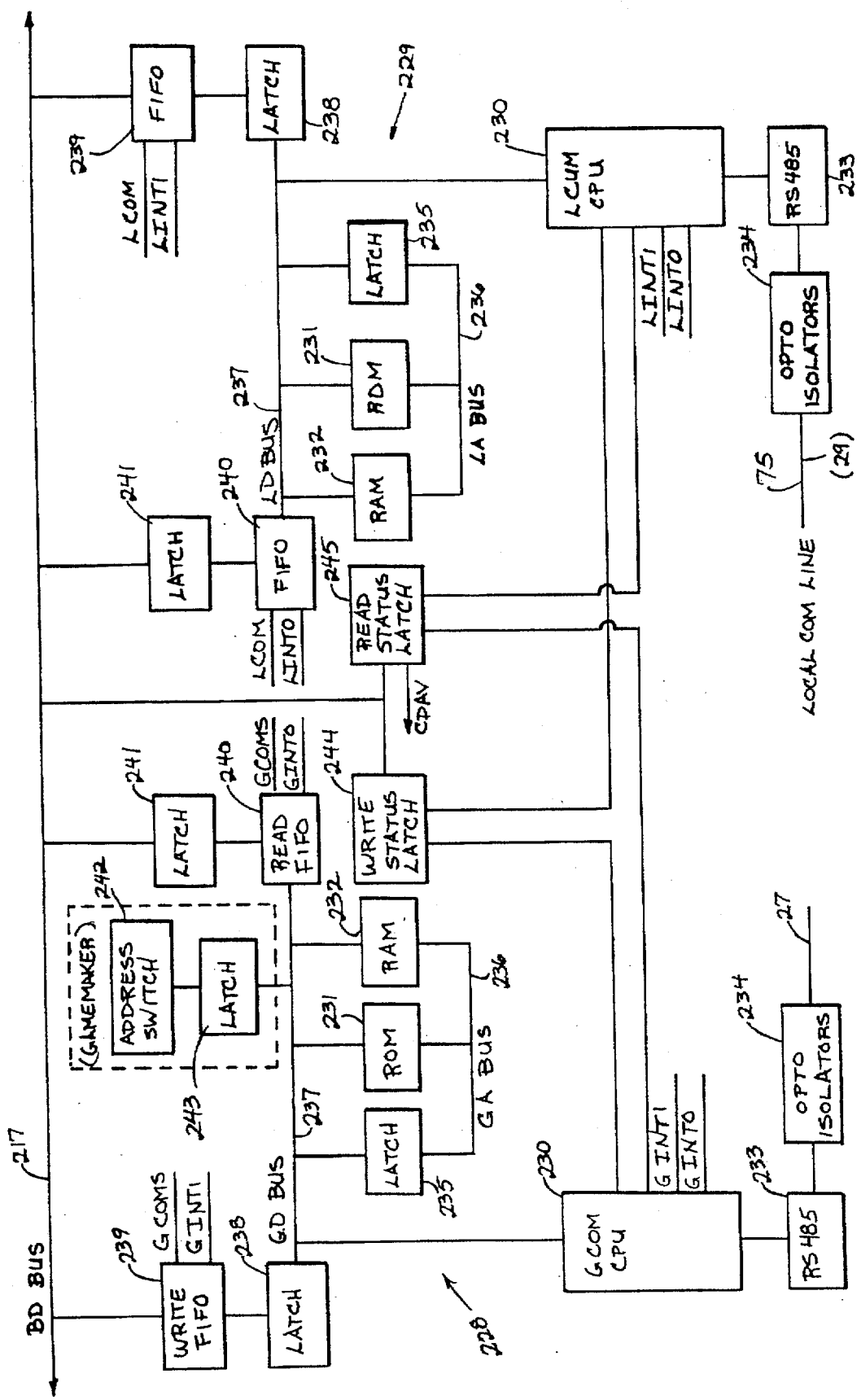

With reference also to FIG. 12B, a block diagram represents a control circuit for controlling communications on the global COM line 27 and the gamemaker local COM line 75. The gamemaker 74 includes a global COM line interface circuit 228 and a local COM line interface circuit 229. As each circuit is substantially identical, only the global COM line interface circuit 228 is discussed in detail herein.

The global COM line 27, the manager's computer local COM line 29, and the gamemaker local COM line 75 together provide a communications network for the bowling center system. The communication control is implemented using Intel type 8344 central processing units. The type 8344 is a remote universal interface processor which includes an eight bit type 8051 CPU which utilizes external ROM and RAM memory, and an independent serial interface HDLC/SDLC protocol controller. Specifically, the 8344 CPU controls the bidirectional transfer of data between a serial port and a parallel port.

Within the bowling center system, each device connected to a COM line 27, 29 or 75 includes an 8344 processor which operates as an intelligent serial interface so that the device can serve as a master or slave station. Each COM line, in fact, includes one master station and one or more slave stations. On the master COM line 27, the manager's computer 32 is the master station and each of the gamemaker's 74 is a slave station. On the manager's computer local COM line 29, the manager's computer is again the master station, with its associated peripheral devices, as e.g., the keyboards 44 and the printer 46, serving as slave stations. Each gamemaker 74 is the master on its associated local COM line 75. The remaining devices, as, e.g., the gamesetter 76 and the keyboard 24, on the gamemaker local COM line 75 are all slave stations.

The gamemaker 74 includes a global COM line interface processor, or GCOM CPU 230, which is the type 8344 processor. The GCOM CPU 230 converts data received from the BD Bus 217 in parallel format to serial format for transmission on the COM line 27. The GCOM CPU 230 is connected to an EIA type RS485 interface circuit 233 which is in turn connected to an optical isolator circuit 234 which is connected to the global COM line 27. A COM line disconnect switch (not shown) is included for disconnecting the gamemaker 74 from the COM line 27. This switch can be used if it is desired to take a particular gamemaker 74 off line. The GCOM CPU 230 is used with an external ROM 231 and RAM 232 to operate as a communications controller. The ROM 231 stores a program for operating the GCOM CPU. The RAM 232 provides a serial data buffer for messages going to and from the global COM line 27. The GCOM CPU 230 is connected to a GD BUS 237 which multiplexes address and data information on a single bus. The GD BUS 237 is connected to a latch circuit 235, the ROM 231 and the RAM 232. The latch circuit 235 is a conventional type 373 octal D-type transparent latch circuit having three state outputs. The latch circuit 235 is operable to demultiplex the address and data information to thereby provide addresses to the ROM 231 and RAM 232 on a global communication address bus or GA BUS 236. Specifically, the ROM 31 and the RAM 232 respond to an address on the GA BUS 236 by outputting data to the GD BUS 237. The GD BUS 237 is connected to a type 373 latch circuit 238. A write FIFO circuit 239 connects the latch circuit 238 to the BD BUS 217. The write FIFO circuit 239 operates as a buffer for storing data from the BD BUS 217 which is to be output on the global COM Line 27. The write FIFO circuit 239 is enabled by a global COM select signal GCOMS from the address decode and timing circuit 218, see FIG. 12A. A read FIFO circuit 240, similar to the write FIFO circuit 239, is connected to the GD BUS 237, and to the BD BUS 217 through a type 373 latch circuit 241. The read FIFO circuit 240 operates as a buffer for temporarily storing data which is received over the global COM line 27 prior to being transmitted to the BD BUS 217 as instructed by the address decode and timing GCOMS select signal which is also connected to the read FIFO circuit 240. The FIFO circuits 239 and 240 store sixty-four bytes of data and include status lines which generate signals when the memory is full and when data has been input into the memory. As should be apparent, suitable circuits are included to select either the read FIFO circuit 240 or the write FIFO circuit 239 responsive to the GCOMS select signal, according to whether it is desired to read or write data from the BD Bus 217.

Although not shown, the GCOM CPU 230 includes a conventional clock circuit and watchdog circuit connected thereto. The GCOM CPU 230 provides for two external devices to generate interrupt signals. An INT1 signal is generated by a data available line of the write FIFO circuit 239 to indicate when the main CPU 200 has data to be transmitted on the global COM line 27. The read FIFO circuit 240 generates an INT0 signal when its buffer is full so that it can no longer accept data until the main CPU 200 reads data out therefrom.

The gamemaker 74 includes an address DIP switch 242 connected through a type 373 latch circuit 243 to the GD BUS 237. The address switch 242 for each gamemaker 74 is set according to the station address on the global COM line. When used as a manager's computer 32, the address switch 242 of the global COM interface circuit 228 is not used as the manager's computer 32 serves as the master station.

As discussed above, the local COM interface circuit 229 is substantially identical to the global COM interface circuit 228. The prefix G is replaced with the prefix L to indicate that such circuits refer to the local COM line. Otherwise, like reference numerals indicate like components. The principal difference between the circuits 228 and 229 is that since the gamemaker 74 is the master station on its local COM line 75, an address switch 242 is not required.

Both the GCOM and LCOM CPU's 230 are coupled to a write status latch circuit 244 and a read status latch circuit 245. Each of the latch circuits 244 and 245 is also connected to the BD BUS 217. The write status latch circuit 244 is a conventional type 175 hex D-type flip-flop circuit with a clearing input. The read status latch circuit 245 is a type 373 circuit, discussed above. The latch circuits 244 and 245 receive status information from the CPU's 230 indicating the status of incoming or outgoing information, as well as indicating when transmitted or received data has been corrupted. The write status latch 244 advises the particular CPU 230 when data is to be written thereto. The read status latch circuit 245 generates an interrupt signal CDAV to the interrupt control 224, see FIG. 12A, when data has been read by one of the CPU's 230 from its associated COM line to be transmitted to the BD BUS 217.

The gamemaker 74 is operable to generate video graphic signals for driving three monitors, particularly the left and right overhead monitors 20L and 20R, respectively, and the remote area monitor 22. These signals provide for graphical presentation of, for example, scoring information and instructional information. In accordance with the requirement to support three video display monitors, a substantial amount of processing time is utilized for video generation. Therefore, timing and control of the video system must be properly accounted for.

Figure 12C:
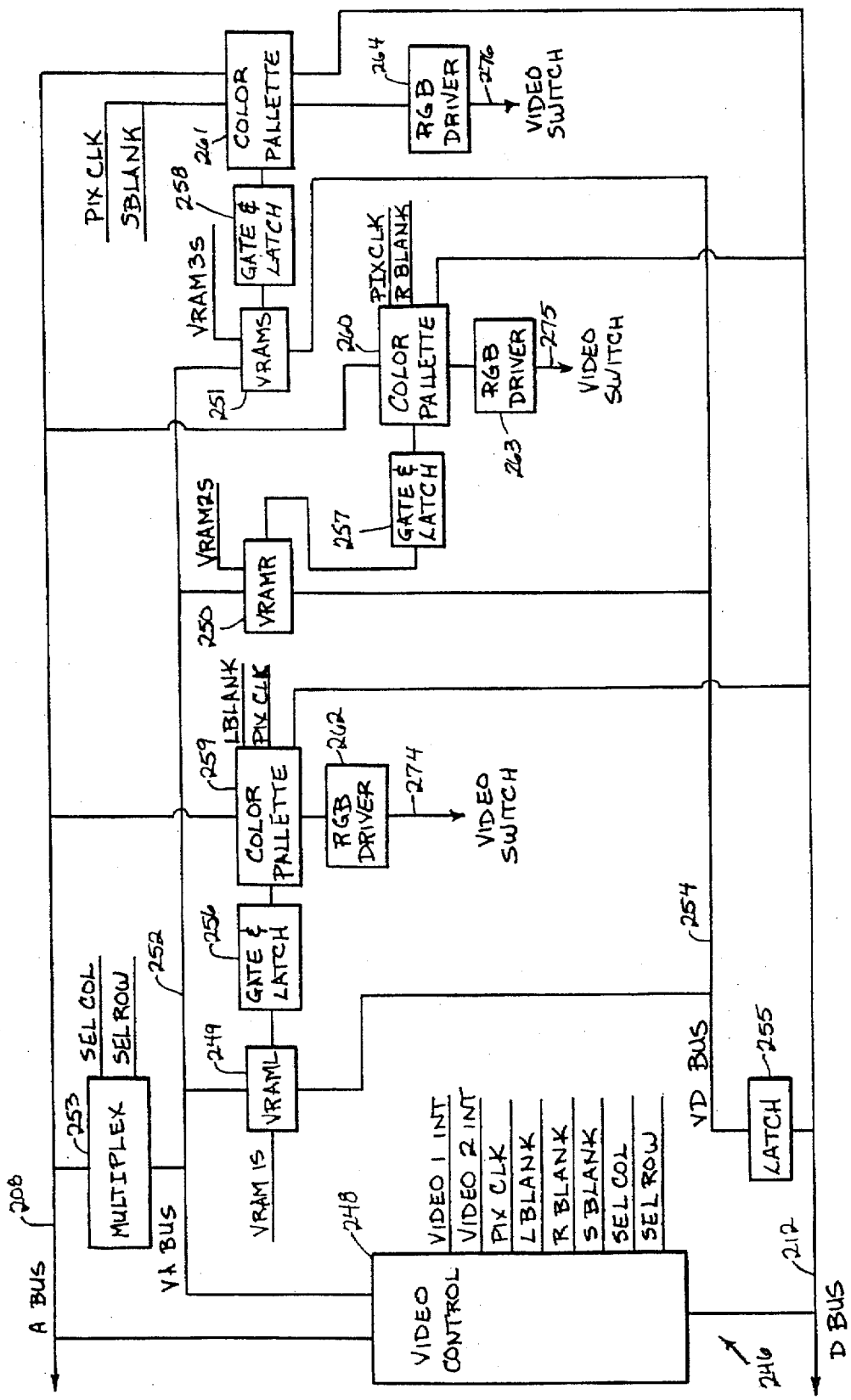

With reference to FIG. 12C, a block diagram representation of a video generator system control circuit 246 is illustrated. The video generator system 246 includes a video control circuit 248 connected to the A BUS 208 for receiving address information from the main CPU. The video control circuit 248 is also connected to the D BUS 212 for transmitting and receiving data to and from the main CPU 200. A multiplexer circuit 253 is connected to the A BUS 208 and to respective column and row select signals SELCOL and SELROW from the video control circuit 248 for multiplexing of address information to a video address bus or VA BUS, 252. Three blocks of video ram memory, VRAML 249, VRAMR 250, and VRAMS 251, associated with the respective displays 20L, 20R and 22 are mapped onto the main CPU address space. Each of the video ram blocks 249–251 comprises a dual port dynamic NMOS RAM, such as a type 41264 memory chip manufactured by NEC Electronics, inc. The 41264 memory chip includes a 64K×4 dynamic RAM port and a 256×4 serial read port. The serial read port is connected to an internal 1,024-bit data register through a 256 word×4 bit serial read output control, each word of which is read out serially four bits at a time.

The multiplexer 253 addresses data stored in the video RAM blocks 249–251 by outputting a video address on the VA BUS 252 connected to each of the video RAM blocks 249–251. Each of the video RAM blocks 249–251 receives a respective video RAM address select signal VRAM1S, VRAM2S and VRAM3S from the address decode and timing circuit 218, See FIG. 12A. The RAM port of each video RAM block 249–251 is connected to a video data bus, or VD BUS 254 which is connected through a latch circuit 255 to the D BUS 212. The latch circuit 255 comprises a conventional type 374 flip-flop and a pair of type 245 transceiver circuits. The serial read output port of each video RAM block 249–251 is connected to a respective gate and latch circuit 256–258. The gate and latch circuits 256–258 include known gating circuits which are operable to place a border color surrounding a video display, and also include a type 374 flip-flop circuit. The gate and latch circuits 256–258 are connected to respective color palette circuits 259–261. The color palette circuits are the Inmos IMS G170 high performance CMOS color look up table circuits. The IMS G170 integrates the functioning of a color palette or look up table, digital to analog conversion and microprocessor interface. The color palette circuit is capable of simultaneously displaying up to 256 colors out of a possible 262,144 colors as by converting an eight bit word per pixel to a color. Each of the color palette circuits 259–261 is connected to the A BUS 208 and the D BUS 212 and includes an RGB type video output port which is connected to a respective RGB driver circuit 262–264. The RGB driver circuits 262–264 are connected to the video switch 73, as is discussed more specifically below, via respective RGB signal lines 274–276. Each of the color palette circuits 259–261 receives a respective blanking signal LBLANK, RBLANK and SBLANK from the video control circuit 248, as well as a PIX CLK signal.

The color palette circuit is a write only device relative to the main CPU 200. The data written to a specific color palette circuit can be the address of a color, the color value, or a pixel mask value. To initialize the color palette circuit or change the value in the look up table, the main CPU 200 writes to the color palette circuit's pixel address register to set the address pointer to the specific color that is to be changed. When the operation is for the initialization of the color palette address, then 0 should be used. The main CPU 200 then performs three successive write operations to the color value register. The least significant six bits of the data are taken from each byte written. The values are then concatenated into an 18 bit word for the color value. The first byte written defines the intensity of the color red, the second specifies the intensity of the color green and the last specifies the intensity of the color blue. After the third write to the color value register, the internal pixel address register increments its value by one. This function is helpful during initialization of the color palette circuit after power up since the main CPU 200 need only right the pixel address register once and then right each successive color value in the above-described sequence.

The color palette circuit contains a pixel mask register. The pixel mask register allows the chip to perform a bit by bit ANDing of the register content and the incoming pixel color from its associated video ram block. This function is useful in altering the display colors without affecting the color values of the video ram blocks. By partitioning the color definitions by one or more bits in the pixel address, graphic animation and color flashing can be produced.

The video control circuit 248 performs three basic functions, namely acting as an interface to the main CPU 200, generating monitor control signals, and acting as a video RAM controller for the video RAM blocks 249–251.

As an interface with the main CPU 200, the video control circuit 248 gates data to and from the main CPU 200 and generates two interrupt signals, VIDEO1 INT and VIDEO2 INT which are transmitted to the interrupt control circuit 224, See FIG. 12A. These interrupt signals are used to notify the main CPU 200 as various positions have been reached during refresh of a monitor 20L, 20R or 22. Specifically, they enable the main CPU 200 to update the data in the video RAM blocks 249–251 after the video system has refreshed associated respective monitors 20L, 20R and 22 with the most recently stored information. The use of this interrupt feature results in the reduction of flicker which occurs on the screen during screen updates. The first such interrupt is a repeating interrupt VIDEO1 INT which occurs during a refresh of the video screen. This refresh can occur at the start or end of either active video or a blanking time. The second interrupt VIDEO2 INT occurs at the beginning of a specific scan line.

In order to control operation of the monitors 20L, 20R and 22, the video control circuit 248 generates appropriate sync and blanking signals. Particularly, a latch circuit controls the blanking of each monitor, with the latch information being available to the main CPU 200 allowing it to independently control the blanking control of each monitor. The video control circuit 248 OR's the composite blanking signal which is required to be present during the retrace time with the latch blanking control lines. The resulting signal on the select lines LBLANK, RBLANK and SBLANK are used to control the blanking of the respective monitors 20L, 20R and 22.

The video control circuit 248 operates as a dynamic RAM controller by periodically refreshing the video RAM memory 249–251, while assuring that the refresh cycle does not interfere with the operation of the monitors. The video control 248 utilizes the video RAM blocks only about five percent of the time thereby allowing the main CPU 200 to have almost immediate access to the memory contents. This results in increase in the main CPU's processing capabilities and reduced latencies in the system.

With reference to FIG. 12D, a block diagram represents a peripheral interface circuit for the gamemaker 74 and the manager's computer 32. A serial input/output interface is provided using a dual universal asynchronous receiver transmitter, or DUART, 265 which is connected to the BD BUS. The DUART 265 comprises a Zilog Z80 SIO Serial Input/Output Controller. The DUART includes two independent full-duplex channels. The DUART 265 converts parallel data from the BD BUS 217 to serial data for an A port and a B port and vice versa. Channels A and B of the DUART 265 are connected to respective RS422 converter circuits 266 and 267 when configured as a gamemaker 74, or respective RS232 converter circuits 266' and 267' when configured as a manager's computer 32. For the gamemaker 74 application the channel A converter 266 is connected to the video switch 73. When used as a manager's computer 32, the channel A converter 266' is connected to the modem 36, and the channel B converter 267' is connected to the league record service computer 34. The DUART 265 is enabled by a serial input/output select, or SIOS, signal from the address decoded timing circuit 218, see FIG. 1. When the DUART 265 needs to transmit data on the BD bus 217, it generates a serial I/O interrupt signal SIOINT which is transmitted to the interrupt control 224.

In order for the manager's computer 32 to interface to a hard disk and a floppy disk a conventional SCSI port 268 is connected to the BD bus 217. The SCSI port 268 provides an interface to a small computer systems interface bus 269 covered by ANSI standard X3T92 which provides for a standardized interface and command set between manufacturers of hard and floppy disks, as well as controller boards.

The SCSI port 268 receives a SCSI select signal from the address decoder and timing circuit 218, See FIG. 12A, and generates a SCSI Int signal to the interrupt control 224. The SCSI port 268 is coupled to a hard disk 270 and a floppy disk 272. The floppy disk 272 is utilized to load new software into the system such as new games which have been developed and to provide for back up of data or programs from the hard disk 270. As discussed more specifically below, the hard disk 270 stores game programs for a plurality of different bowling games, the operating system for the manager's computer 32, a historical record comprising pin fall and ball trajectory information for the last ten bowling games played at each lane, and a system error log.

COM LINE INTERFACE

In order for any device in the bowling center system to communicate on a COM line, such device must be connected to its associated COM line using a communications interface circuit. Particularly, an RS232 communications interface circuit 38 is used to connect preselected devices to the manager's local COM line 29, see FIG. 2, and a similar RS232 communications circuit 78 is used to connect the keyboard 24 to the gamemaker local COM line 75. With reference to FIG. 13 a block diagram represents a circuit for the RS232 communications interface circuits 38 and 78.

The communications interface circuit 78 or 38 uses a serial COM CPU 300. The COM CPU 300 includes a serial port which is connected through a conventional RS485 interface circuit 302 and an optical isolator circuit 304 to its respective COM line 75 or 29. The serial COM CPU 300 is the Intel 8344 remote universal peripheral interface processor, discussed above relative to the gamemaker 74, configured to serve as a slave station on the COM line 75 or 29. A conventional clock circuit 306 and a conventional watchdog timer circuit 308 are connected to the COM CPU 300 to assure proper operation thereof.

The parallel port of the COM CPU 300 is connected to a bus 310. The bus 310 is connected to an EPROM 312 and a RAM 314. The bus 310 carries address and data signals thereon. Particularly, the address signals address memory locations in the EPROM 312 and RAM 314. The data signals relate to requests received from the particular device connected thereto, e.g., the remote area keyboard 44, to be transmitted on the COM line 29, or commands received over the COM line 29 to be transmitted to the particular device, e.g., printer commands to the printer 46. The EPROM 312 stores a program for operating the COM CPU 300 in a conventional manner to implement the bidirectional transfer of data between the bus 310 and the associated COM line 75 or 29. The RAM 314 operates as a buffer for storing data to or from the COM line 75. A station address circuit 316 is connected to the bus 310 for transmitting the station addresses of the particular slave station to its associated COM CPU 300.

Also connected to the bus 310 is a universal synchronous/asynchronous receiver transmitter, or USART, 318. The USART is a bidirectional transceiver that converts parallel data from the bus 310 to serial data at a serial port, or vice versa. The USART serial port is connected to a standard RS232 converter circuit 320 for connection to external devices which communicate according to the RS232 serial communications standard. Particularly, in the present system, the RS232 converter circuit 320 is used to connect the gamemaker local COM line 75 to the keyboard 24. The interface circuit 38 for the manager's local COM line 29 connects the converter circuit 320 to the video switch 40, the printer(s) 46, the DTS interface 48, and the video source devices 52.

A keyboard interface circuit 322 includes a parallel port connected to the BUS 310. The keyboard interface circuit 322 is connected to the manager's keyboard 44, and receives serial data therefrom as keys are depressed. The circuit 322 is operable to convert the keyboard data to a parallel format for transmission on the bus 310.

BOWLER INPUT STATION

Figure 14:
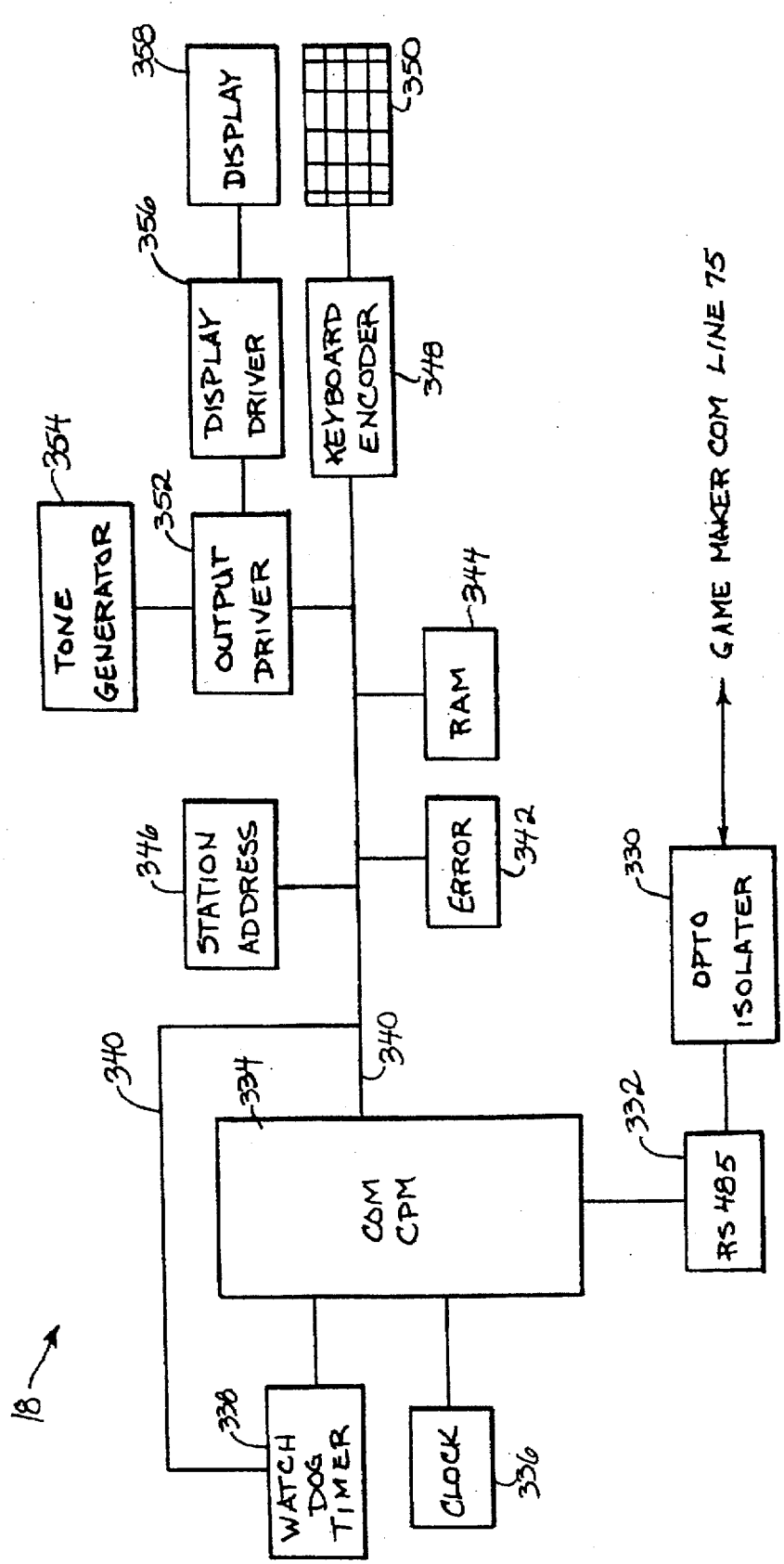
FIG. 14 is a block diagram representation of a bowler input station.

With reference to FIG. 14, a block diagram represents a circuit for the bowler input station 18 which is connected to the gamemaker 74 over the local COM line 75. The bowler input station 18 is used to provide bowler interaction to the bowling game operation, as is discussed herein. The bowler input station 18 includes a keyboard 328, see FIG. 15 below, which is used by a bowler to enter information or requests to the gamemaker 74.

The bowler input station 18 includes an optical isolater circuit 330 connected to the local COM line 75 and to a conventional RS485 converter circuit 332. The converter circuit 332 is connected to a serial port of a COM CPU 334. The COM CPU 334 is the Intel type 8344 processor discussed above, which serves as sub-system controller to the local COM line 75. The COM CPU 334 is configured as a slave station. A conventional clock circuit 336 and a conventional watchdog timer circuit 338 are connected to the COM CPU 324 to assure proper operation thereof.

The COM CPU 334 includes a parallel port which is connected to a local bus 340. The bus 340 is connected to an EPROM 342 and a RAM 344. A station address circuit 346 is connected to the bus 340 for providing a COM line station address to the COM CPU 334.

The bus 340 transmits both address and data signals thereon. Particularly, the address signals address memory locations in the EPROM 342 and the RAM 344. The data signals relate to the bowler requests to be transmitted over the local COM line 75, or status information received over the local COM line 75. The EPROM 342 stores a program for operating the COM CPU 334 in a conventional manner to implement the bidirectional transfer of data between the bus 340 and the COM line 75. The RAM 344 operates as a buffer for storing the data to or from the COM line 75.

Figure 15:
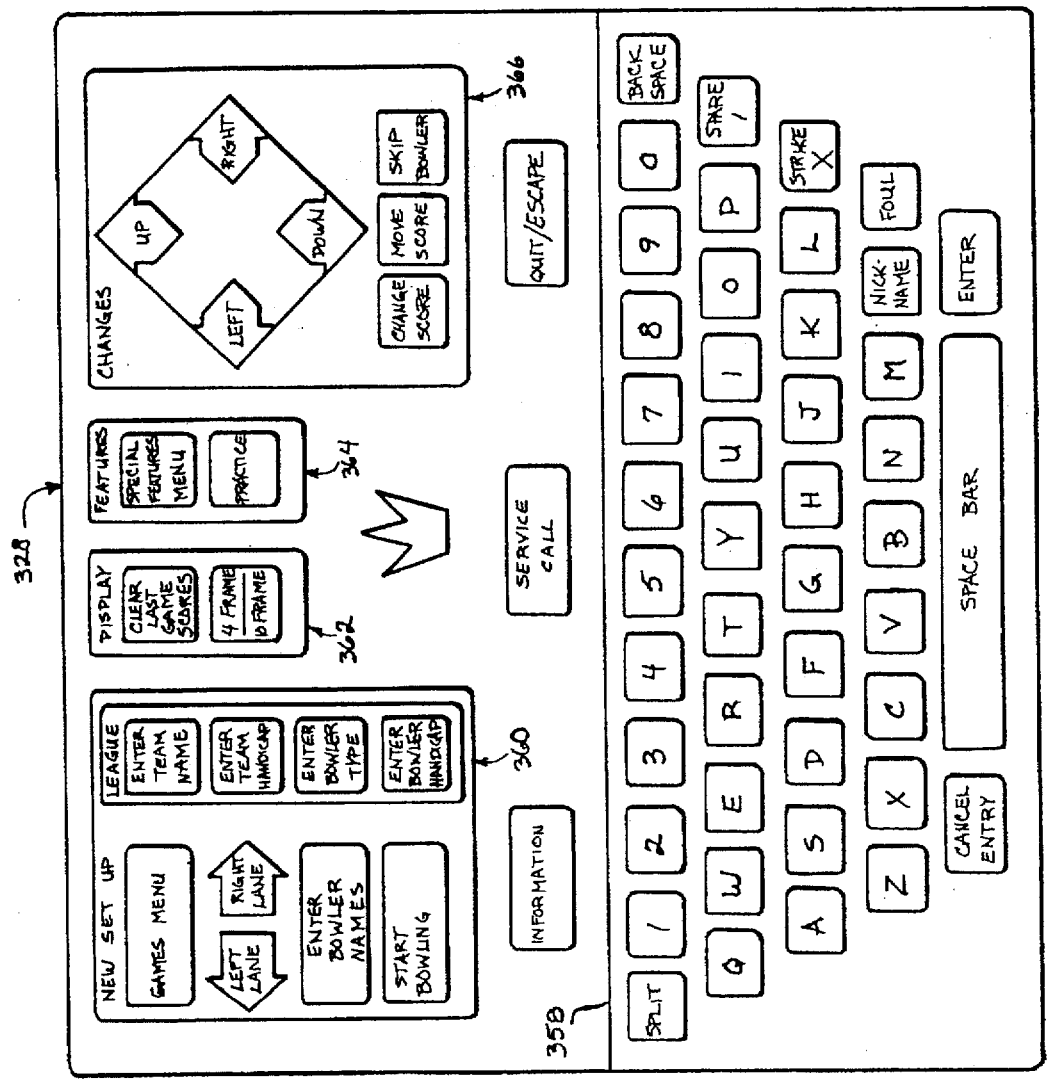
FIG. 15 illustrates a bowler input station keyboard overlay.

A keyboard encoder circuit 348 connects the bowler input station keyboard 328, See FIG. 15, to the bus 340. The keyboard 328 is a conventional membrane type keyboard including a matrix of switches 350. The keyboard encoder circuit 348 senses when a key is pushed and generates an encoded signal for transmission on the bus 340. An output driver circuit 352 is coupled to the bus 340. The output driver circuit 352 includes output ports connected to a tone generator 354 and a display driver circuit 356. The display driver circuit 356 operates a display device 358 comprising a plurality of illuminating devices which serve to backlight selected translucent key positions on the keyboard 328. The tone generator 354 generates an audible sound.

With reference to FIG. 15, a membrane keyboard overlay 328 for the bowler input station 18 is illustrated. Particularly, the keyboard 328 includes a conventional alphanumeric "QWERTY" key section 358, a "New Set-Up" key section 360, a "Display" key section 362, a "Features" key section 364 and a "Changes" key section 366.

The function of any key in the above-described key sections is dependent upon the selected game software being utilized to operate the gamemaker 74. Illustratively, the alphanumeric key section 358 may be used for entering information such as bowler names or the like. The "New Set-Up" key section 360 may be used to initiate the playing of a bowling game and enter league bowling information. The "Display" key section 362 may be used for modifying configuration of the scoring display shown on the overhead display 20. The "Features" key section 364 may be used to permit a bowler to request practice bowling or to request a special features bowling menu. The "Changes" key section 366 may be utilized in a bowler input station 18 which is configured to perform score correction. If score correction is not permitted from a particular bowler input station 18, then the changes key section 366 is omitted from the overlay 328.

If a particular key is depressed, then an associated switch from the matrix 350 is actuated. The encoder circuit is operable to encode the keystroke to a parallel data signal representative thereof.

The bowler input station 42 at the manager's control desk is similar to the bowler input station 18, discussed above, and generally includes the "Changes" key section 366. Resultantly, interaction with a gamemaker 74, for example for score correction, can be implemented at the manager's control desk, as discussed more specifically below.

When a bowler first enters the bowling center, the bowler must proceed to the cashier prior to beginning play. After suitable paying arrangements have been made, then the lane control 16 is set up to permit bowling.

When the bowler is ready to begin play, the bowler utilizes the keyboard 328 at the bowler input station 18 to initiate play. Under the game control, the bowler input station 18 operates in a "user friendly" mode, whereby the display devices 358 are utilized to step the bowler through the selection options available at any given time.

An example of a bowler initiating operation of a bowling game consist of the bowler proceeding to the bowler input station 18, whereat the "left lane" and "right lane" keys are flashing. Flashing keys indicate that the bowler can select which lane a subsequent request relates to. After depressing one of the lane keys, a "games menu" key and an "enter bowler name" key are illuminated. If the bowler wishes to play the game currently loaded, the "enter bowler name" key is depressed and the bowler enters the names of the bowlers. Alternatively, if a new game is to be played, then the "games menu" key is depressed. Responsive thereto, the game's menu is displayed on the selected lane overhead monitor 20L or 20R. The bowler selects the game by entering a reference number associated with the particular game. Upon selecting a game, the game program is then downloaded, as discussed below, from the manager's computer 32 to the gamemaker 74. Once the game has been downloaded, the "left lane" and "right lane" keys are again flashing. In order to enter the bowler names, the proper lane key is depressed and the "enter bowler name" key is lit instructing the bowler to enter the names. After the names have been entered, the bowler again depresses the particular lane key and depresses the "start bowling" key. Resultantly, the gamemaker 74 commands the gamesetter 76, and thus the pinsetter 14, to begin operation for the first frame.

VIDEO SWITCH

The respective video switches 40 and 73, associated with the manager's computer 32 and the gamemaker 74, select and route the gamemaker generated video signals and global video program signals from the video source devices 52 to a selected monitor associated with a lane pair control 16. In addition, signal conditioning to maintain video levels, composite to RGB decoding, and RGB to composite encoding are performed. The encoded RGB is available to be sent to the manager's computer 32 for score correction or, during tournament mode when the scoring display for a lane or lane pair is distributed through the house on the global video lines 61, for display on other selected monitors. Audio signals which are transmitted with the video signals from the video devices 52 are switched to the monitor used to display the associated video. Audio programs are usually associated with the remote terminal 21. Selection of the operating configuration of the seven VIDEO IN ports, the gamemaker, or manager's computer, RGB drive signals, the AUDIO IN ports, the RGB monitor output and the three SCORE OUT ports is controlled from the manager's computer 32 or the gamemaker 74 via a serial communications line.

Although the system herein is described using seven global video lines 61 and seven global audio lines 68, the system could readily accommodate eight lines of global video and global audio. Similarly, by appropriate switching done at the manager's computer 32, additional video source devices 52 could be provided for selective coupling to the global video and audio lines 61 and 68, respectively. Moreover, with the addition of suitable circuits in the video switches, additional global video or audio lines can be utilized.

Figure 16:
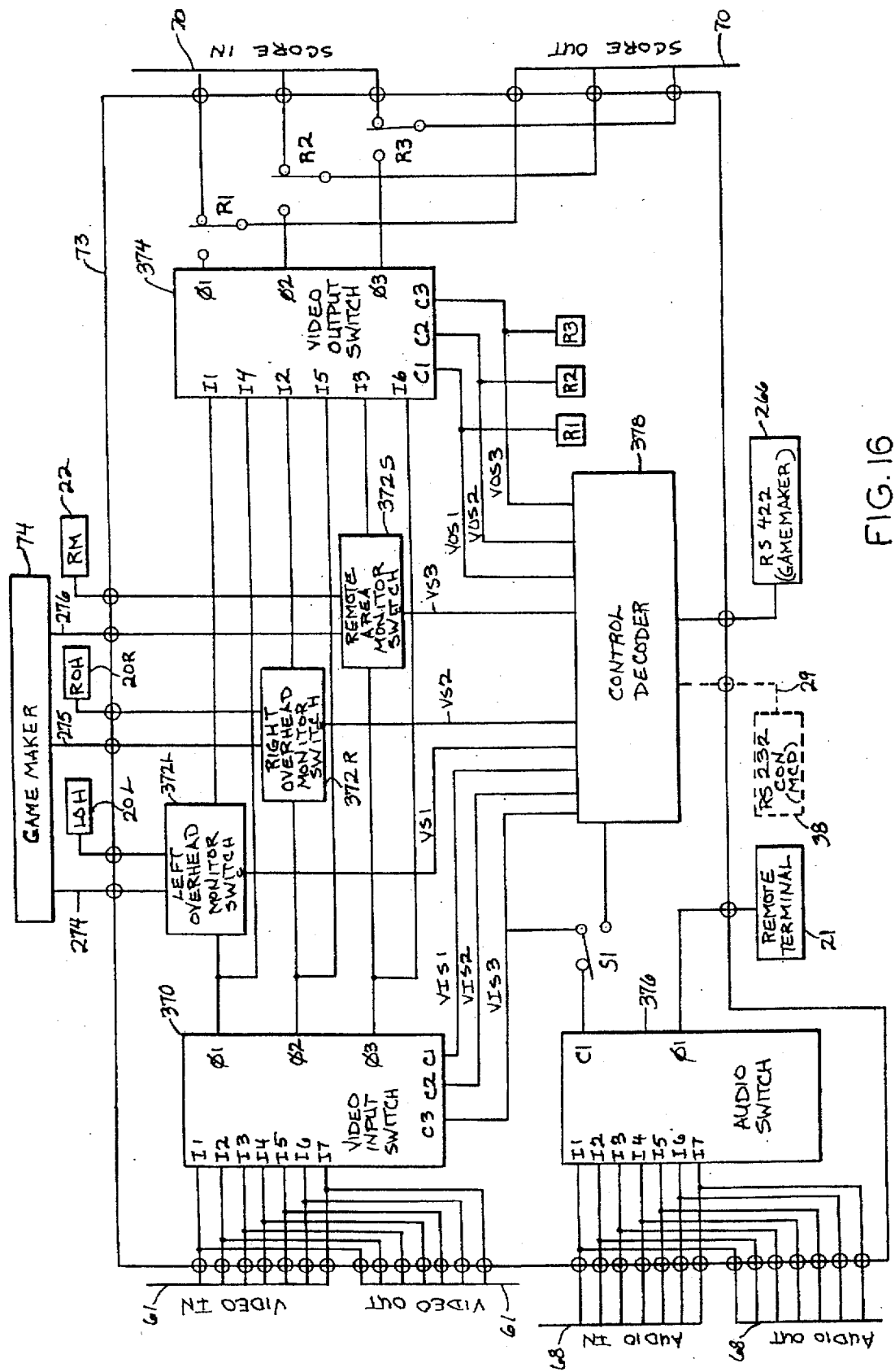
FIG. 16 is a block diagram representation of a video switch according to the invention.

With reference to FIG. 16, a block diagram illustrates a circuit for the video switch 73, see FIG. 3. The manager's control video switch 40 is identical to that for the gamemaker 74 and is not discussed in detail herein. The video switch 73 includes a video input switch block 370, three video monitor switch blocks 372L, 372R and 372S and a video output switch block 374, as well as an audio switch block 376 and a control decoder block 378.

The video input switch block 370 includes seven input channels I1–I7, one for each of the seven global composite video lines 61 driven by the video driver circuit 56 at the manager's control desk, see FIG. 2, connected to the seven VIDEO IN ports. The seven VIDEO IN ports are also connected in series with the seven VIDEO OUT ports. Therefore, each input channel I1–I7 is dedicated to one of the seven global composite video lines 61. The video input switch block 370 includes three output channels θ1–θ3, and three control channels C1–C3. The three output channels θ1–θ3 are respectively connected to the three video monitor switches 372L, 372R and 372S and to the video output switch 374. The control channels C1–C3 are connected to the control decoder 378. The video input switch 370 is operable to connect any of the output channels θ1–θ3 to any of the input channels I1–I7 responsive to control signals received from the control decoder 378 at the respective control channels C1–C3. Particularly, the first control channel controls the switching of output channel θ1 to selectively connect it either to no input channel or to any one of the seven input channels I1–I7. Control of switching to output channels θ2 and θ3 is similarly determined according to signals present at respective control channels C2 and C3.

Figure 17:
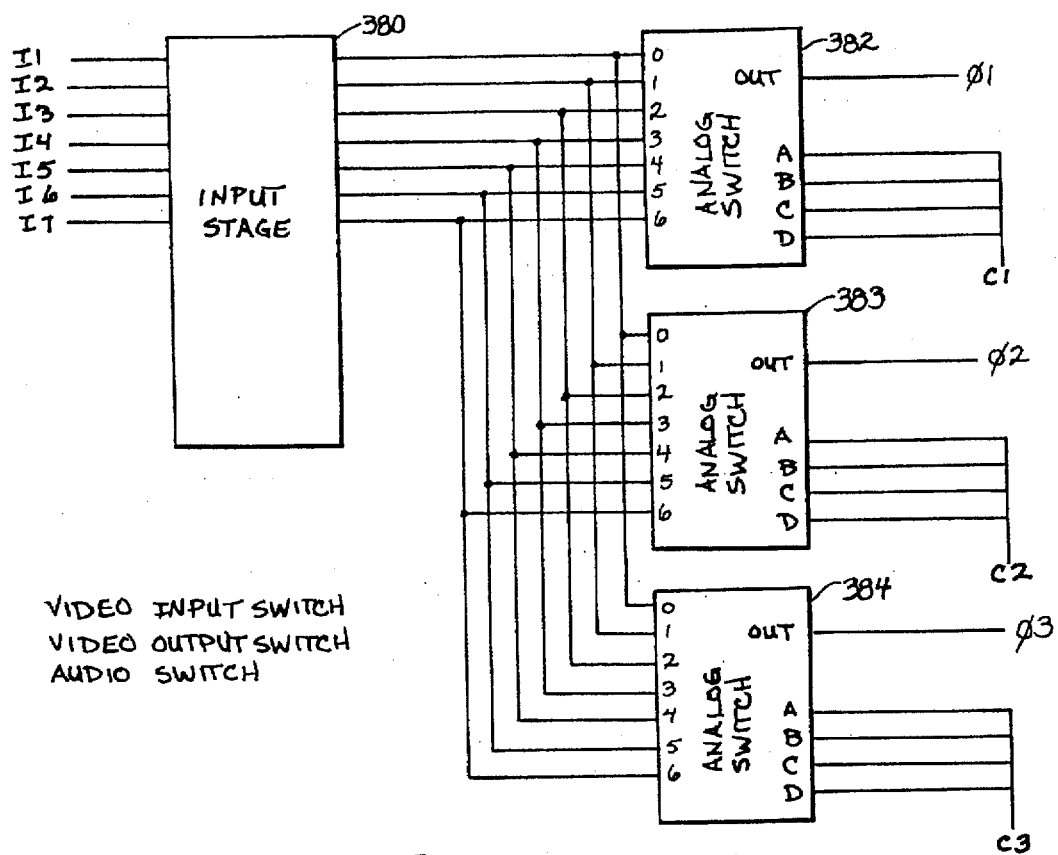
FIG. 17 is a block diagram of a circuit for the video input switch block, the video output switch block and the audio switch block of FIG. 16.

With reference to FIG. 17, a block diagram illustrates a control circuit for the video input switch 370. Each of the input signals received at the seven input channels I1–I7 comprises a composite video signal. The seven composite video signals are coupled through an input stage circuit 380 to three analog switches 382–384. The input stage provides isolation for the composite video signals and comprises Darlington amplifiers followed by emitter follower circuits.

Each of the analog switches 382–384 comprises a type 4051 analog switch, such as the Motorola type MC14051. Each of the analog switches 382–384 includes an OUT terminal connected through a conventional gain stage which normalizes the signal level to the respective output channels θ1, θ2, θ3. Each analog switch 382–384 also includes A, B, C and I terminals connected to the respective control channels C1–C3. The A, B and C terminals receive a three digit binary signal for selecting which of the eight input signals is to be connected to the OUT terminal. The I terminal is an inhibit terminal and when enabled prevents any of the input terminals from being coupled to the OUT terminal.

The three video monitor switches 372 utilize identical circuits. Such a circuit is illustrated in block diagram form in FIG. 18. Each monitor switch 372 includes a conventional composite to RGB converter circuit 385, an analog switch 386 and a conventional RGB to composite video converter circuit 388. The composite to RGB converter circuit 385 is connected to and receives a composite video signal from one of the video input switch 370 respective output channels θ1–θ3 and converts composite video signal therefrom to an RGB video signal. The RGB output of the converter circuit 385 is connected to the analog switch 386. Also connected to the analog switch 386 are the RGB video signals over one of the signal lines 274–276 from the respective gamemaker RGB video drivers 262–264, see FIG. 12C. The analog switch 386 comprises two type 4053 eight channel multiplexer-demultiplexer circuits, such as the Motorola type MC14053. The type 4053 circuit includes eight input channels and three output channels which are suitably interconnected in response to a three digit binary control signal received at the three control terminals. An inhibit terminal is also included for precluding any interconnection. The control terminals and inhibit terminals are connected to the control decoder circuit 378 which operates the analog switch to connect either the RGB signal from the gamemaker 74 or from the composite RGB converter circuit 385 to the output terminals thereof. The inhibit terminal is enabled when it is desired that the associated display monitor 20L, 20R or 22 be blank. The selected RGB signal at the output terminal is buffered and amplified in a conventional manner. The analog switch output terminals are connected to its associated monitor 20L, 20R or 22 and also to an RGB to composite converter circuit 388. The RGB to composite converter circuit 388 provides the encoding of any RGB signal being displayed on the associated monitors, 20L, 20R or 22 into a composite color signal. This converted signal is transmitted to the video output switch 374 and may be ultimately routed to the manager's computer 32 for score correction purposes or used for distribution on the global video line 61 during tournament play.

The video output switch block 374 includes six input channels I1–I6. The first three input channels I1–I3 are connected to the RGB composite converter 388 of the respective video monitor switches 372L, 372R and 372S. The last three input channels I4–I6 are connected to the respective output channels θ1–θ3 of the video input switch 370. The video output switch has three output channels θ1–θ3 connected to a normally open fixed contact of respective relay switches R1–R3. The relay switches R1–R3 also include a normally closed fixed contact connected to the three SCORE IN ports and a moveable contact connected to the three SCORE OUT ports. The position of a particular relay switch moveable contact determines whether or not its associated SCORE IN port is connected in series with an associated SCORE OUT port or its associated SCORE OUT port is connected to its associated video output switch output channel.

The video output switch 374 includes three control channels C1–C3 connected to the control decoder 378. The control channels are also connected to the relays R1–R3. A signal at each of the control channels C1–C3 determines what input channel I1–I6, if any, is connected to its respective associated output channel θ1–θ3. Also, the relays R1–R3 and thus relay switch contacts R1–R3 are operated according to the signal received at the respective control channel C1–C3. For example, if the signal at the first control channel C1 indicates that no input channel I1–I6 should be connected to the first output channel θ1, then the first relay switch contact R1 remains in its normal position connecting its associated SCORE IN and SCORE OUT ports so that the particular video score transmission line effectively bypasses the video switch 73. If, instead, the signal at the first control channel C1 indicates that the first output channel θ1 is to be connected to, for example, the first input channel I1, then this connection is made in a conventional manner, and the moveable contact of the first relay switch contact R1 is switched to connect the first output channel θ1 to the SCORE OUT port and thus to the video score transmission line 70. Therefore, the composite video signal received at the first input channel I1 from the RGB to converter circuit 386 is transmitted over the video score transmission line 70 to the VIDEO IN port of the video switch 40 at the manager's control desk. This feature is utilized in tournament bowling when it is desired to display scoring information from a particular lane or lane pair to the manager's control 26 to be retransmitted throughout the bowling center for display at other monitors. Also, this feature is utilized for providing score correction wherein the video scoring display associated with a particular lane is transmitted to the manager's control 26 for display on the manager's control desk monitor 72 to enable an operator to correct scoring information, as is discussed more specifically below.

The video output switch 374 uses a circuit similar to that of the video input switch 370. This circuit is described hereinabove relative to the block diagram of FIG. 17.

The audio switch block 376 includes seven input channels I1–I7. Each of the seven input channels I1–I7 is connected to the series connected AUDIO IN and AUDIO OUT ports which are connected to the seven audio transmission lines 68 from the audio driver circuit 62, see FIG. 2. The audio switch 376 includes a control channel C1 connected to a moveable contact of a manually operated switch S1, and an output channel θ1 connected to the remote monitor 22. The audio switch 376 is operable to connect the output channel θ1 to none or any of the seven input channels I1–I7 dependent on the signals received at the control channel C1. The audio switch 376 uses a circuit similar to that of the video input switch represented by the block diagram of FIG. 17. However, since only a single output channel is used only one type 4051 analog switch is required. Also, the input stage 380 provides for capacitive isolation and balancing to ground and uses differential input amplifiers for each line.

With reference to FIG. 19, a block diagram represents a control circuit for the control decoder 378 of FIG. 16. The control decoder 378 functions as the interface between the gamemaker 74 or the manager's computer 32 and the video switch switching circuits.

Switching commands for defining a video signal transmission path are received at an RS422 converter circuit 390 from the gamemaker 74 for its associated video switch 73 or at an RS232 converter circuit 392 from the manager's local COM line 29 for its associated video switch 40. Received serial data is processed by a universal asynchronous receiver/transmitter or UART 394 which converts serial data to parallel data. The UART 394 may be, for example, a conventional type AY1015 UART. The parallel data port of the UART 394 is connected to a decoder circuit 396 and a latch circuit 398. The decoder circuit 396 comprises a conventional type 138 three line to eight line decoder/ demultiplexer. The latch circuit 398 comprises eight conventional type 259 eight bit addressable latch circuits. The latch circuit 398 develops up to sixty-four individually addressable outputs. The addressable outputs control the switching of the switch blocks 370, 372, 374 and 376 to implement the desired video switching arrangement.

The sixty-four available addressable outputs are selectively associated with ten control signal lines. First, second and third video input switch signal lines VIS1, VIS2 and VIS3 are coupled to the three control channel C1–C3 of the video input switch block 370. Therefore, each signal line VIS1, VIS2 and VIS3 includes four addressable outputs for connection to the A, B, C and I terminals of the three analog switches 382–384, see FIG. 17. The third video input signal VIS3 is also connected to a normally closed fixed contact of the switch S1. An audio switch signal line AS is coupled to a normally open fixed contact of the switch S1. The switch S1 is manually set so that in the normal position the audio switch control input C1 is connected to the third video input switch signal line VIS3. Resultantly, the signal on the third video input switch line VIS3 controls both the third output channel Θ3 of the video input switch 370 and the output channel Θ1 of the audio switch 376, both of which are coupled to the remote terminal 21. This results in only one signal being required to simultaneously switch audio and video signals over the respective video transmission line 61 and audio transmission line 68 to the remote terminal 21. Alternatively, the switch S1 is operable to control the audio switch 376 according to a signal present on the audio signal line AS independent of the video input switch 370. This feature can be utilized, for example, if an operator using a microphone wishes to speak to an individual at the remote terminal 21.

The control decoder 378 is connected to the video monitor switches 372L, 372R and 372S over respective video switch signal lines VS1, VS2 and VS3 to control the respective positions of the associated analog switch 386, as discussed above. The control decoder 378 is connected to the control channels C1–C3 of the video output switch 374 and to the three relays R1–R3 over three video output switch signal lines VOS1, VOS2 and VOS3 to control the switching of the video output switch 374, as discussed above. Each of the video monitor and output signal lines VS1, VS2, VS3, VOS1, VOS2 and VOS3 is connected to four addressable outputs for operating their associated switches 386, see FIG. 18, or switches 382–284, see FIG. 17.

The control decoder circuit 378 includes conventional power up reset circuitry and a clock circuit. The received serial input to the UART 394 is converted to eight bit parallel data. Three of the parallel data lines are sent to the decoder circuit 396 for selecting one of the eight type 259 addressable latch circuits. Four data lines from the UART 394 are applied to the address and data inputs of the type 259 addressable latch circuits. Each of the eight addressable latches provide eight outputs, thus providing for the sixty-four available addressable output channels.

In normal bowling operation, the control decoder 378 controls the analog switch 386 of the video monitor switches 372 so that video signals developed at the gamemaker 74 are transmitted to the associated monitors 20L, 20R and 22. Normally, the video input switch 370 and audio switch 376 provide no interconnections between their associated input and output channels. Similarly, the video output switch 374 normally does not transmit information to the score transmission lines 70. If it is desired to transmit video signals, and in the case of the remote terminal 21 an audio signal, from a video source device 52 to a particular gamemaker monitor, then the control decoder 378 controls switching of the video input switch 370 and the video monitor switch 372 to appropriately provide a communication path from the global video line 61 connected to the selected video source 52, see FIG. 2, generating the desired video signal, to the selected monitor. For example, if it is desired to play a video tape loaded in the video source 52 connected to the fourth video transmission line 61 for display on the remote monitor 22, then the control decoder 378 provides a command over the third video input switch signal line VIS3, which results in an interconnection between the fourth input channel I4 and the third output channels Θ3 of the video input switch 370. Also, the signal over the third video switch signal line VS3 causes the analog switch 386 of the third video monitor switch 375 to connect its first input to the output so that the composite video signal on the fourth video transmission line is converted to RGB video at the converter circuit 385 and is subsequently transmitted to the remote monitor 22 for display. The above described switching arrangement for displaying a video program from a source device 52 is also used in the tournament mode. However, in the tournament mode the global video line 61 transmits a score sheet display originally generated at a gamemaker 74 which is transmitted over a score transmission line 70 to the manager's video switch 40 which connects the score transmission line to a global video line, as discussed below. The operation of the video output switch 374 for transmitting the video information from the gamemaker 74 to the manager's control 76 is discussed hereinabove.

within the bowling center system, the video switches 73 associated with multiple lane pair controls 16 can be used to simultaneously display information from a single video transmission line 61. This is generally done if a particular video transmission to each lane pair control 16 is commenced simultaneously. Otherwise, switching may be controlled so that the first video switch 73 to utilize a particular video transmission line has exclusive use until transmission has been completed at which time another video switch 73 can be switched to receive the video information. Conversely, only a single video switch 73 can acquire a video score transmission line 70 at any given time.

REMOTE AREA TERMINAL

With reference to FIG. 20, a block diagram representation is illustrated for the remote area terminal 21 which comprises the remote area monitor 22 and keyboard 24. The remote area monitor 22 is a conventional RGB type monitor which receives Red, Green, Blue and Sync signals from the video switch 73, specifically the monitor switch 372S, to drive the monitor 22. The remote area monitor 22 is capable of displaying 640 by 204 pixels with one byte of data per pixel. The display simultaneously displays up to 256 different colors on the screen. Also, a speaker 390 is connected to the video switch 73 for playing audio information responsive to audio signals received from the audio switch 376 of the video switch 73.

The remote area keyboard 24 includes a total of sixteen keys organized in three groups. Ten numeric keys are organized in a telephone style key pad format with the keys being labeled with the numbers 0–9. Four predefined function keys are provided with the labels "ADVANCE", "ACTIVITIES", "RETURN" and "ENTER" thereon. Two additional undefined function keys are provided. Pressing any of the keys results in the generation of a particular data signal. Serial data representative thereof is transmitted from the RS232 communications interface circuit 78 to the local COM line 75.

BALL TRAJECTORY UNIT

The ball trajectory unit 80 comprises a video tracking device as manufactured by Micronyx, Inc. The ball trajectory unit comprises a video camera installed, for example, between the overhead monitors 20L and 20R and aimed at both lanes in the lane pair. The ball trajectory unit includes a control circuit responsive to video image signals generated by the camera for storing data representative of ball positions and velocity as it moves down the lane. The ball trajectory unit 80 also includes a communication circuit, similar to that illustrated in FIG. 13 hereof for interfacing to the local COM line 75. Such a ball tracker is described in Gautraud et al pending application, entitled "Video Tracking and Display System", Ser. No. 170,268, filed Mar. 18, 1988, which is owned in part by the assignee of the present invention and the specification of which is hereby incorporated by reference herein. In addition to the above, the ball trajectory unit 80 could be used to obtain pin fall data for use by the gamemaker 74 under the control of a game control program.

The ball trajectory unit 80 transmits to the gamemaker 74 upon request a trajectory data set consisting of parameters measured during the period of time the bowling ball is in motion on the lane surface. Each data set is a record consisting of eight center of ball x-y grid locations in one/sixteenth of an inch units measured at or near predefined zones, center of ball x-grid location at forty-five feet, foreground and background velocities in tenths of miles per hour, and entry angle to the pin area in tenths of a degree. The ball trajectory data is transmitted to the gamemaker 74 over the COM line 75. The data received at the gamemaker 74 is stored for subsequent retrieval and display by a remote terminal user and may be displayed on either or both overhead monitors 20L and 20R under game control. Within the gamemaker memory, a large trajectory data storage requirement is established. Some or all of this data is transmitted to the manager's computer 32 and the league record service computer 36. Memory is included in the gamemaker 74 to store trajectory data for an entire league ten pin match. Therefore, data storage requirements are determined by each game, assuming the existence of sufficient memory as the game has requested.

Figure 21:
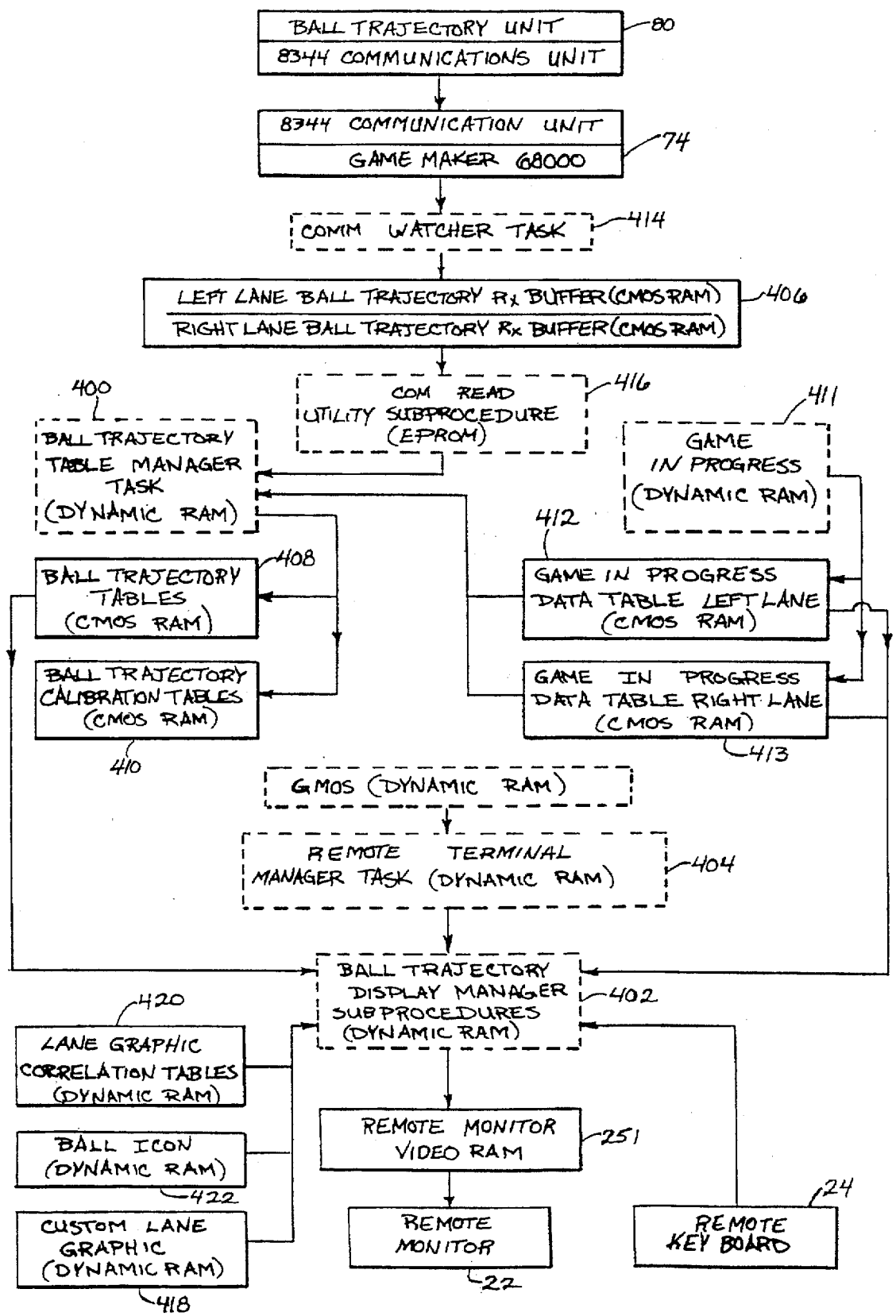
FIG. 21 is a ball trajectory data management schematic diagram.

With reference to FIG. 21, a block diagram represents a ball trajectory data management schematic. In the block diagram, those blocks formed of solid lines represent hardware devices, including memory portions within the gamemaker 74, while those blocks formed of dashed lines represent software tasks or routines.

The ball trajectory management system consists of two separate and distinct modules referred to as the ball trajectory table manager 400 and the ball trajectory display manager 402. The ball trajectory table manager 400 is an independent task which is downloaded by the manager's computer 32 to the gamemaker 74 as a structural segment of the remote terminal manager task 404. This module is spawned as a stand-alone task by the remote terminal manager 404 during terminal manager initialization and remains resident in a portion of the memory partition related to the remote monitor 22.

The ball trajectory table manager task 402 monitors ball trajectory received message buffers 406 maintained by the COM line 75; updates and maintains a ball trajectory data table 408 located in the DRAM 202; updates and maintains a ball trajectory calibration table 410 located in CMOS RAM 206; downloads ball trajectory calibration data to the ball trajectory unit 80 upon request; and relays ball trajectory unit hardware status to the manager's computer 32 upon receipt of a system failure detect message from the ball trajectory unit 80.

The ball trajectory display manager 402 is a set of subprocedures which are treated as an integral portion of the remote terminal manager task 404. The control is passed to the ball trajectory display manager 402 upon request for a ball trajectory display from the remote keyboard 24. The ball trajectory display manager 402 verifies the validity of the ball trajectory calibration table 410, transforms ball trajectory information from the ball trajectory unit 80 to a lane graphic frame of reference and manages the remote monitor 22 during ball trajectory display operations.

The procedure for the ball trajectory table manager task 402 for data transfer consists of maintaining tables for the left and right lane, 412 and 413 respectively, and initiating requests for ball trajectory data upon receipt of a ball delivered signal from a game in progress task 411. The ball trajectory unit 80 replies to such a request by transmitting a ball trajectory data set over the local COM line 75. A COM watcher task 414 transfers a received message to the ball trajectory right or left lane message buffer 406 located in the CMOS RAM 206. The ball trajectory table manager task 400 is awakened periodically by the gamemaker operating system and calls a COM READ utility sub-procedure 416 located in the EPROM 204. If the COM READ returns a value of zero, then no message is pending. Otherwise, if the COM READ procedure 416 returns a non-zero positive integer, then there is a data message pending. Thereafter, the ball trajectory table manager task 400 determines from the game control program which bowler the data is associated with, and transfers ball trajectory data to the appropriate ball trajectory table 408 in CMOS RAM 206.

The ball trajectory display manager task 402 is utilized when a user at the remote keyboard 24 selects a ball trajectory display menu item, as discussed more specifically below. Upon such a request, the remote terminal manager task 404 transfers control to the ball trajectory display manager 402. The ball trajectory display manager 402 begins by calling a menu display utility to display a menu consisting of a numbered list of left lane bowler names on the left side of the screen and right lane bowler names on the right side of the screen, and calls a remote area terminal utility to request the number entered by the user corresponding to the bowler name whose trajectory is to be displayed. If the user enters a valid number on the keyboard 24, then the display manager 402 generates a pointer to a custom lane graphic image 418 stored in the DRAM 202; transfers the custom lane graphic image 418 to the remote monitor video RAM 251; generates a pointer to the ball trajectory buffer 406 for the specified lane and bowler; generates a pointer to the ball trajectory calibration table 410; generates a pointer to a lane graphic correlation table 420 in the DRAM 207; and generates a pointer to the ball trajectory data table 408.

If a calibration update is in progress for the designated lane, or a data record update is in progress for its designated bowler, or the requested data record is not currently present in the data table, or the data present fails to meet the established validity criteria, then an indication is displayed on the remote monitor 22 that the requested ball trajectory data is not currently available. Otherwise, the display manager 402 transforms the data in a known manner to a display frame of reference using the calibration and correlation data tables 410 and 420 respectively; retrieves ball Icons from a memory block 422; and generates and transfers the ball Icons to positions on the display as specified by the data transformation.

Upon completion of the displaying of data, the display manager 402 also displays a message on the remote monitor for a user to depress a preselected key to obtain a menu. If the preselected key is not depressed after a preselected period of time, then the display manager 402 relinquishes control to the remote terminal manager 404. If the preselected key is depressed, a ball trajectory options menu is displayed which permits a user to display a trajectory display for a second ball, for another bowler, or return to the main menu. If no selection is made in a preselected period of time, then control is relinquished to the remote terminal manager task 404. If a selection is made, then control continues according to the particular selection made. For example, if a user selects another bowler, then the display manager is operable as discussed above to display the selected data.

In addition to the above, the ball trajectory management system could be used in conjunction with the bowler input station 18 and the overhead monitors 20L and 20R to display ball trajectory displays thereon.

As part of the game control, it is possible to simultaneously display any of the ball trajectory parameters, in any combination, on an overhead display monitor 20L or 20R. Specifically, after a ball has been played and the data set has been uploaded and stored in the ball trajectory table 408, the gamemaker 74 can, under game control, access selected data therefrom and incorporate it on an overhead monitor scoring display. For example, the game program may display the foreground velocity, ball position at 45 feet and the entry angle on the overhead monitor 20 as part of the game score display. Also, any other combination of parameters can be selected for display, as is obvious to those skilled in the art.

Communications

The global COM line 27 and local COM lines 29 and 75, are used to communicate data between master and slave stations, as discussed above. Communications control is implemented at each station using the Intel 8344 processor. The master station controls its associated COM line at all times with only one master station provided per COM line. The master station initiates all communications on the COM line by issuing messages to a slave station and waiting for the slave station to send a reply or to time out. A slave station is only permitted to reply to requests. It cannot initiate its own messages. The communication system is configured in a multi-drop structure. If the master station fails, then the COM line is inoperative. Conversely, if a slave station fails, then it merely loses communication with the master station. The transmitting and receiving devices connected to the COM line transmit and receive data according to the EIA RS485 standard specifications. This specification determines the logic values 0 and 1 by the voltage across a pair of wires in the line.

COM Line Data Transfer

Figures 22, 23:
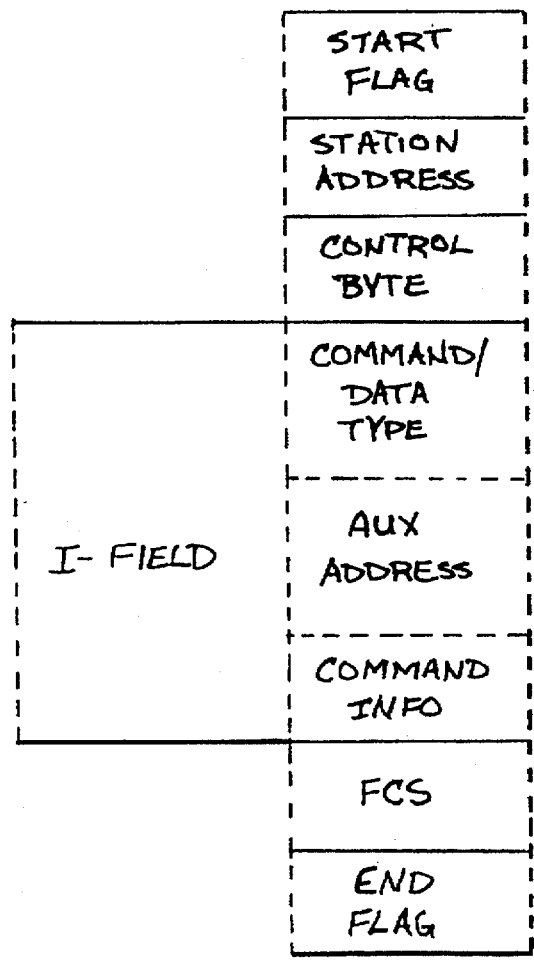
FIG. 22 illustrates the data fields for an information frame for transferring data on a communication line.
FIG. 23 illustrates the data fields for the transfer of data between the main central processing unit and the communications central processing units.

The COM line data link protocol utilizes a subset of the IBM Synchronous Data Link Control (SDLC) standard. The protocol is primarily responsible for the formation of commands and data into information frames and for the control of the transfer of the information frames over the COM line. The information frames are used over the COM line in a standardized format defined by the SDLC protocol. The format for the information frame is shown in FIG. 22. The information frame consists of two flag fields, an address field, a control field, an information field, and an information frame check sequence, or FCS, field. The flag fields are used as markers that indicate the beginning- and end of an information frame., and comprise the pattern 01111110 as defined by the SDLC specification. The address field is used to determine which slave station a particular information frame is associated with. The address field is a single byte long and may contain values of one to two hundred and fifty, the maximum number of slave stations permitted. The control field is a single byte field that is used for a status and control exchange between master and slave stations. This field indicates two modes of operation, supervisory and information. The supervisory mode is designed specifically to allow the master to transfer status between itself and a slave station. Information frames sent in this mode are used by the master to poll slave stations, and by slave stations to acknowledge or negatively acknowledge receipt of a valid information frame from the master station. The information mode is used for message transfer. When operating in the information mode, the information field contains the data to be communicated between the master and slave stations. Otherwise, the information field is not used. The FCS field provides for error detection on the COM line.

The communications protocol is of the SDLC half-duplex type. Three types of commands are available, a request for action, requests for information and status, and sending of information. Requests for action are sent from the master station to a slave station. The slave station signals a receipt of the request with an acknowledgment or negative acknowledgment. The slave station signals the completion of, or the inability to complete, the requested action the next time it is polled.

A request for information and status results in a specified response from the slave station to the master station. Specifically, a response is made the next time the slave station is polled. Generally, all COM line control is initiated by the master station as requested by its associated main CPU 200. However, the master station is programmed to independently poll all slave stations and allow them to send back information when they are ready to do so. With the master station COM CPU 230 performing this polling function, the main CPU 200 is able to perform tasks other than those specific to the COM line, until a secondary station has sent information.

The sending of information includes the downloading of programs and other information. This transmission occurs a block at a time so there is no need for null data to be sent, resulting in efficient use of the COM line.

COM Line Control Software

1. Master Station Controller

With reference to FIG. 12B, in the manager's computer 32 the GCOM CPU 230 serves as the master station controller on the global COM line 27 and the LCOM CPU 230 serves as the master station controller on the manager's local COM line 29. In application as a gamemaker 74, the LCOM CPU 230 serves as a master station controller on the gamemaker local COM line 75. In each of the above instances, the COM line master station controller handles the physical interface with its associated COM line. It handles all message passing, secondary time out detection, and polling of all connected slave stations. The software modules which are used in the control by the master station are: initialization, task handler, FIFO corruption handler, transmit FIFO reader, receive FIFO writer, FIFO checksum error handler, transmission handler, poll handler, and query handler.

The intialization module sets the controller to the master station mode and sets up transmit and receive buffers. The task handler module is utilized to execute operation of the remaining modules, with the exception of the FIFO checksum error handler module and the query handler module.

The FIFO corruption handler module is utilized to indicate if data received by either the write FIFO 239 or the read FIFO 240 is corrupted. The transmit FIFO reader module is utilized when data has been received and is to be transmitted to the BD Bus 217 from the read FIFO 240. Similarly, the receive FIFO writer module is utilized When data in the write FIFO 239 is to be transmitted therefrom on the associated COM line.

The transmission handler module is used to transmit commands to a secondary station. The poll handler module is utilized to periodically poll the slave stations to determine if data is available for transmission to the master station. The query handler module is utilized to transmit a query command to a slave station.

2. Slave Station Controller

The global COM line slave station controller, the GCOM CPU 230 of each gamemaker 74, controls the physical interface to the global COM line 27. The software modules which are used in the control of the global COM line slave stations are: initialization, task handler, FIFO corruption handler, transmit FIFO reader, receive FIFO writer, FIFO checksum error handler and transmission handler. These modules operate similarly to those discussed above relative to the master station.

3. Manager's Computer Internal Communications

Communications between the main CPU 200 and the GCOM and LCOM CPU's 230 of the manager's computer 32 are implemented utilizing the following software modules: OS-9 device driver, COM talker, COM watcher, initialization, transmit FIFO writer, receive FIFO interrupt handler, FIFO corruption handler, and FIFO checksum error handler.

The OS-9 device driver module is a collection of subroutines that are called as required by the OS-9 operating system, described below. These routines enable the other modules, when called, to operate. The COM talker module is the interface between the application processes, such as the lane control process or the game control process, and the OS-9 device driver for transfer of data to the global COM line 27 or the manager's local COM line 29. The COM watcher module reconstitutes messages from the COM lines 27 or 29 and sends them to the appropriate application processes. The transmit FIFO writer module transmits data to the write FIFO 239 for transmission on the COM line 27 or 29. The receive FIFO interrupt handler module is responsive to the CDAV interrupt signal from the read status latch 245 for controlling the transfer of data from the read FIFO 240 to the main CPU 200. The FIFO corruption handler module is utilized when a signal has been received indicating that the data is corrupted i.e., the data is invalid. The FIFO checksum error handler module initiates FIFO diagnostic operation and provides a signal that the COM line receive operation is inoperable.

4. Gamemaker Internal Communications

Communications between the main CPU 200 and the GCOM and LCOM CPU's 230 of the gamemaker 74 is controlled to buffer data to and from respective associated COM line 27 and 75. When data is received by either CPU 230 from a COM line 27 or 75, the interrupt signal CDAV is generated by the read status latch circuit 245, see FIG. 12B, for transmission to the interrupt control 224. Responsive thereto, the main CPU 200 processes the received data in accordance with the priority associated with the interrupt. The transmission of data from the main CPU 200 to either COM line 27 or 75 is time sliced driven, as discussed in greater detail relative to the gamemaker software, below.

5. Internal Communication Format

With reference to FIG. 23, there is illustrated the format used for the transfer of data commands or data types between the main CPU 200 and either the GCOM or LCOM CPU 230. This format is used for both the manager's computer 32 and gamemaker 74 internal communications. Specifically, a "command" is transmitted from the main CPU 200, and generally results in transmission on the COM line to a slave station. A "data type" or response, is transmitted to the main CPU 200, and is generally received by a master station from a slave station.

For data transmission of command signals from the main CPU 200 to the write fifo 239, start and end flag fields are used as markers that indicate the beginning and end of the data to be transmitted. A station address field indicates the slave station to which the information is to be transmitted. A control byte field indicates the length of the command or information field. An SDLC I-field contains a command reference number, auxiliary addresses and the specific command information. The auxiliary address field relates to whether the transmitted information relates to the left lane, the right lane, both lanes or all devices at the station which is being transmitted to. The FCS field is utilized to provide for error detection.

The data transfer format for data type signals between the read FIFO 240 and the main CPU 200 is similar to that above except that the station address field indicates the address of the COM line slave station where data has been received from, and the first portion of the I-field comprises a data type signal reference number.

Gamemaker Local COM Line Communications

On the gamemaker local COM line 75 the gamemaker 74 is the master station with the slave stations being the gamesetter 76, the bowler input station 18, the ball trajectory unit 80 and the RS232 converter 78 for the remote keyboard 24.

1. Gamemaker—Gamesetter

For communications between the gamemaker 74 and the gamesetter 76, each command comprises a number identifying the specific command and the lane of the lane pair to which the command relates. The commands are usually generated by the gamemaker 74 under the control of a game program and transmitted over the COM line 75 to control operation of the gamesetter 76, and thus pinsetter 14. A partial list of COM line commands to the gamesetter 76 is provided in table 1.

TABLE 1

| Number | Command |
|--------|---------|
| 1 | Read the pins |
| 2 | Pickup and sweep |
| 3 | Sweep and set |
| 4 | Return to home |
| 5 | Bowl a frame |
| 6 | Verify the pin pattern |

Command No. 1, the "read the pins" command forces the selected lane to read current pins standing on the deck. Particularly, this command causes the gamesetter 76 to perform the "read the pins" operation discussed above in the Gamesetter Operations section hereof. Alternatively, the gamesetter 76 could acquire the pin standing data from the optical scanner 86. The gamesetter 76 responds by transmitting the pin standing data to the gamesetter 74.

The "pick up and sweep" command, No. 2, causes the gamesetter 76 to perform the "pick up and sweep" operation discussed above in the Gamesetter Operations section hereof. Specifically, responsive to this command, the gamesetter 76 performs the read the pins operation, if necessary or desired, lifts the standing pins and sweeps the dead wood from the deck, and replaces the standing pins on the deck. Thereafter, the pinsetter 14 returns to its "home" position.

The "sweep and set" command, No. 3, forces the lane to sweep the deck clear of pins and set a new pattern which is contained in the command. Specifically, the gamesetter 76 performs the pinsetting operation illustrated in the flow diagram of FIG. 11. The pin pattern set is contained in a two byte portion of the information field for the information frame, see FIG. 22, with a logic one corresponding to a pin position where a pin should be set.

The "return to home" command, No. 4, forces the Gamesetter 76 to place the pinsetter 14 in the at home position. This command is commonly issued after the "read the pins" command.

According to the particular game program being implemented, the gamemaker 74 can control all pinsetter 14 machine movement throughout the playing of the game. Alternatively, the game program can provide frame information, so that within a particular bowling frame the gamesetter 76 controls operation of the pinsetter 14 without receiving interim commands from the gamemaker 74.

The "bowl a frame" command, No. 5 is used to define an entire frame of bowling. In order to bowl a frame, the starting pin pattern must be identified and the number of attempts to make the pattern, i.e. knock all of the pins down, must be defined. When "bowl a frame" has been commanded, the gamesetter 76 is operable, as discussed above, to set a selected pattern of pins, and thereafter to selectively permit the bowler to play up to the maximum number of balls allowed in the frame until all pins have been knocked down. The frame is also optionally automatically ended when the foul detector 92 detects that a player has stepped over the line. Once a frame has been completed, the gamesetter 76 halts operation of the pinsetter 14 until the gamemaker 74 issues the next command, such as ordering the next frame.

Although certain of the games cannot be defined using frames, it is desirable to use the "bowl a frame" command as it allows each gamesetter 76 to better optimize machine operation of its associated pinsetters 14 due to the fact that the gamesetter 76 need not continually wait for commands from the gamemaker 74.

The "verify the pin" command, No. 6 is used to verify which pins are standing on the deck. The pin standing data can be obtained by performing the read the pins operation or by utilizing the pin fall scanner 86.

A partial list of gamesetter data types or responses is provided in Table 2, below. Some of these responses are sent as a result of commands being issued by the gamemaker 74. Others of the responses are unsolicited and provide lane status information to the gamemaker 74 when the gamemaker 74 periodically polls the gamesetter 76. Specifically, the "ball sensor activated" response, No. 4, indicates that a ball has been thrown. Response No. 5, "pin standing data", is generated after a lane has been commanded to read the standing pins and comprises in part two bytes containing pin standing information. For example, a "1" indicates a standing pin, while a "0" indicates a fallen pin.

TABLE 2

| Number | Response |
|---|---|
| 1 | Commanded operation complete |
| 2 | Commanded operation in process |
| 3 | Commanded operation aborted |
| 4 | Ball sensor activated |
| 5 | Pin standing data |

2. Gamemaker—Remote Keyboard or Bowler Input Station

The gamemaker 74 communicates with the remote keyboard 24 over the local COM line 75 through using the RS232 converter circuit 78, see FIG. 13. The bowler input station 18 includes a converter circuit, see FIG. 14, for communicating on the local COM line 75. The commands transmitted from the gamemaker 74 to these devices include a configuration block command, a stop sending data command, a resume sending data command and a data to device command. The configuration block command includes information which defines the type of device, the data transmission rate and data transfer formats. The stop and resume data commands are used to control when the addressed slave device should respectively stop or begin sending data to the gamemaker 74. The data to device command is utilized to send specific data to be acted on by the addressed device. For example, the data to device command is used to select which keys on the bowler input station keypad 328 are backlit by the display device 358.

The bowler input station 18 and remote keyboard 24 in turn transmit serial data to the gamemaker 74. Particularly, each data type response received by the LCOM CPU 230 therefrom represents the key on the respective keyboards which has been depressed by a user thereof.

3. Gamemaker—Ball Trajectory Unit

The communications between the gamemaker 74 and the ball trajectory unit 80 include a command requesting ball trajectory data, and a restart command for defining the parameters to be used by the ball trajectory unit 80 for obtaining ball trajectory data. The ball trajectory sensing device 80 responds to a data request from the gamemaker by transmitting a data type or response comprising a data set to the gamemaker 74. Particularly, the ball trajectory unit 80 divides the lane into eight windows and for each window transmits x-y coordinate information representing the ball distance from the foul line and the left lane edge. Also, data is transmitted representing the distance from the left lane edge at 45 feet, the foreground velocity, the background velocity and the ball entry angle into the pins.

The ball trajectory data is used under the control of a game program for display on the overhead monitors 20, or for scoring according to the particular game program, and under the control of the remote terminal manager task for display in graphic format at the remote terminal 21.

GAMEMAKER SOFTWARE

The purpose of the gamemaker 74 is to automatically score a variety of different bowling games, control the operation of the gamesetter 76, and display game scores on the overhead monitors 20L and 20R for the particular game that has been downloaded from the manager's computer 32. The gamemaker 74 also controls the operation of the remote area terminal 21. To accomplish these tasks, the gamemaker 74 communicates on the global COM line 27 to the manager's computer 32 and on the local COM line 75 to the bowler input station 18, the remote area keyboard 24, the ball trajectory unit 80 and the gamesetter 76. Additionally, the gamemaker is provided with means for generating video signals for the displaying of exciter type graphics to mark significant events during a bowling game, for displaying special graphics and score sheets for unique bowling games, and displaying the graphics required for instructional purposes.

The basic operation of the gamemaker 74 is determined according to the gamemaker operating system, or GMOS. GMOS is stored in the gamemaker EPROM 204, see FIG. 12A. Under the control of GMOS, software which can be loaded into the system includes a game program for either or both lanes and a program for operating the remote area terminal 21. Normally, the game software and remote area terminal software are downloaded from the manager's computer 32 over the global COM line 27. Additionally, game programs for stand-alone bowling games and a default program are stored in the EPROM 204. The mode key switch, see FIG. 12B, determines which of the game programs are utilized for either or both lanes. Particularly, two stand-alone games are included, one for ten-pin open bowling for play on each lane, and one for a league ten-pin bowling cross lane game. The default bowling game merely provides for minimal operation of the gamemaker 74, but does not permit bowling to be played, as discussed more specifically below.

Operating System

GMOS is a general purpose time slicing multi-tasking system with emphasis on voluntary relinquishment of control. GMOS does this by dividing the available real time equally between the tasks that are using large amounts of time through the well known time slicing procedure, while providing the rest of the tasks control on a regular basis as requested. A time slice is defined as the maximum amount of time that each task may operate during a system frame. The GMOS operating system incorporates special facilities described herein for real-time operation of two separate video displays. Although three video displays are supported, only two displays use the real-time system resources at a given time. Additional monitors can also be supported if necessary.

The GMOS operating system operates on approximately a sixteen to seventeen millisecond time base supplied by the video system repeating interrupt VIDEO1 INT. It attempts to operate in step with this time base, making operating system frames occur one per video frame. Within a system frame all tasks that need to operate get control of the system for part of the system frame. If the system becomes overloaded, when an operating system frame is running longer than sixteen milliseconds, then the GMOS operating system shortens the time slice time in an effort to keep as close to the sixteen millisecond time base as possible. The time slice size is 11 milliseconds for video tasks and varies between 5 milliseconds and 13 milliseconds, in 2 milliseconds increments, for non-video tasks. Regardless of the overload, all scheduled non-video tasks operate in the system frame. The system generally stays close to the sixteen millisecond time base with up to three tasks doing continuous processing.

All timing in the system, except for the video tasks, is done in frames, which are system frames. These system frames are, for all practical purposes, approximately sixteen to seventeen milliseconds long, but are slightly longer during system overload. In the case of an underload condition, any excess time is wasted by a system "dummy" task. In each system frame, the system conducts necessary system processing, then it executes the task dispatcher. The task dispatcher walks through an active task list and gives control to any task that is scheduled to operate in the current system frame. The task maintains control, except during interrupt processing, until the task voluntarily returns control to the system, the task is time sliced due to usage of its time allotment in the current system frame, or the task is time sliced due to the activation of a video task. In the latter instance, the task resumes execution in the current system frame if there is a meaningful amount of time left in its current allotment.

After running all tasks that are due to be run in the system frame, the system undertakes final system processing and then the frame is completed. The final system processing includes analyzing how much time elapsed during the frame, and adjustment of the time slice size. If there has not been a video repeating interrupt during the system frame, then the system activates the dummy task which loops in user mode until the video interrupt is received. This is done so that the system sees a user mode task operating if an interrupt should trigger a video task activation.

According to the preferred embodiment, up to thirty tasks may exist at any one time. Examples of such tasks include left lane game task, right lane game task, and remote area task. Additionally, each task may create sub-tasks as necessary or desired according to the particular processing needs. The system provides facilities for the operation of up to two video tasks. The video tasks operate similarly to any other task running under the system except that they control system video subroutines for their operation. The video tasks begin operation close to a particular video half line number in a specified video frame. A video frame is the tracing of one full video screen starting from the beginning of the lower border, which is where the video repeating interrupt VIDEO1 INT occurs.

The two video tasks are intended to be used for each of the two overhead display monitors 20L and 20R. Therefore, normally non-game tasks do not become video tasks. In fact, if a non-game task controls a video subroutine, then a game task may not be able to control the video subroutine when it is needed.

Associated with each task is a task control block, or TCB, which contains all the data associated with that task. The TCB provides space for storing the entire main CPU state, i.e., all data and address registers, the PC and status register, as well as a user memory stack. Included in the TCB is a "sleep timer" which defines the amount of time that must elapse, in system frames, until the next activation of the task. The TCB also includes status bits which indicate critical information to the task dispatcher. Particularly, a D-bit is set when the task is stopped, an S-bit is set if the last time the task lost control it was the result of time slicing, a V-bit is set if the task is one of the two video tasks, and a P-bit is set if the task has already been processed in the current system frame. Also, two video blocks are provided, one for each of the two video tasks. The video block includes data relative to the number of video frames which should elapse before the video task takes control, and the video half line number at which control should begin.

As discussed above, the GMOS operating system supports two video tasks using real-time video processing. These tasks may request control at any given line in a given video frame. If both video tasks ask for control in the same system frame, then the task that had control least recently is given control of that system frame, and the other task is given control in the following system frame. In this manner, if video tasks request even system frame counts, they run perfectly out of phase after the first concurrent request. A video task that requests activation every system frame is activated in the absence of the other video task. Two video tasks asking for control of every system frame interleave system frames perfectly and a video task asking for control every system frame does not disturb a video task asking for control every other system frame. A video task is confined to run in the system frame in which it starts. If the video repeating interrupt comes along while a video task is operating, then it is time sliced, and then is resumed at the next repeating interrupt. The video frame counter for the video task takes into account that a task which is time sliced has no notion that system frames elapsed while it was executing.

The GMOS operating system provides coordination software for management of tasks by the system, and provides these facilities to the tasks themselves for management of sub-tasks they create. The system provides management of the dynamic RAM to which software is to be loaded, and provides a system by which the boundaries and sizes may be modified without alteration of the system software. The system maintains and verifies a CMOS RAM jump region through which critical areas of ROM'ed software may be patched. The system offers dynamic allocation of RAM blocks and movement of task stacks to such blocks.

The GMOS operating system executable software is divided into several modules. A vector module contains the global system jump table that the rest of the system utilizes to interface the GMOS system. The jump table is designed to provide all system entry points at fixed addresses such that changes to the system do not affect the user interface. A system module contains initialization, error handlers, and the task dispatcher. It also contains a voluntary system return point and a time slicing task-switcher, and the interrupt handlers for the real time clock/calendar, video repeating interrupt and video line interrupt. A utility module contains utility routines for the task dispatcher and task switcher, and the software for creating new tasks, allocating and freeing memory blocks and user stack manipulation routines.

A coordination module contains the task coordination software for stopping, starting, killing, and checking existence of other tasks. An operation module contains all the software related to the operation of the bowling center system. This module includes start up operation based on key switch states, COM interface for loading and starting game and remote software, software for transferring and starting stand-alone games and downloadable bowling games and the initial remote area terminal program, and the GMOS utility task which continually monitors the key switch and keeps track of currently running software for both lanes and the remote area. A hardware module contains all software that talks to any hardware device. A CMOS module contains the software for initializing and validating the CMOS vector patch area and contains the allocation labels within the CMOS vector patch region. A RAM module contains GMOS RAM definitions which is a file of global labels defining system RAM.

Figure 24A:
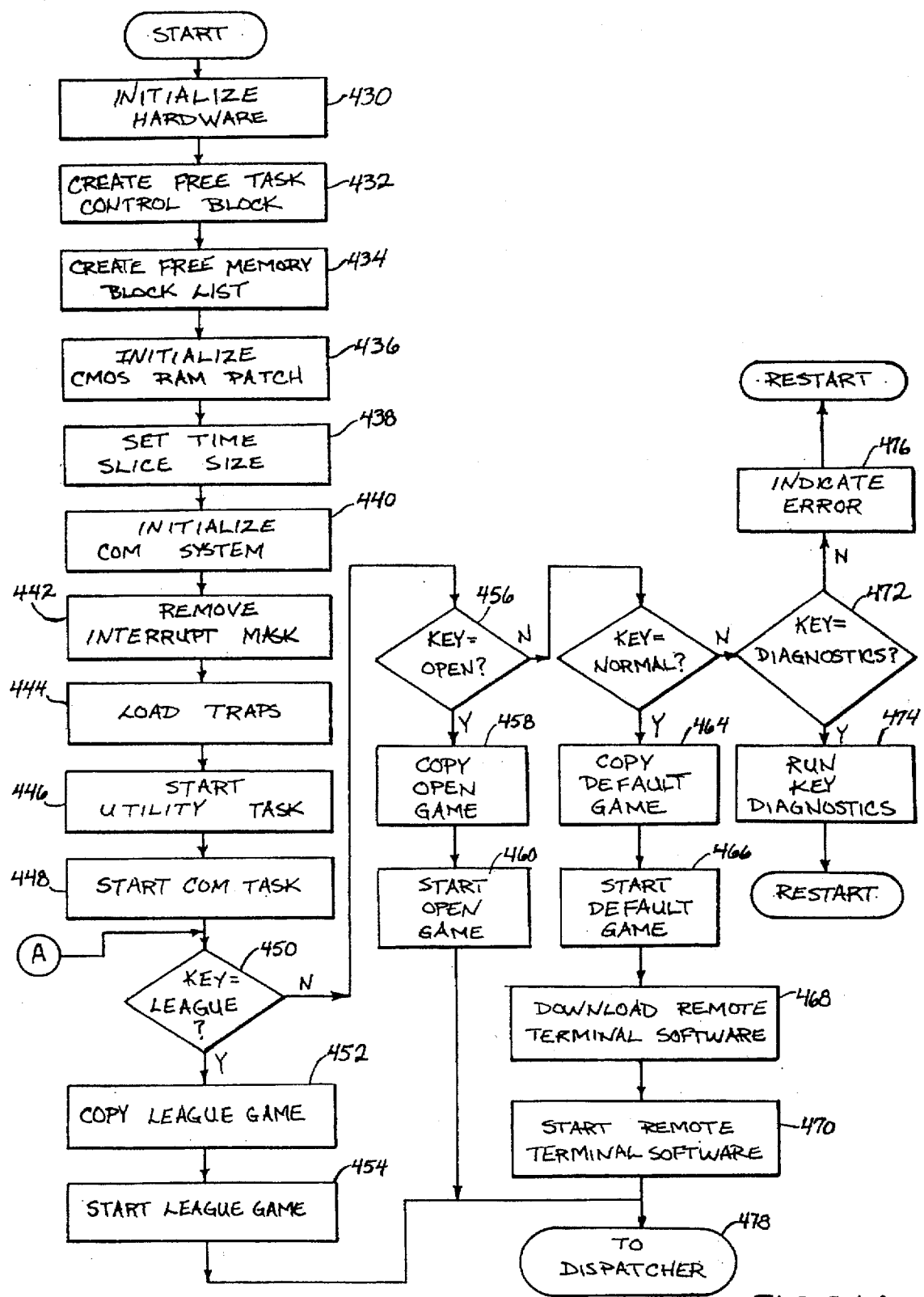
FIGS. 24A–24C comprise a flow diagram illustrating the operation of the operating system for the gamemaker.
Figure 24B:
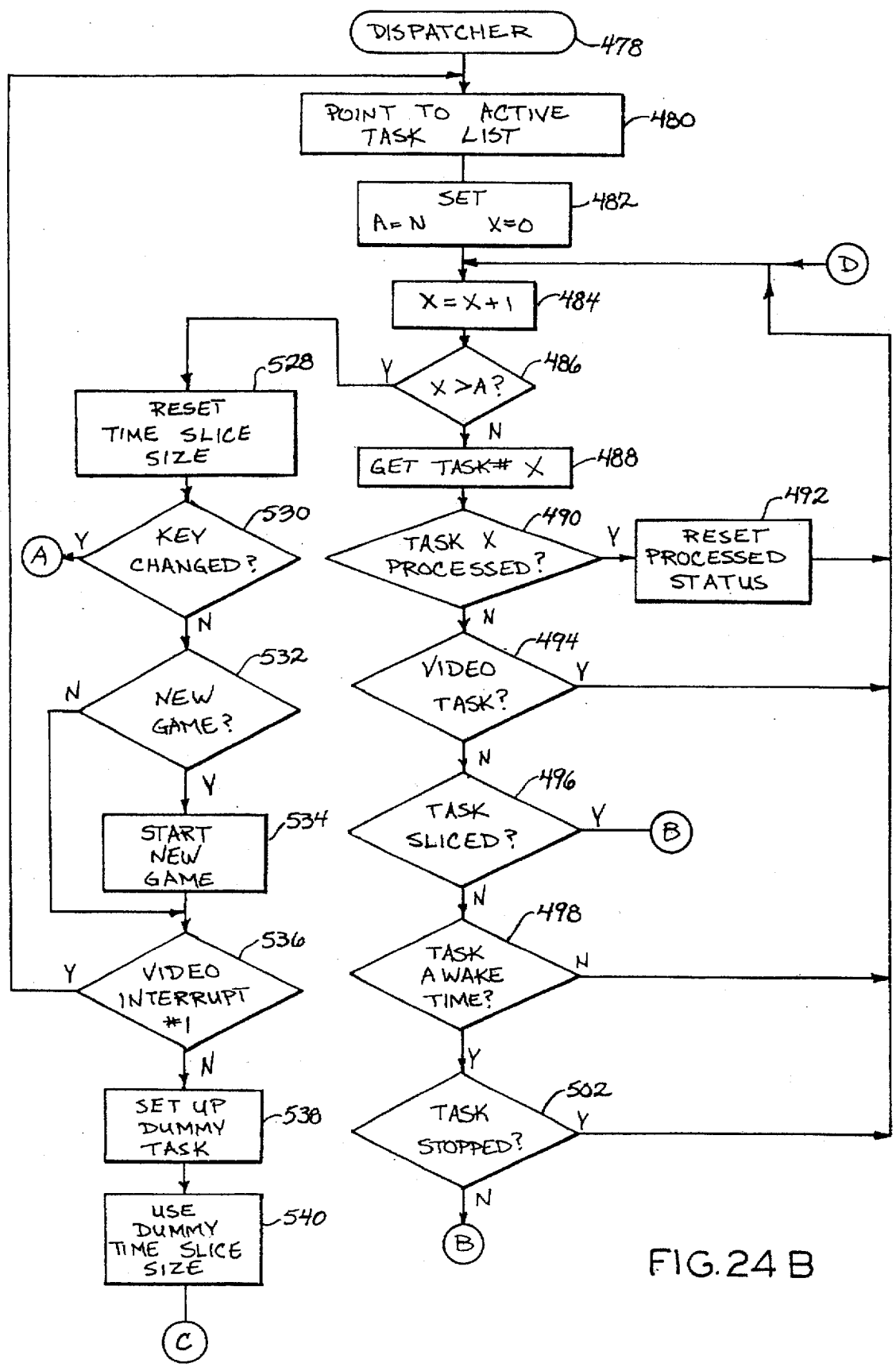
Figure 24C:
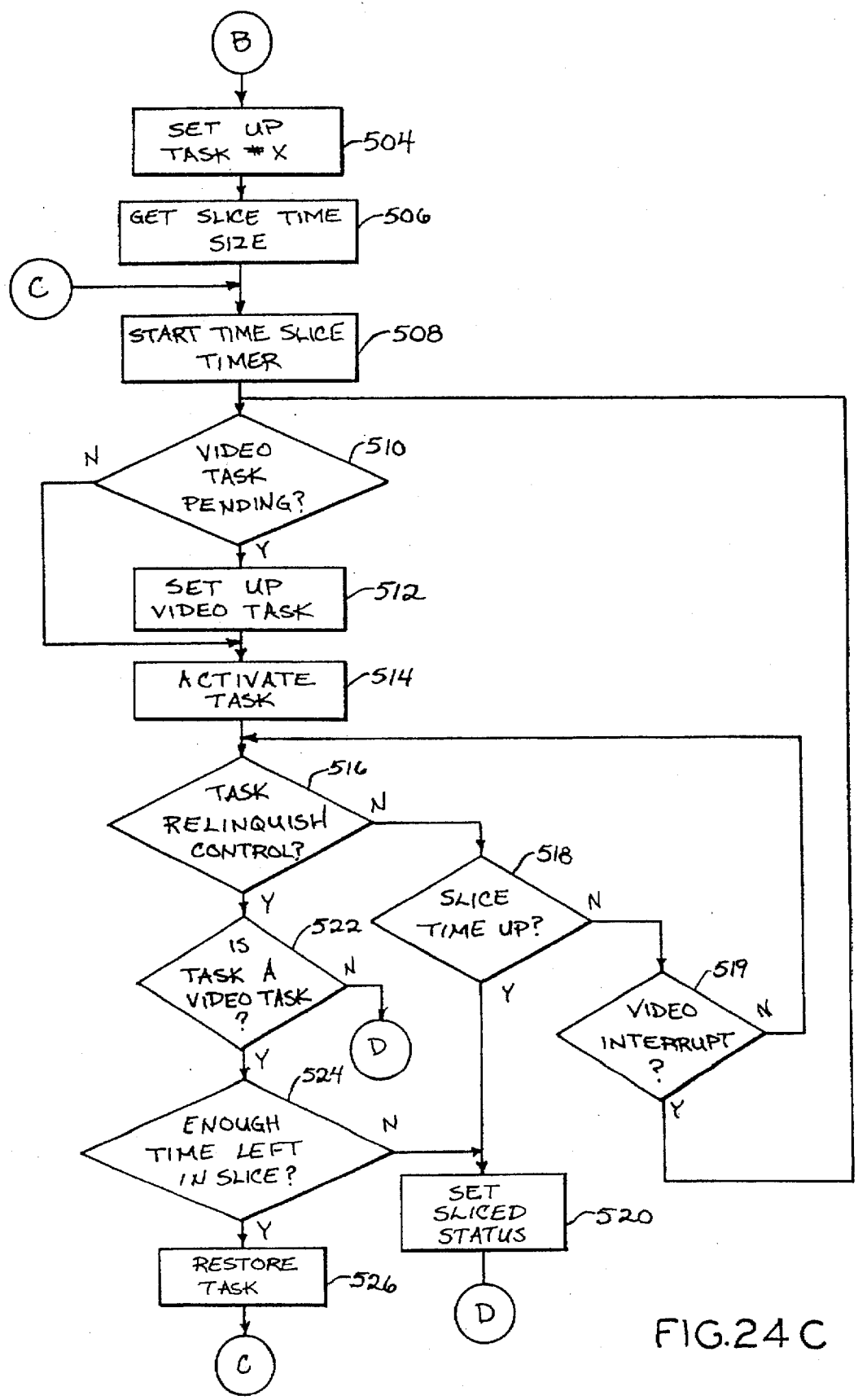

With reference to FIG. 24A–24C, a flow diagram illustrates the operation of the GMOS operating system.

When the gamemaker is first powered up, or a system reset is initiated in any known manner, a power on diagnostics routine is automatically performed. Thereafter, the GMOS operating system is booted by a jump to its first vector. GMOS assumes that it is already in the supervisor mode, and the supervisor stack pointer points somewhere at valid RAM.

Operation begins at a block 430 where the gamemaker hardware is initialized. Hardware initialization is operable to mask all of the interrupts, clear the system DRAM memory 202, initialize the video circuit 246, including loading global video hardware parameters from a fixed table into a hardware register list, initializing the global video write mask to initialize the color palette circuits 259–261 for each video monitor and enabling all three displays, and initializing the calendar clock circuit 221.

As discussed above, each task includes a TCB. At a block 432 a free task control block list is created. This list links all the TCB's together. As each task is created, the created task utilizes a free task control block from the free TCB list for storing its particular TCB. A free memory block list is then created at a block 434. The free memory block list is a linked list of available memory which can be utilized for general purposes.

A CMOS RAM patch area is initialized at a block 436. As discussed above, software for the GMOS operating system, the stand-alone bowling games, and the graphics library is stored in the EPROM 204. Often, it is desirable to modify the software. Such modification requires that the EPROM 204 be replaced or reprogrammed. Such action can be difficult and costly to accomplish if numerous gamemaker game control units 74 are installed in the field. Therefore, the software is written so that it occasionally accesses patch areas in the CMOS RAM 206. The CMOS RAM patch area may be utilized by downloading software patches from the manager's computer 32 to correct bugs or to implement changes in the system operation. As such, any such change can easily and readily be made to provide a temporary "fix" prior to reprogramming or replacing the EPROM 204.

A default system time slice size is stored in the EPROM 204 at a block 438. In the preferred embodiment, the default time slice size is 11 milliseconds for a video task and 13 milliseconds for a non-video task. The time slice size for non-video tasks is variable as described below.

At a block 440, the COM interface is initialized. This interface relates to communications between the main CPU 200 and the GCOM and LCOM CPU's 230, as discussed above in the section entitled Communications. The interface includes software which is used to load and start game and remote area terminal software from the manager's computer 32.

The interrupt mask is removed at a block 442. Particularly, GMOS utilizes the video system repeating interrupt VIDEO1 INT for defining the system frames and the calendar clock interrupt CIRQ, which occurs every two milliseconds, during system operation. The calendar clock interrupt is used to determine when a particular task should be time sliced.

At a block 444, trap instructions are stored throughout the system DRAM memory 202. These traps are utilized as a safety feature as by transferring control from a "run away" program back to the system.

A GMOS utility task is started at a block 446. The utility task is operable to monitor the state of the mode key switch 226, and to monitor the number of active tasks. An active task is any task which is capable of operating on the system. The utility task may operate, for example, every eight system frames, i.e., approximately every ⅛ second.

At a block 448, a COM utility task is started. Particularly, at this point communication is enabled between the main CPU 200 and the GCOM and LCOM CPU's 230 for transmitting and receiving data to or from the respective global and local COM lines 27 and 75. This task continually monitors for the communications interrupt CDAV and responsive thereto passes control to the COM interface. Once communications processing is completed control is returned to the system.

As discussed above, the mode key switch 226 can be manually set in any one of four positions. These four positions are stand-alone league game, stand-alone open game, normal or diagnostics. A decision block 450 determines whether or not the key switch 226 is in the stand-alone league position. If so, then at a block 452, the game program for the stand-alone league game is transferred from the EPROM 204 to the DRAM 202. This league program operates both lanes in the lane pair to play standard league ten pin cross lane bowling. Thereafter, the game software is started at a block 454. Starting the game comprises creating a single game task at a league entry point of the copy in the DRAM 202.

If it is determined at the decision block 450 that the mode key switch 226 is not in the stand-alone league position, then a decision block 456 determines whether or not the key switch 226 is in the stand-alone open position. If so, then at a block 458 the game program for the stand-alone open game is transferred from the EPROM 204 to a first block of the DRAM 202 utilized for purposes of the left lane game program and also to a second block of the DRAM 202 related to the right lane game program. Accordingly, each of the lanes in the lane pair operates the open bowling game independently. Subsequently at a block 460 the game program for each lane is started as by creating two game tasks, one for the left lane and one for the right lane.

If it is determined at the decision block 456 that the mode key switch 226 is not in the stand-alone open position, then a decision block 462 determines whether or not the key switch 226 is in the normal position. If so, then at block 464 the default game program is transferred from the EPROM 204 to a first block of the DRAM 202 for the left lane and also to a second block of the DRAM 202 for the right lane, as above. This default game software prevents the system from locking up and maintains the lane pair in a vacant state which prohibits a bowler from playing a game. The default game program is started at a block 466 as by creating the two game tasks. Subsequently, at a block 468 software for operating the remote area terminal 21 is downloaded from the manager's computer 32 over the global COM line 27. This downloading is done only if the mode key switch 226 is in the normal position as it is assumed that the stand-alone games are utilized only when communications on the global COM line 27 are inoperable. However, the system could be modified so that the remote area software is downloaded regardless of the mode key position. The remote area software is started at a block 470 as by creating a remote area task. The operation of the remote area software is described below relative to the remote area terminal operation.

If it is determined at the decision block 462 that the mode key switch 226 is not in the normal position, then it is determined at a decision block 472 if the switch 226 is in the diagnostic position. If so, then a key diagnostics program is run at a block 474 and subsequently the system restarts. If the switch 226 is not in the diagnostic position, then the system indicates an error at a block 476 and the system restarts.

Control advances from any of the blocks 454, 460 or 470 to the task dispatcher 478, see FIG. 24B. The task dispatcher is used to regulate the processing among the active tasks in the system. The task status word of each task's TCB is utilized by the dispatcher in determining when to permit operation of any particular task.

The task dispatcher operation begins at a block 480 which sets a pointer to the active task list. Thereafter, at a block 482, a variable A is set to equal N where N is the number of active tasks in the active task list. Also, a variable X is set equal to zero. The variable X represents the number of the task being considered by the task dispatcher. Subsequently, at a block 484, the variable X is incremented by 1, and at a decision block 486 it is determined whether or not the variable X is greater than the variable A. The variable X is greater than the variable A if the current task number being considered is greater than the number of tasks in the active task list. If the variable X is not greater than the variable A, as determined at the decision block 486, then at a block 488 the task dispatcher gets task number X from the active task list. Subsequently, the system utilizes the task status word to determine whether or not task number X should be activated. Particularly, at a decision block 490, it is determined whether or not the P-bit has been set indicating that the task has already been processed in this frame. Normally, the P-bit is not used because the task dispatcher sequences through the active tasks within a system frame, so that each task is only considered once during the system frame. However, GMOS provides the capability for a task to be advanced to the head of the active task list so that it gets control at the beginning of the system frame. When this occurs, the P-bit is set to advise the task dispatcher not to activate the task when it encounters it during its normal sequencing through the active task list. If the task dispatcher detects that the P-bit is set, then it clears the P-bit at a block 492 and returns to the block 484 so that the next task on the active task list can be considered. If the task has not yet been processed in the system frame, then a decision block 494 determines whether or not the V-bit is set indicating that the task is a video task. Video tasks are not activated in the same order as non-video tasks. Instead, a video task is activated in conjunction with refresh processing. Therefore, if the task is a video task, then control returns to the block 484 to increment to the next task on the active task list.

If the task is not a video task, then a decision block 496 determines whether or not the S-bit is set, indicating that the task was sliced in the last system frame. If the task was sliced in the last frame, then the task should be activated so that it can continue processing where it left off in the previous system frame. If the task was not sliced in the previous frame, than a decision block 498 determines whether or not the task has reached its awake time i.e., it's sleep timer is equal to zero. As discussed above, when a task is put to sleep, its sleep timer stores a value indicating how many subsequent system frames should elapse before the task is again awakened. If it is not yet time for the task to awake, then control returns to the block 484 to consider the next task. If the task awake time is reached, as determined at the block 498, then a decision block 502 determines whether or not the D-bit is set indicating that the task is in the stop state. If the task is stopped, then control advances to the block 484 to increment to the next task number.

If it is determined at the block 496 that the task was previously sliced, or if it is determined at the block 502 that the task is not stopped, then control advances to a block 504, see FIG. 24C, where the task, number X, is set up for operation. The task is set up for operation by pointing to the TCB associated therewith and restoring the system registers to the state they were the last time the task was activated. As discussed above, the TCB stores the entire system state. Thereafter, the system gets the current slice time size at a block 506.

A time slice timer for the task is started at a block 508. Thereafter, a decision block 510 determines whether or not a video task is pending. Video tasks begin their operation close to a particular video half line number in a specified video frame. If a video task is pending, then a task switcher is operable to load the TCB for the task that is being removed into a preselected memory location and to set up the video task for operations as discussed above relative to the block 504. In either case, the task which is currently set up is activated at a block 514. Activation of the task results in the task beginning normal processing activity according to the particular tasks function.

Once a task is activated, then a decision block 516 determines whether or not the activated task is ready to voluntarily relinquish control. The situations in which the task voluntarily relinquishes control include the task reaching a sleep status, a video status or a dead status. The sleep status results when the task has completed its necessary processing. When the task returns to the sleep status the sleep timer must be set to the number of system frames that should elapse before the task again regains control. If the task desires to operate as a video task, then the task must voluntarily relinquish control and indicate the number of elapsed video frames before it desires to assume control, and at which video line, specified in terms of the half lines, it should assume control. If the task already has a video block, then the data is put in the task's video block. Otherwise, the system checks to see if it can allocate a video block to the task. The first criterion is that there is a free video block available. The task reaches the dead status if the task processing is complete and it should not be included on the active task list. For example, when a game has ended and it is requested to load a new game from the manager's computer 32, then the current game task first reaches the dead status.

If the task has not voluntary relinquished control, then a decision block 518 determines whether the slice time is up. The slice time is used up if the time slice timer started at the block 508 exceeds the current slice time as determined at the block 506. Also, if the activated task is a video task, then it is sliced by the VIDEO1 INT signal. If not, then a decision block 519 determines if the repeating video interrupt signal VIDEO1 INT has been received. If not, then the system returns to the decision block 516 and the task continues processing. If the VIDEO1 INT has been received, then control returns to the decision block 510 to determine if a video task is pending, which task should then immediately begin processing using the task switcher, discussed above. If the slice time is up, as determined at the decision block 518, then the task is set to the sliced status as by setting the TCB status word S-bit equal to one at a block 520. Thereafter, control returns to the block 484 to consider the next task in the active task list.

If the task has voluntarily relinquished control, as determined at the decision block 516, then a decision block 522 determines whether or not the relinquishing task is a video task. If not, then the system returns to the block 484 to consider the next task. If the relinquishing task is a video task which took control responsive to the task switcher, then the system determines whether or not there is enough time left in the time slice to begin processing of the task, number X, which had been set up at the block 504 prior to the operation of the task switcher at the block 512. If not, then control advances to the block 520 to set the task to the sliced status. If there is enough time left, then at a block 526 the task switcher restores the set up of the task which had been switched out, sets the remaining time slice size and returns to the block 508 to start the time slice timer. Thereafter, the task is activated at the block 514.

The task dispatcher is operable to consider each task in the active task list using the above-described cycle. Accordingly, each active task has an opportunity to take control and perform processing within each system frame. The system frame ideally remains constant at 16 milliseconds. However, depending upon the number of tasks which take control within a given system frame, and the length of processing time required for each such task, the system frame can extend beyond the sixteen millisecond system frame time. In this event, it is necessary to shorten the time slice time so that subsequent frames remain as close as possible to the sixteen millisecond time. Similarly, if extra time is left in each frame, then the slice time is expanded to allow tasks to complete processing within the system frame without being sliced as often.

If the variable X exceeds the number A of active tasks, indicating that all active tasks have been processed, as determined at the decision block 486, then the time slice size is reset at a block 528. Specifically, the system time slice size is initially set to 13 milliseconds at the block 438, see FIG. 24A. If the elapsed time in the current frame is greater than a preselected time, for example 17 milliseconds, indicating an overload condition, then the time slice size is decreased by 2 milliseconds to 11 milliseconds at the block 528. Subsequently during any frame in which such an overload condition exists, the time slice size is decreased by 2 milliseconds. Conversely, if the elapsed time in a system frame is less than a preselected time, for example 16 milliseconds, then the time slice size is increased by 2 milliseconds. The time slice size can vary between 5 milliseconds and 13 milliseconds, in 2 millisecond increments. Use of the variable time slice size permits the system to rapidly bring the system frame time close to 16 milliseconds when an overload occurs. The change is done rapidly enough so that the effect is not perceivable by a human observer. The minimum time slice size of 5 milliseconds is selected to reduce the thrashing effect of changing processor states too often.

Thereafter, a decision block 530 determines whether or not the mode key 226 has changed position. The position of the mode key 226 is monitored under the utility task. If the mode key has changed, then control advances to the decision block 450, see FIG. 24A, to determine the new key position. If the key has not changed, then a decision block 532 determines whether or not a new game has been loaded. The COM utility task is operable to indicate if a new game is downloaded from the manager's computer 32. Prior to the downloading of a new game, the old game task will have advanced to the dead status. If a new game is downloaded, then the game is started at a block 534 as by creating a game task for the new game and adding this task to the active task list. In either case, a decision block 536 then determines whether or not the repeating video interrupt VIDEO1 INT has been received. As discussed above, the video repeating interrupt is received every sixteen milliseconds and is used to define the beginning of a new system frame. If the video repeating interrupt is received, then control returns to the block 480 to begin a new system frame. If not, then there is time remaining in the system frame. Since it is desirable to maintain the system frame size at 16 milliseconds, it is necessary to allow the system frame time to elapse prior to beginning the next frame. Therefore, a dummy task is set up at a block 538, using a dummy time slice size as determined at a block 540. Thereafter, control advances to the block 508 so that the dummy task is activated. The dummy task basically cycles in a loop until the frame VIDEO1 INT interrupt signal is received. A large time slice size is used at the block 540 so that the dummy task remains activated for the remainder of the system frame time. Once the system frame is completed, the operating system proceeds as discussed above to return to the block 480 to begin a new system frame.

Game Software

For game operation, a software program for a selected game is loaded in the DRAM memory 202. This game program is either a stand-alone game program transferred from the EPROM 204 or any one of a plurality of game programs downloaded to the gamemaker 74 from the manager's computer 32. The game program includes the scoring algorithm, the score display specification and any other necessary graphic displays, and the game logic, including control for the pinsetter 14. The game program may display statistical information, such as the "odds" of knocking down all of the standing pins. When a game is invoked, the GMOS operating system periodically gives the game software control of the gamemaker 74, as discussed above.

The gamemaker 74 is able to control a game on each of the two lanes in its pair. These two games may be different. The gamemaker 74 also permits cross-lane bowling for appropriate games. In the case of cross-lane bowling only one game is allowed on the lane pair. Available to each game is a video graphics library containing a set of video graphic primitives. The video graphics library is available to all games and is resident in the gamemaker's EPROM memory 204. The gamemaker 74 is capable of loading a game to one lane of a lane pair without affecting the performance of a game running on the other lane of the lane pair. The gamemaker 74 permits the manager's computer 32 to terminate the game currently active on a lane and download another game to it.

A game program consists of subroutines from two distinct areas. The first area is from the set of games specific routines which are downloaded to the gamemaker 74 from the manager's computer 32. The second area is located in the gamemaker EPROM 204 and includes communications, graphics library and GMOS routines.

A game utilizes, as input and output devices, the pinsetter 14 as controlled by the gamesetter 76, the bowler input station 18, the video switch 73 and the overhead displays 20L and 20R. Also, the ball trajectory management system inputs data which may be displayed. These facilities can be turned on and off or enabled and disabled by instructions present in the game program or directly from the manager's computer 32. For example, the video switch 73 can be operated in a tournament mode as determined by a game program.

The basic structure of each game program is generally similar. The interface routines utilized are available from a library of functions. Only the game's display and scoring algorithms differ. Generally, all the games have the same scoring philosophy, namely an original pattern of pins is set on the deck and balls thrown at until all the pins have been knocked down, or the maximum number of balls allocated to knock down the pins has been reached. However, games are not required to follow such an approach.

A game utilizes two memory areas where variables are stored. The first area resides in the battery backed up CMOS RAM 206. Of this, a first block is also backed up at the manager's computer 32 and contains all the information necessary to reconstruct the game in case of a power failure or other error. This block is referred to herein as the lane database block. The lane database block includes a game independent database and a game dependent database. The game independent database includes accounting type information common to all games, relating to, for example, lane usage or game usage. The game dependent database varies according to the particular game. Illustratively, the game dependent database includes, for each bowler, data on pin configuration for each frame, bowler results for each frame, and other information indicating the progress of a particular game from the beginning to the most recent activities in the game. A second block of memory contains non-essential information such as color sets.

The second area of memory is a static variable area allocated by the GMOS operating system for storing whatever other information the game needs. For example, this information might indicate when a bowler input station has been invoked.

A game program consists of four distinct parts: user input, pinsetter monitoring and control, manager's computer interfacing and system timing. Each of these tasks, when activated, responds with some combination of the following actions: update the bowler lane database block; update the overhead displays; and/or format and send a command/response status.

The manager's computer interface task monitors the global COM line for receipt of commands. This task acts on any received command, and updates the database and overhead displays 20L and 20R as required and formats a response if necessary. It is also responsible for controlling the activate/terminate indicator for any spawned tasks.

The pinsetter monitoring and control task controls communications with the gamesetter 76. It marks events received from the gamesetter 76 and sends commands issued by the game program. It is also responsible for all game responses to pinsetter events. For example, it determines how to respond to a ball detect signal or what to do when pin fall data is present. This task scores, updates the database and overhead displays and determines the next commands to be sent to the pinsetter 14.

The user input task handles requests from the bowler input station 18. It acts on any received data, updates the database, and invokes player data entry functions and modifies the overhead display 20L or 20R as required. It also sends a string of displays to be lit at the bowler input station 18 when necessary.

The system timing task controls all timing for the game. Any event that causes a change to be made in the bowler lane database block also results in a transparent updating of a duplicate lane database block stored at the manager's control 26. In this manner, the manager's control 26 always has an exact copy of the game's lane database block. In the event of a failure at the lane, the manager's control 26 downloads the game to another available lane pair and the same game may continue where it left off. This lane database block is stored in the CMOS RAM 206 so that after a power failure, a game would be redownloaded and again be able to continue where it left off.

As discussed above, according to the position of the mode key switch 226, see FIG. 12A, a stand-alone game program is copied from the EPROM 204 to the DRAM 202 at start up. If the mode key switch 226 is in the normal position, then communication is enabled between the manager's computer 32 and the gamemaker 74 for downloading any one of a plurality of different games which are stored on the hard disk 270 connected to the manager's computer 32. The particular operation for downloading a game program is discussed in greater detail below.

Simulated Golf Game

An example of one bowling game program which may be downloaded from the manager's computer 32 is for a bowling game which incorporates some of the schemes of play incorporated in playing the game of golf. The rules and scoring method for such a game are described in greater detail in Brim pending application, Ser. No. 118,241, filed Nov. 9, 1987, owned by the assignee of the present invention, the specification of which is hereby incorporated by reference herein.

According to this simulated golf bowling game, the player is allowed a preselected maximum number of balls to knock down all pins in each of a preselected plurality of holes or frames. The players may select a course comprising different numbers of frames, such as nine or eighteen, such as the nine or eighteen holes in the game of golf. Each selected course includes a predetermined sequence of differing pin set ups or patterns defining the plurality of frames to be played by a player at his respective lane. Par values may be assigned to each frame or hole, preferably commensurate to the difficulty of the respective pin set ups. Each player is required to deliver at least one of the preselected maximum number of balls, e.g., five, in each of the differing frames. The number of balls delivered by each player in each frame is counted, along with the number of each player's pins remaining at the end of the frame, to determine a score for each player for each frame. Each player's frame score which is determined by such counting is recorded as the game progresses with the player's playing in turn.

With reference to FIG. 25A, a flow diagram illustrates the overall operation of the simulated golf game program. Also, with reference to FIG. 26, there is illustrated a graphical representation of an overhead monitor display used in conjunction with the simulated golf game. Particularly, the overhead display includes an upper section having a custom graphic portion including a background G depicting the "green" for the hole on a golf course. A flag F is included in the green indicating the hole or frame number. Overlaying the green is a depiction of the pins standing on the deck at any given time, as communicated to the gamemaker 74 from the gamesetter 76, as discussed above. The bottom section of the display illustrates a conventional golf score sheet S including positions for the name of each bowler, the par value for each whole or frame, as well as scoring information, including a total score.

Figure 25C:
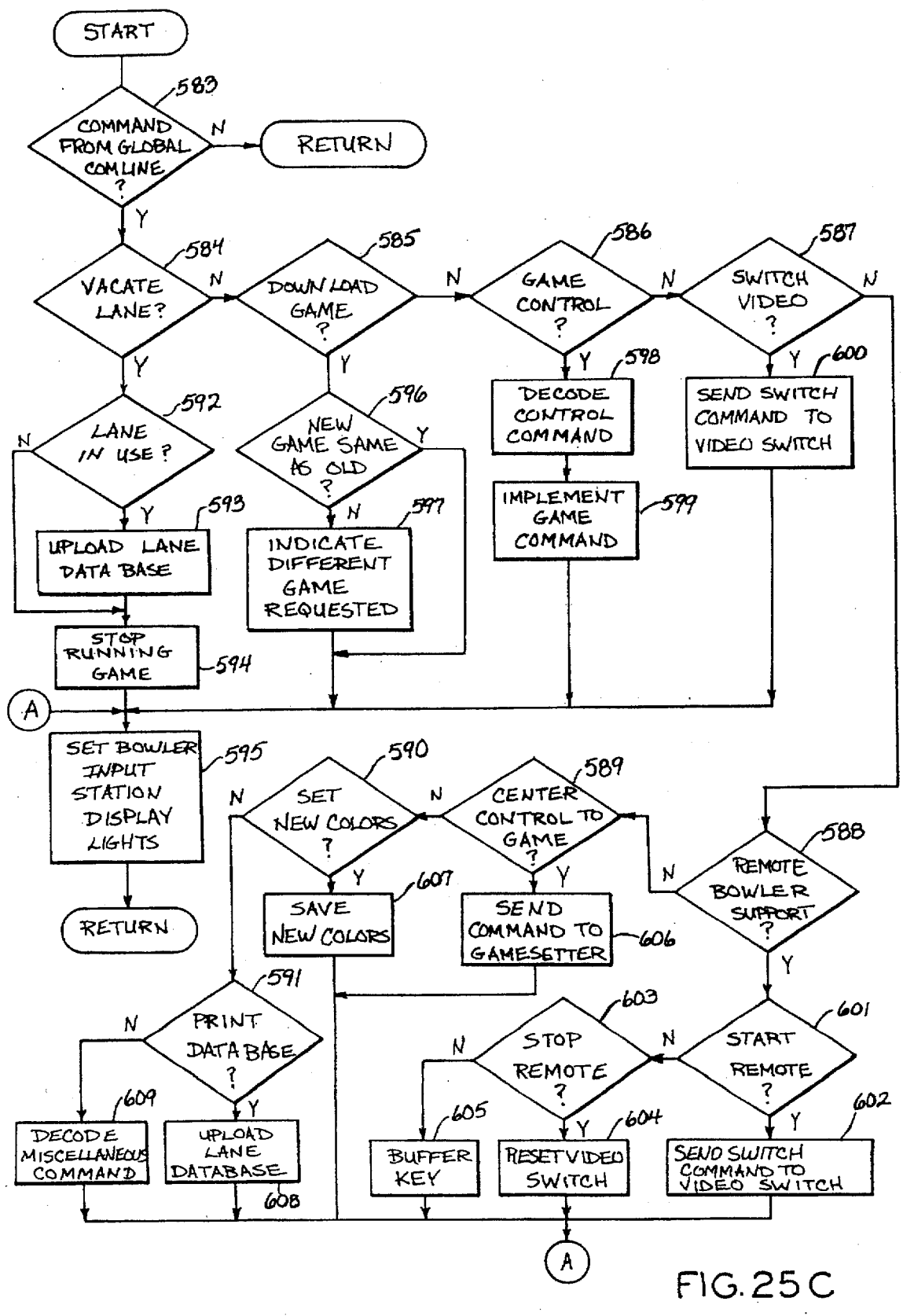
FIGS. 25A–25H comprise a flow diagram illustrating the operation of a program for a simulated golf game.

The flow diagram of FIG. 25A comprises a generalized flow diagram representing major operational routines of the game program for the simulated golf game. FIGS. 25B–25H represent the individual routines of the game program operation, as described in greater detail below.

The game program begins at a block 550 at which the game program is initialized. A detailed flow diagram of the program initialization is provided in FIG. 25B. A decision block 552 then determines whether or not a different game has been requested. If a different game has been requested, then the current game is ended at a block 554, a request for a new game is transmitted to the manager's computer 32 at a block 556 and the current game task is set to the dead status at a block 558 and the game operation ends thereafter. If a different game has not been requested, as determined at the decision block 552, then the game operation provides a break for GMOS at a block 560. This break allows GMOS to release operation of the task, as by placing the game task in the sleep status, in the current system frame for rescheduling in a subsequent frame. In the next frame in which the game task is activated, control proceeds to a block 562 to check the global COM interface, see FIG. 25C; to a block 564 to check the gamesetter interface, see FIG. 25D; to a block 566 to update the gamesetter, see FIG. 25E; to a block 568 to check the user interface, see FIG. 25G; and to a block 570 to check the game timers, see FIG. 25H. Thereafter, control returns to the decision block 552 to determine whether or not a different game has been requested.

With reference to FIG. 25B, a flow diagram illustrates the operation of the initialize game routine of block 550, see FIG. 25A. Control starts at a block 572 which is operable to initialize game variables. The game variables include the number of frames allowed in the game, i.e., nine or eighteen, the maximum number of bowlers, the maximum number of balls permitted per frame and the pin patterns for each of the frames. According to the preferred embodiment, the game program includes a default golf course and provisions for the bowler to select a different course. The particular course selected determines which pin pattern is set in each frame. Also, the scoring information is cleared.

Communication with the gamesetter 76 is initialized at a block 574. The bowler input station is initialized at a block 575. This initialization includes a command to reset the bowler input station operation and to set up an initial display light pattern thereon using the display device 358, See FIG. 14. The game timers, such as a one minute timer and a bowler input station time out timer are initialized and reset at a block 576. The ball trajectory unit is initialized at a block 577 so that communication is provided between the game program for accessing trajectory data and providing game information to the ball trajectory unit table manager, as discussed above.

A decision block 578 then determines whether or not the game was loaded over an old game. This block determines if the current game is the first normal game to be loaded as after power up, or if another game was previously loaded. If another game was previously loaded, then it is necessary to clear prior game data from the lane database block at a block 579. Thereafter, or if the game was not loaded over an old game, then the pin pattern is set at a block 580. This pin pattern is normally for the first frame. However, if a pending game is being initialized after a power failure or a lane transfer, then the pin pattern is for the next frame in the pending game. A decision block 581 then determines whether or not the old or pending game was running. If so, then it is necessary to immediately start game play, which is done at a block 582. Otherwise, game play is initiated by bowler action, as discussed in greater detail below, and the initialize game routine ends as by returning to the overall system operation, see FIG. 25A.

With reference to FIG. 25C, a flow diagram illustrates the operation of the check global COM interface routine of block 562, see FIG. 25A. Control begins at a decision block 583 which determines whether or not a command has been received from the manager's computer 32 over the global COM line 27. If not, then this routine ends and control returns to the main system operation. If a command has been received, then a plurality of linked decision blocks 584–591 decode the particular command received. Specifically, a decision block 584 determines whether or not a vacate lane command has been received. If so, then a decision block 592 determines whether or not the lane is currently in use. If so, then the lane database block is uploaded to the manager's computer 32 at a block 593. In either case, the current game is stopped at a block 594. Thereafter, the bowler input station display lights are set to enable the bowler input requests, as necessary or desired, at a block 595 and the routine ends.

If a download game command is received, as determined at the decision block 585, then a decision block 596 determines whether or not the new game is the same as the current game. If not, then a block 597 indicates that a different game has been requested. This indication is used at the decision block 552, see FIG. 25A to end operation of the current game. In either case, control then advances to the block 595.

If the command is a game control command, as determined at the decision block 586, then the game control command is decoded at a block 598. Particularly, game control command can be anyone of five commands as follows:

1. Start and clear database;
2. Start play;
3. Stop play;
4. Continue game;
5. Start practice.

Responsive thereto, the specific game control command is implemented at a block 599. More specifically, responsive to a start and clear database command, the game program is started and the lane database block is cleared to allow for new data to be stored therein according to the new game to be played. However, actual game play is not started. The start play command is utilized to begin actual play of the game so that scoring can begin for each player. The stop play command is used to stop play from the manager's computer at any time. The game is continued responsive to a continue game command, or a new game is started utilizing the start and clear database command and the start play command. The start practice command is used to allow a bowler to practice without any scoring resulting therefrom. After the particular game command is implemented at the block 599, then control advances to the block 595 to set the appropriate bowler input station display lights.

If the command is a switch video command, as determined at the decision block 587, then a command to provide for the desired switching arrangement is sent to the video switch 73 at a block 600. This command then controls the video switch 73, as discussed above, to implement the desired video interconnection.

If the command is a remote bowler support command, as determined at the decision block 588, then a decision block 601 determines whether or not the remote bowler support command is operable to start remote bowler support. If so, then a switching command is sent to the video switch at a block 602 so that the video signal for the overhead display for the particular lane is transmitted over the score transmission line 70 to the manager's computer 32. If the command is not a start remote command, then a decision block 603 determines whether or not the command includes a stop remote command. If so, then the video switch is reset at a block 604 to provide for normal operation. Otherwise, the remote bowler support command includes a key code. The key code is dependent upon the particular key at the remote bowler input station 42 which has been depressed by an operator at the manager's control desk. The code for this key is stored in a buffer at a block 605. From any of the blocks 602, 604 or 605, control advances to the block 595 to set the bowler input station display lights and return to the overall system operation.

If the command is a center control to game command, as determined at the decision block 589, then the command is transmitted to the gamesetter 76 at a block 606. Particularly, this command is used to turn various peripheral devices, such as the foul detector unit 92 on or off. It is also utilized, as discussed in greater detail below, to enable the operator at the manager's control desk to command the gamesetter 76 to operate the pinsetter 14 to set any desired pin pattern. This is typically utilized if a pin has been inadvertently knocked over so that the pin fall data stored in the gamemaker memory does not accurately reflect the actual standing pins. Thus, the operator can use the center control to gain command and to generate a sweep and set command to the gamesetter 76. This command includes pinsetting data entered at the manager's computer keyboard 44 to spot the correct pin pattern on the deck. From the block 606, control advances to the block 595.

If the command is a set new colors command, as determined at the decision block 590, then new colors are saved at a block 607. These colors are utilized for the overhead display monitors 20. Control then advances to the block 595.

If the command is a print database command, as determined at the decision block 591, it is necessary for the game program to upload the lane database block to the manager's computer at a block 608 for printing at the manager's control desk printer 46, see FIG. 2. Control then advances to the block 595. If the command is not a print database command, as determined at the decision block 591, then the command may be any one of a plurality of miscellaneous commands which do not relate directly to the game play. One such command is for displaying, or clearing a message on the overhead monitor 20. This command is stored in a buffer for later display under the user interface routine, see FIG. 25G-2. Any such commands are decoded and acted on at a block 609 and control then advances to the block 595.

Figure 25D:
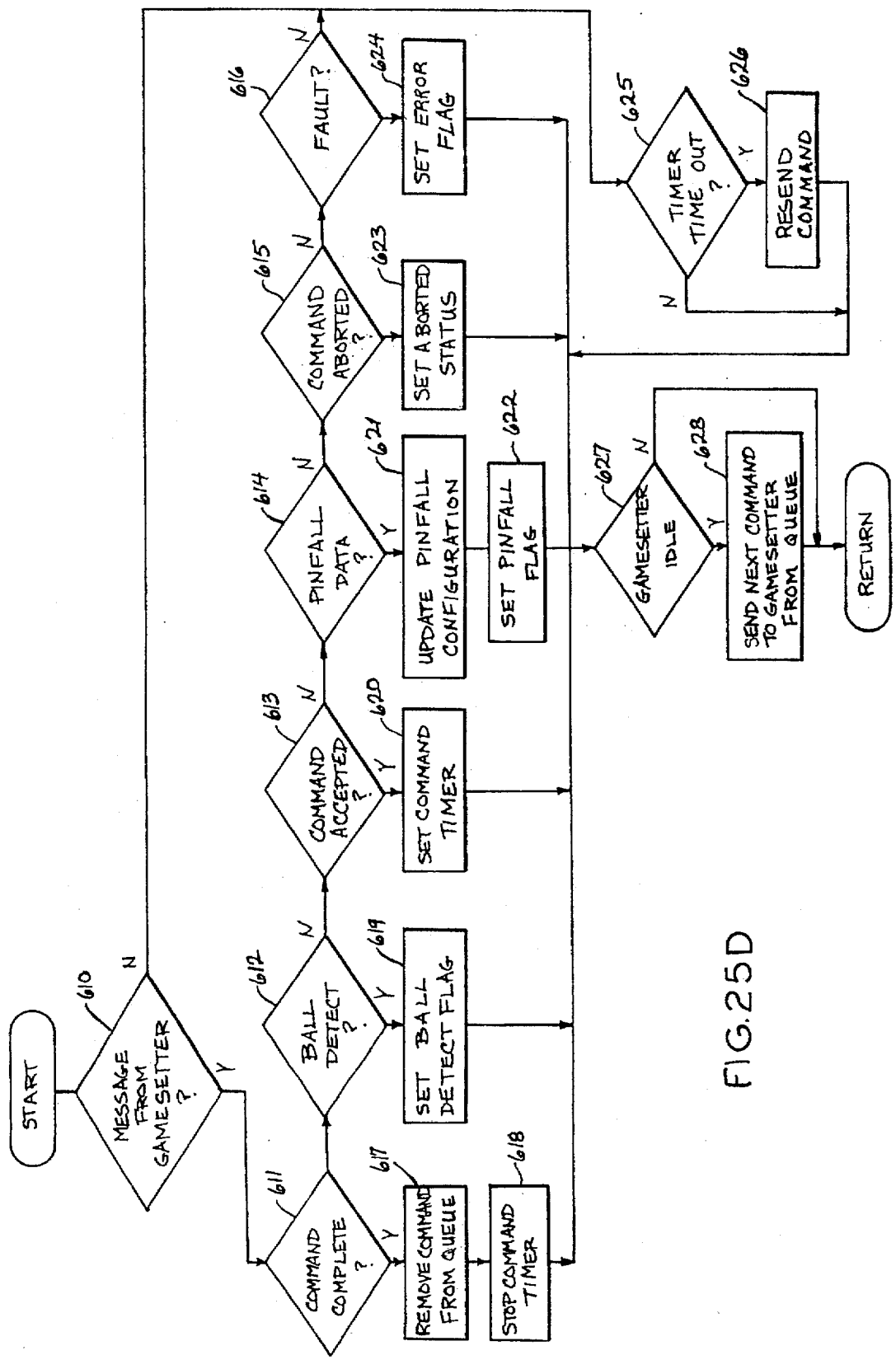

With reference to FIG. 25D, a flow diagram illustrates the operation of the check gamesetter routine of block 564, see FIG. 25A.

Control begins at a decision block 610 which determines whether or not a message has been received from the gamesetter 76 over the local COM line 75. If a message had been received, then a plurality of decision blocks 611–616 are operable to determine the nature of the message received. Gamemaker to gamesetter communications generally relate to commands transferred from the gamemaker 74 to the gamesetter 76, and responses thereto. Also, the gamesetter 76 periodically uploads data to the gamemaker 74, such as when a ball has been thrown, and when new pin fall data is available. However, only a single command can be pending at any given time. Therefore, the gamemaker 74 stores any desired commands in a queue, and when operation on the command has been completed, then the next command in the queue is transmitted.

The decision block 611 determines whether or not the operation on the pending command is complete. If so, then the command is removed from the queue at a block 617 and a command timer is stopped at a block 618.

The decision block 612 determines whether or not the message is a ball detect message. If so, then a ball detect flag is set at a block 619. The decision block 613 determines if the message is an indication that the command has been accepted by the gamesetter 76. If so, then a command timer is set to zero at a block 620. This timer is operable to determine how much time has elapsed since the pending command was accepted by the gamesetter 76, to allow a preselected maximum period of time within which the commanded action is completed.

The decision block 614 determines whether or not the message relates to pin fall data. If so, then the pin fall configuration is updated in memory at a block 621 and a pin fall flag is set at a block 622. If the message is an indication that the command was aborted, as determined at the decision block 615, then an aborted status is set at a block 623. If the message indicates that a fault has occurred at the decision block 616 then an error flag is set at a block 624. If not, or no message has been received from the gamesetter, as determined at the decision block 610, then a decision block 625 determines whether or not the command timer has timed out. If so, the command is resent at a block 626. If not, or from any of the blocks 618–620, 622–624 or 626, control advances to a decision block 627 which determines whether or not the gamesetter 76 is in an idle state. The gamesetter is in an idle state if there is no outstanding or pending command. If the gamesetter is not idle, then the routine ends. Otherwise, the next command in the queue is sent to the gamesetter 76 at a block 628 and the routine ends.

Figure 25E:
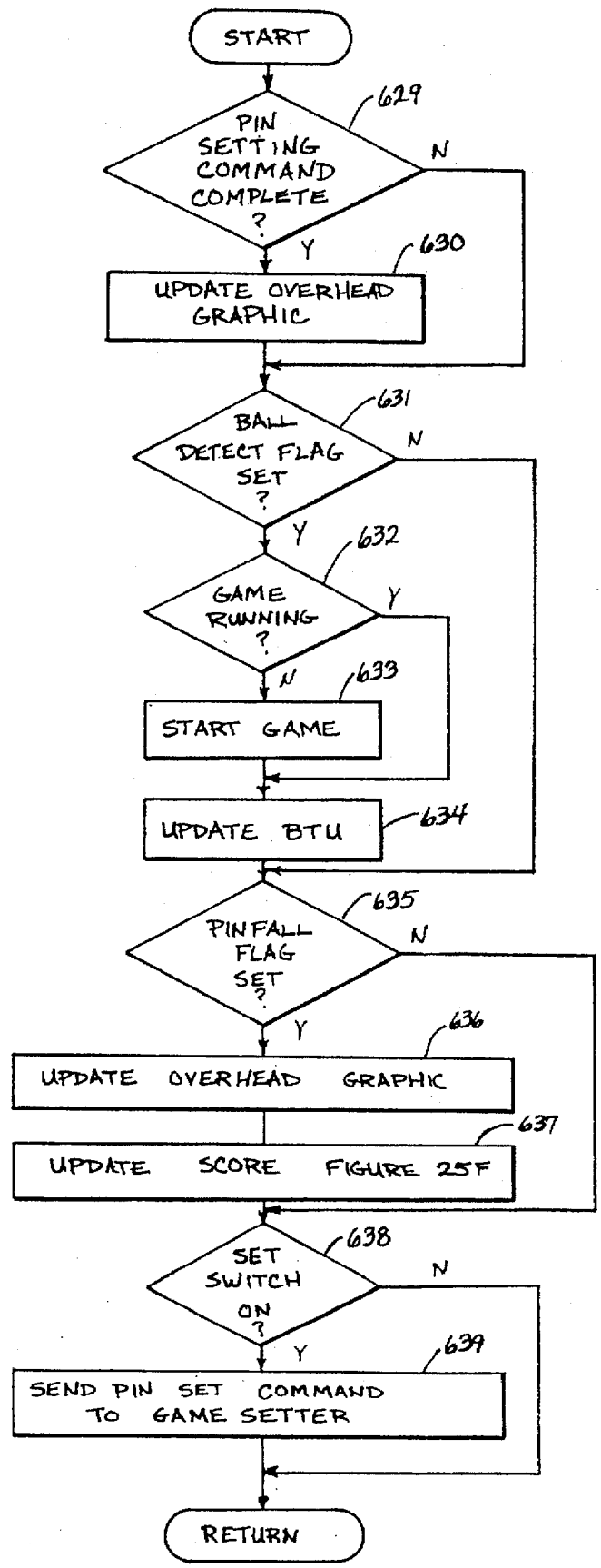

With reference to FIG. 25E, a flow diagram illustrates the operation of the update gamesetter routine of block 566, see FIG. 25A. Control begins at a decision block 629 which determines whether or not action responsive to a pinsetting command is complete. This condition is true if the most recent command from the gamemaker 74 to the gamesetter 76 was a command which provided for the setting of pins, and this command was indicated as complete at the decision block 611, see FIG. 25. If this condition is true, then control advances to a block 630 which updates the graphic portion of the overhead monitor 20. Particularly, with reference to FIG. 26, the number and positions of the pins which were set responsive to the pinsetting command is shown overlaying the green G. Thereafter, or if no such command is complete, then a decision block 631 determines whether or not the ball detect flag is set. If so, then a decision block 632 determines whether or not the game program is running. This is done due to the fact that the actual game can be started either by command from the manager's computer 32, by bowler command from the bowler input station, or by throwing the first ball. If the game is not started yet, then a block 633 is operable to start game play. In either case, the ball trajectory unit is updated at a block 634. This update is used to notify the ball trajectory unit table manager under the game in progress task, see FIG. 21, that a ball has been thrown, and the name of the bowler, and the lane, frame and ball numbers. If the ball detect flag is not set, as determined at the decision block 631, or after the block 634, then a decision block 635 determines whether or not the pin fall flag is set. If so, then the overhead graphic display, see FIG. 26, is updated at block 636 to illustrate the correct pin configuration, and the score is updated at a block 637. The particular operation for updating the score is described in greater detail below relative to FIG. 25F. Thereafter, or if the pin fall flag is not set, then a decision block 638 determines whether or not the set switch is on. The set switch is part of the pinsetter 14 and provides a manual indication when the pin pattern must be reset due to a pin being inadvertently knocked over, as discussed above relative to the center control to game command from the manager's computer 32. If the switch is on, then the sweep and set command is sent to the gamesetter at a block 639 to command the gamesetter to set a new pattern corresponding to the pattern which the gamemaker game program expects to be set on the deck. Thereafter, or if the set switch is not on, then the update gamesetter routine ends and returns to overall system operation, see FIG. 25A.

Figure 25F:
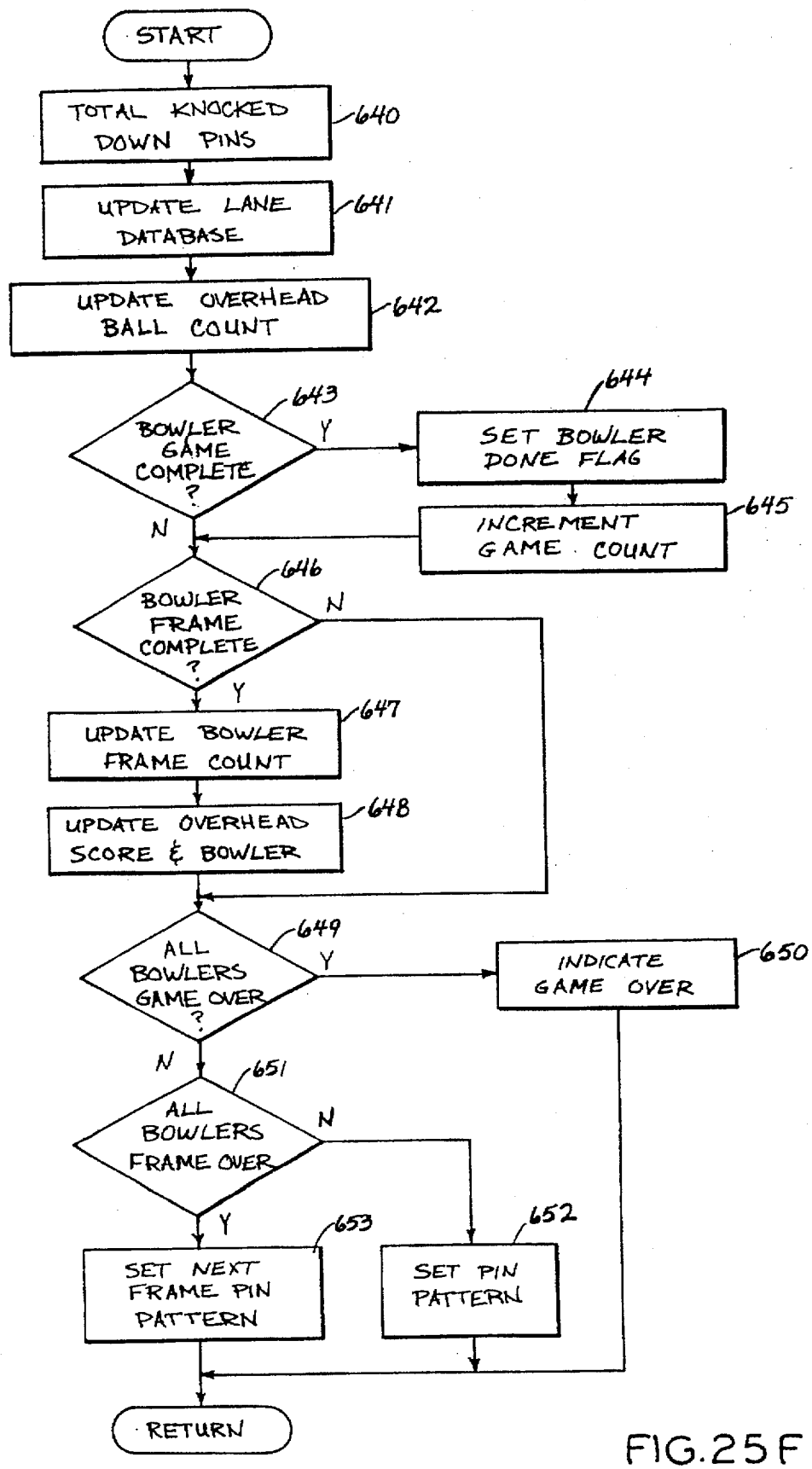

With reference to FIG. 25F, a flow diagram illustrates the operation of the update score routine of block 637, see FIG. 25E. Control begins at a block 640 which totals the number of pins that were knocked down. Subsequently, the lane database block is updated to indicate the frame, ball, bowler and pin fall, at a block 641. The overhead display, see FIG. 26, is updated at a block 642 to indicate on the score sheet S the new total for the number of balls thrown by the bowler in the particular frame or hole. Thereafter, a decision block 643 determines whether or not the game has been completed for the particular bowler. The game is complete when the bowler has completed either nine or eighteen frames, according to the selected game. If so, then a bowler done flag is set at a block 644 and a game usage counter for the bowler is incremented at a block 645.

Thereafter, or if the game is not complete for the particular bowler, then a decision block 646 determines whether or not the bowler has completed the current frame. The frame is completed if all the pins have been knocked down, as indicated at the block 640, above, or if the bowler has thrown the maximum number of balls for the frame as set at the block 572, see FIG. 25B. As is obvious, the system could be modified so that the bowler is only allowed to throw up to one less than the maximum number of balls. Accordingly, if up to five balls are allowed per frame, and all pins have not been knocked down as of the fourth ball, then it can be assumed that the bowler should receive the maximum score of five for the particular frame or hole. If the bowler frame is complete, then the bowler frame count is updated at a block 647, and the overhead display, see FIG. 26, is updated at a block 648 to show a new total score for the particular bowler and to indicate that the next bowler may begin play in either the current frame or the next frame, according to the bowler sequence. Thereafter, or if the bowler frame is not complete, then a decision block 649 determines whether or not the game is over for all bowlers. This is true if the bowler done flag is set for all of the bowlers playing the game on the lane. If so, then an indication is provided at a block 650 that the game is over. This indication is made on the overhead display, and by providing an indication to the manager's computer 32 providing a full database upload being made to the manager's computer 32 with an indication that the upload was caused by the end of a game.

If the game is not over for all bowlers, then a decision block 651 determines whether or not all bowlers have completed the current frame. If not, then the pin pattern for the current frame is reset at a block 652, as by sending a sweep and set command to the gamesetter 76, so that the next bowler can play the frame using the same pin pattern. If the frame is over, then the pin pattern for the next frame, as selected according to the game variables, is set at a block 653. After the pin pattern has been set at either block 652 or 653, or the game over indication is provided at the block 650, then the routine ends and control returns to the update gamesetter routine, see FIG. 25E.

Figures 1, 25G:
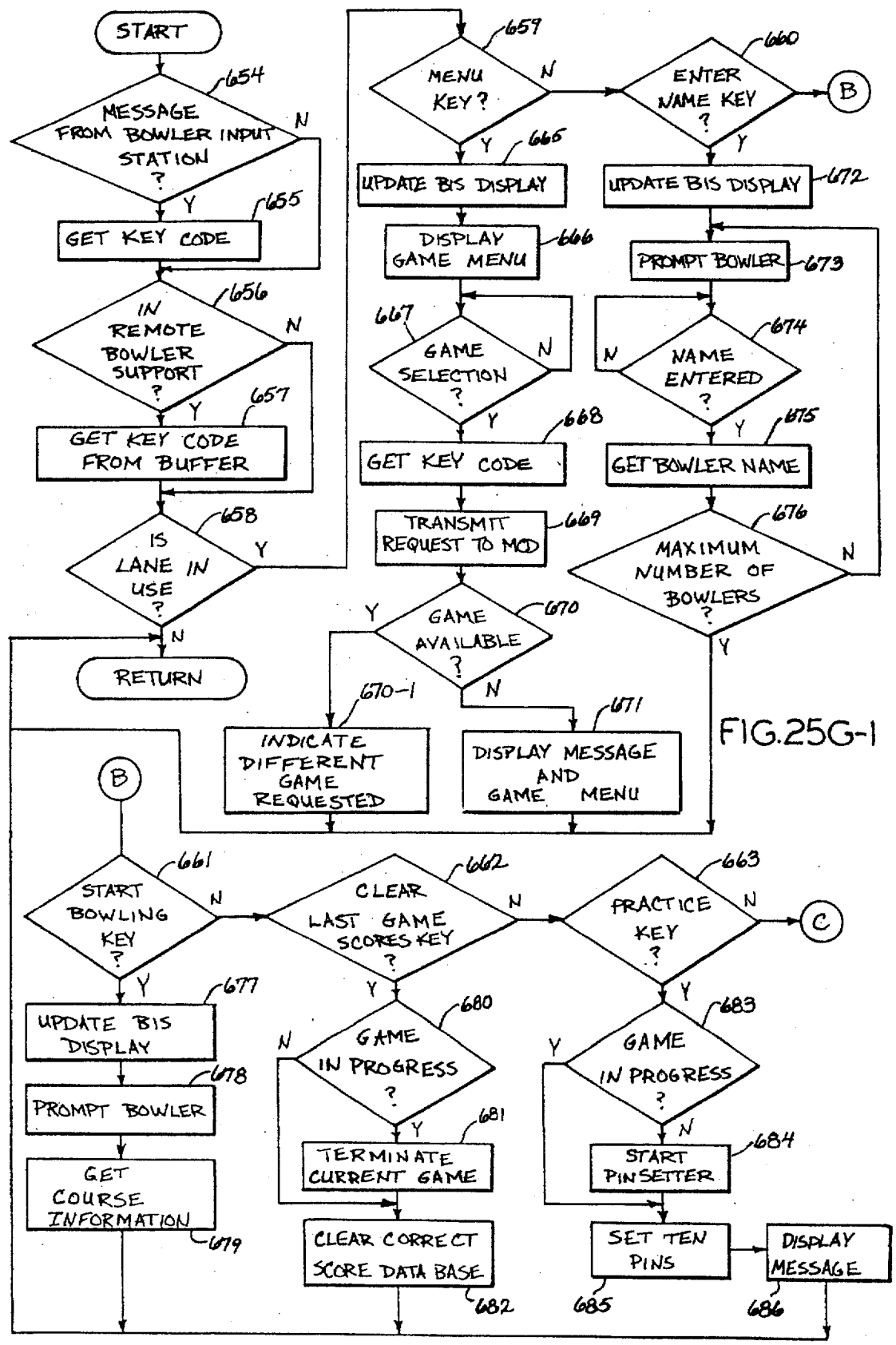
Figure 25:
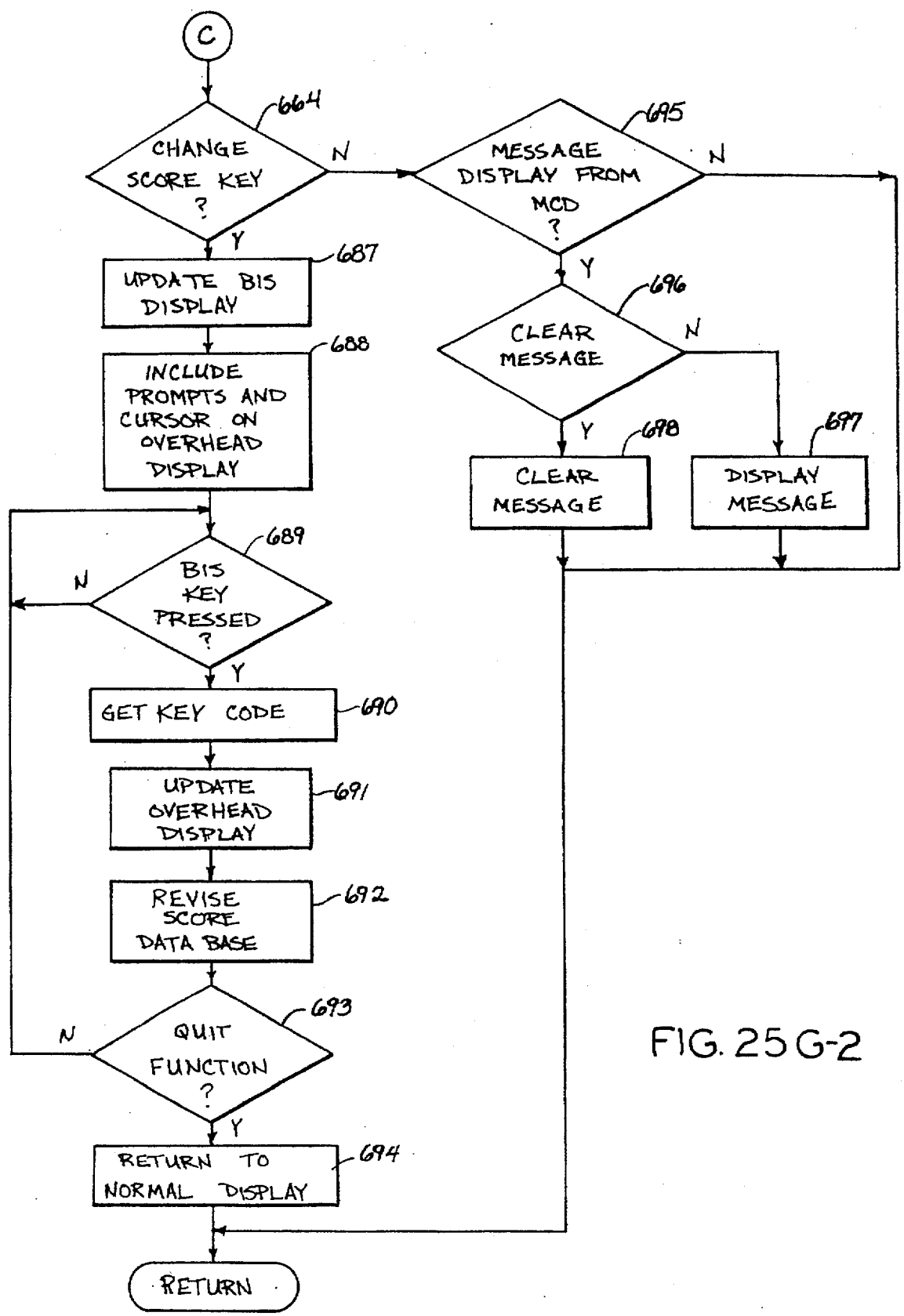

With reference to FIGS. 25G-1 and 25G-2 a flow diagram illustrates the operation of the check user interface routine of block 568, see FIG. 25A. This routine acts on requests made at the bowler input station 18 or 42.

Control begins at a decision block 654 which determines whether or not a message has been received from the bowler input station 18. If yes, then the system gets a key code at a block 655 according to the key which was depressed. Thereafter, or if no message is received, a decision block 656 determines whether not the system is in the remote bowler support mode discussed in greater detail below. If so, then the system gets a key code from the remote bowler support key buffer at a block 657. Thereafter, or if the system is not in the remote bowler support mode, then a decision block 658 determines whether or not the lane is in use. If the lane is not in use, then the routine ends. If the lane is in use, then a series of decision blocks 659–664 are operable to determine what if any key code has been received from either the local bowler input station 18 or the remote bowler input station 42.

If the menu key was depressed,-as determined at the decision block 659, then the bowler input station display is updated at a block 665 and a games menu is displayed on the overhead monitor at a block 666. Particularly, the games menu includes a numbered listing of possible bowling games from which the bowler may request. A decision block 667 waits until a bowler has made a selection as by depressing a number on the bowler input station keypad 328 corresponding to the number of the desired game. Once this selection has been made, the system gets the key code for the number at a block 668 and at a block 669 transmits to the manager's computer a request for the game associated therewith. A decision block 670 determines whether or not the game is available at the manager's computer 32. If not, then at a block 671 a message to this effect is displayed on the overhead monitor 20 along with the games menu. If the game is available, then an indication is made at a block 670–1 that a different game is requested. Thereafter, or if the game is not available, the routine ends and returns to the overall system operation.

If the enter name key has been depressed, as determined at the decision block 660, then the howler input display is updated at a block 672 and the bowler is prompted at a block 673 to enter the names of the bowlers. A decision block 674 waits until a name has been entered as indicated by the enter key being depressed, and responsive thereto gets the particular bowler name at a block 675. A decision block 676 determines whether or not names for the maximum number of bowlers for the game have been entered, or the enter key has been depressed. If not, then control returns to the block 673 to prompt the bowler to enter another name. If yes, then the routine ends.

If the start bowling key has been depressed, as determined at the decision block 661, then the bowler input station display is updated at a block 677. At a block 678 the overhead monitor 20 displays a prompt for the bowler to select a golf course and number of holes to be played. In the preferred embodiment, the game program may provide for the selection of a plurality of different golf courses, along with a selection for nine or eighteen holes or frames. The golf courses differ in the pin pattern provided for each of the holes or frames. The system, responsive to the bowlers selection, gets the course information for the selected game at a block 679. This information replaces the game variables set at the block 572, see FIG. 25B, if a different course is selected. Thereafter, the routine ends.

If the clear last game scores key has been depressed, as determined at the decision block 662, then a decision block 680 determines whether or not a game is in progress. If a game is in progress, then the game is terminated at a block 681. Thereafter, or if no game is in-progress, then the scoring information from the lane database block is cleared at a block 682 and the routine ends.

If the practice key has been depressed, as determined at the decision block 663, then a decision block 683 determines whether or not a game is in progress. If not, then the pinsetter must be started at a block 684. Thereafter, or if no game is in progress, a new set of pins is set at a block 685, and at a block 686 a message is displayed on the overhead monitor 20 at a block 686 indicating that the bowler is playing in a practice mode. This set of pins may be ten pins or less, as desired. The routine then ends. If the change score key has been depressed, as determined at the decision block 664, then the bowler input display is updated at a block 687 and the overhead monitor display is modified to include prompts instructing the bowler to make the necessary score correction. Also, a cursor is provided on the display which can be moved to each score position using the arrow keys of the changes key section 366 of the bowler input station 18, see FIG. 15. A decision block 689 waits for any key to be depressed. If a key is depressed, then the system gets a code for the key at a block 690, updates the score on the overhead display score sheet S, see FIG. 26, at a block 691 to reflect the change, and revises the scoring information in the lane database block at a block 692. Thereafter, a decision block 693 determines whether or not the bowler desires to quit the score correction function as by depressing the quit/escape key. If not, then control returns to the decision block 689 to wait for another key to be depressed. If the bowler has requested to quit the score correction function, then the monitor is returned to display the normal scoring information at a block 694 and the routine ends.

If no key has been depressed at either of the bowler input stations 18 or 42, then a decision block 695 determines whether or not a message display command has been received from the manager's computer 32. If not, then the routine ends. If a message command has been received as above at the block 609, then a decision block 696 determines whether or not the command stored in the buffer is a clear message command. If not, then the buffered message is displayed on the overhead monitor 20 at a block 697. If the command is a clear message command then the message is cleared from the monitor at a block 698. From either block 697 or 698, the routine ends.

Figure 25H:
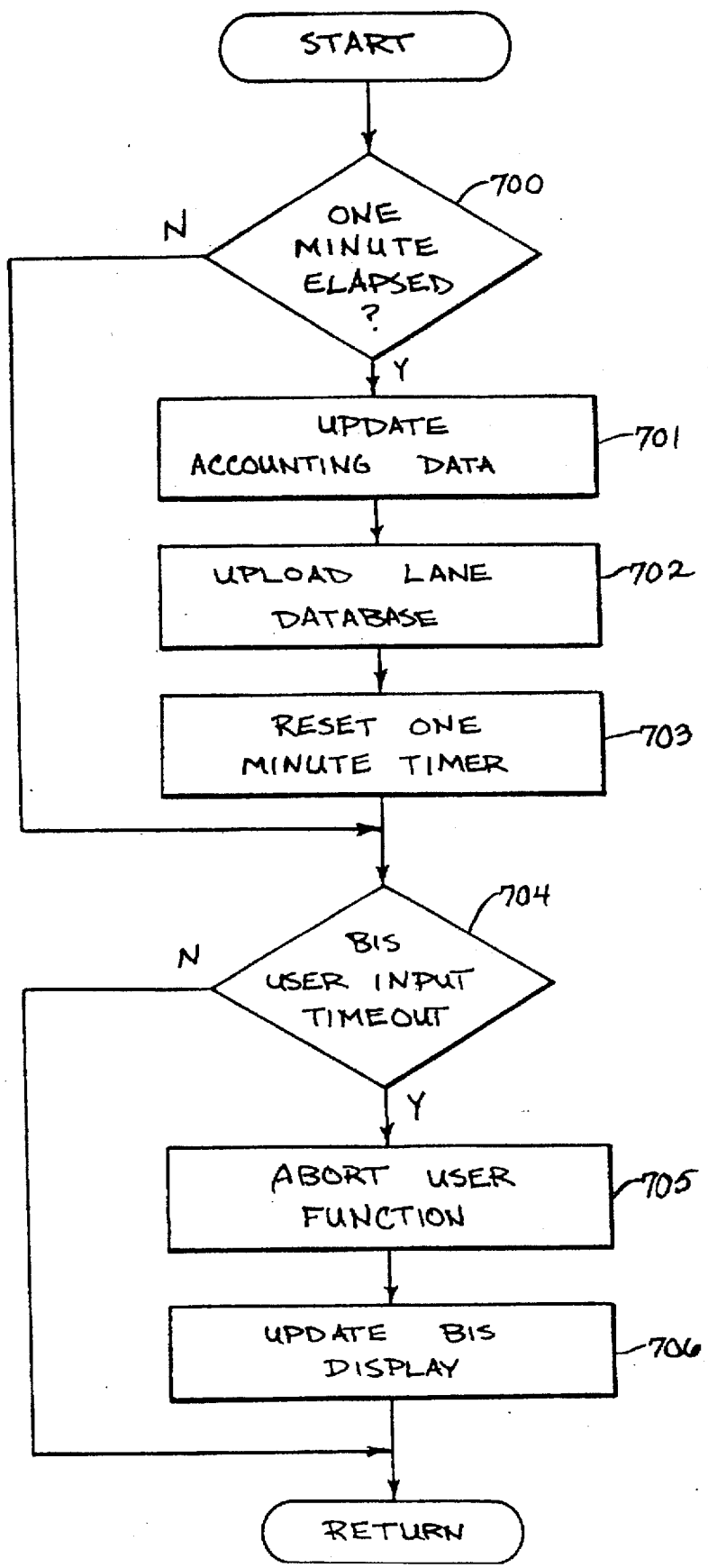

With reference to FIG. 25H, a flow diagram illustrates the operation of the check game timers routine of block 570, see FIG. 25A. Control begins at a decision block 700 which determines whether or not the one minute timer has timed out. The one minute timer is used to provide an indication when time related accounting data is to be updated. This updated data is part of the lane database block which is periodically uploaded to the manager's computer 32. If one minute has elapsed, then the accounting data is updated at a block 701 and any portion of the lane database block which is charged thereby is uploaded at a block 702. Thereafter, the one minute timer is reset at a block 703. Subsequently, or if one minute has not elapsed, then a decision block 704 determines whether or not the bowler input station user input time out has occurred. This occurs if the bowler has not made a necessary selection at the bowler input station within the preselected minimum period of time. If the time out has not occurred, then the routine ends. If there is a time out, then the user function is aborted at a block 705 and the bowler input station display is updated at a block 706. The bowler input display is generally updated by flashing the left lane and right lane keys so that the bowler can make any available selection thereafter. Subsequently, the routine ends.

As is apparent from the above, the simulated golf game is operable upon being set up and initiated to cycle the system through nine or eighteen holes or frames. Within each frame, a preselected pin pattern each comprising any number and pattern of pins is set on the deck for each bowler, each bowler being allotted a maximum number of balls to knock down all of the pins. The scoring is determined by the number of balls the bowler uses in each frame or hole to knock down all of the pins. The score is automatically calculated and displayed on the overhead monitor along with a graphic illustrating the pattern of the standing pins at any given time.

The game program for the simulated golf game, as represented by the flow diagrams of FIGS. 25A–25H can be used generally for any of a plurality of different bowling games. As such, a somewhat generic game program can be provided. The principal difference between the different games resides in the overhead displays produced thereby for display on the monitor 20 along with the scoring algorithm.

Carousel Bowling Game

An example of an alternative bowling game is described in Brim pending application, Ser. No. 118,245, filed Nov. 9, 1987, owned by the assignee of the present application, the specification of which is hereby incorporated by reference herein. This bowling game provides for ten frames of bowling with a sequence of differing pin set ups being selected, the differing pin setups having a constant number of pins, less than ten, for each frame. For example, a game may comprise ten frames of nine pins each for the "missing" pin varying in each frame. The scoring is determined exactly as in the conventional ten pin bowling game, except of course that a bowler is given one "free" pin in each frame since it is only required to knock down nine pins per frame. This game is referred to herein as carousel.

With reference to FIG. 27, a graphical representation is provided of a typical scoring display to be provided on the overhead monitor 20 under the control of the carousel game program. Particularly, the display includes an upper section having a graphic portion illustrating the pin pattern PP set on the deck at any given time. The lower section of the display illustrates a conventional bowler score sheet where the bowlers names may be entered, as well as the score for each frame dependent upon the number of pins which are knocked down, including allowance for spares and strikes.

A flow chart for the carousel game is very similar to that of the simulated golf game shown in FIGS. 25A–25H. Accordingly, only the differences therebetween are specified herein. Specifically, the updating of the overhead differs in the specific graphic shown although both illustrate the pin pattern. Also, a basic bowling score sheet is shown instead of a golf type score sheet in the lower section of the display. With reference to FIG. 25F, specifically the block 642, instead of updating the ball count on the overhead, the carousel game updates the overhead to indicate scoring in a conventional manner, as a function of the number of pins which have been knocked down, rather than the number of balls thrown. Also, the decision block 646 operates differently in that a frame is defined by a bowler knocking down all of the pins or throwing the maximum of two balls in the frame, except for the possibility that three balls may be thrown in the tenth frame. The decision block 643 determines when the game is complete after a bowler has completed ten frames. With reference to FIG. 25G-1, in the carousel game the blocks 678 and 679 are not utilized as there is no need to select a particular golf course or number of holes. However, the program could be modified to enable the bowler to select the number of free pins to be provided in each frame according to the desired level of difficulty for the game. In all other respects, the bowling games are virtually identical.

SYSTEM DESCRIPTION MANAGER'S CONTROL

Manager's Computer

The purpose of the manager's control system 26 is to allow the bowling center staff located at the manager's control desk to control the operation of the bowling center and to maintain certain administrative data about transactions that take place in the bowling center during the day. The manager's computer 32, see FIG. 2, is capable of handling the number of transactions generated by league bowlers on one hundred and twenty eight lanes. This activity includes the normal pin fall transactions as well as peak activity at the end of a game or at the end of a league time. After the completion of a game, scores are being printed out, information is being transferred to and from the league record service computer 34 and new games are being downloaded to the gamemakers 74.

The manager's computer 32 utilizes circuits substantially identical to that for the gamemaker 74. These circuits are discussed above relative to the block diagrams of FIGS. 12A–12D.

Peripheral Devices

The manager's computer 32 communicates with the league record service, or LRS, computing system 34 and the modem 36 using the serial interface DUART 265, see FIG. 12D. The intention of the LRS system is to automate league operation in a bowling center. The manager's computer is capable of inputting operator information for controlling the LRS 34 and to control information exchanged between the LRS 34 and the gamemakers 74.

The manager's computer 32 accepts an input of up to a four digit league number from an operator for transmission to the LRS system 34. The LRS system sends information on bowler lineups back to the manager's computer 32 to be sent to a specific gamemaker 74 for the requested league as designated by the LRS 34. The information relates to, for example, a lane pair and includes LRS League I.D. Number, the team name for each lane, and individual bowler information records.

When the LRS system 34 transfers a lineup roster to a particular gamemaker 74, it expects to receive score information back from the specific gamemaker 74. If teams are moved to another gamemaker 74, the LRS system must be informed of this change so that it will relate game score information from the new gamemaker 74 assignment properly. This also results in the lineup information being retransmitted to the new gamemaker 74. To implement such a move the manager's computer 32, responsive to operator inputs, transmits to the LRS 34 the lane number currently set up for use and the one to be used in place of it.

The LRS system 34 waits for all information from all gamemakers 74 associated with the league to be completely received before it processes the data. If for some reason data is not to be sent back from a particular gamemaker 74, then the LRS system 34 must be informed not to expect it. Therefore, the manager's computer 32 transmits to the LRS system 34 an indication of a lane to be disconnected. Additionally, a facility is provided so that in the event of LRS system failure, the LRS operation is cleared from the gamemaker 74.

As individual league games are completed, the manager's computer 32 transfers game information back to the LRS system 34. This is done automatically with the additional ability for the operator to force the information transfer. As game information is sent back to the LRS system 34, the LRS system 34 acknowledges that it has received the information.

The manager's computer 32 communicates with the modem 36 and controls operation of the modem 36 for communicating with remote computers. The modem 34 is used for remote diagnosing of software problems in the bowling center system and for updating software.

Manager's Local COM Line Devices

The manager's computer 32 controls operation of the remaining associated devices utilizing the RS232 communication circuit 38 connected to the local COM line 29. This converter circuit 38 is identical to the converter circuit 78 associated with the gamemaker 74, discussed above relative to FIG. 13. Therefore, reference should be made to the discussion relative to FIG. 13 for a detailed description of the RS232 converter circuit 38.

An RS232 converter circuit 38 controls the interface with the video switch 40. The video switch 40 is identical to the video switch 73 associated with the gamemaker 74, discussed above relative to FIGS. 16–19. Particularly, the seven VIDEO IN ports are connected to the three lines of the video score transmission line 70 and to four selected lines from the video driver 56. The VIDEO OUT ports are not utilized since this function is performed by the video driver 56. The SCORE IN ports are connected to three of the video sources 52. The three SCORE OUT ports are connected to the input side of the video driver circuit 56. The video monitor switches 372 receive RGB video signals over lines 58L, 58R and 58S from the manager's computer 32. The lines 58L, 58R and 58S correspond to the respective lines 274–276, see FIG. 12C, from the RGB driver circuits 262–264. The RGB video signals from the monitor switches 372L, 372R and 372S are respectively connected to the RGB monitors 72L, 72R and 72S.

The video driver circuit 56 comprises conventional amplifier circuits for each of the seven video lines. The amplifier circuits enable transmission of the video signals to all of the lane pair control systems 16. The audio driver circuit 62 also includes conventional amplifier circuits. In the preferred embodiment, the audio signals which are transmitted comprise monaural type signals. However, the system could be implemented transmitting stereo signals, as is well known to those skilled in the art.

The video switch 40 is operable in conjunction with the video driver circuit 56 to multiplex video information over the seven video transmission lines from up to ten video sources, namely the seven video sources 52 and the three video score transmission lines 70. Particularly, the video driver circuit 56 receives video signals over the video lines 53 directly from four of the video source devices 52. The remaining three video signals are received over the line 60 from the SCORE OUT port of the video switch 40. The video output switch 374 of the video switch 40, see FIG. 16, can be controlled to selectively connect the SCORE IN ports, which are connected to the remaining three video source devices 52, or in conjunction with the monitor switches 372 and the video input switch 370 to connect any of the three video score transmission lines 70, which are connected to the VIDEO IN ports, to the SCORE OUT ports.

As discussed above relative to the video switch 73, normally the SCORE IN ports are connected directly to the SCORE OUT ports so that the seven video signals amplified in the video driver circuit 56 are generated by the seven video source devices 52. When it is desired to operate in the tournament mode, the video switch 40 is controlled in order to interconnect a selected VIDEO IN port with a selected SCORE OUT port so that scoring information from a score transmission line 70 is retransmitted over a global video transmission line 61 for display at selected monitors throughout the bowling center.

Figure 18:
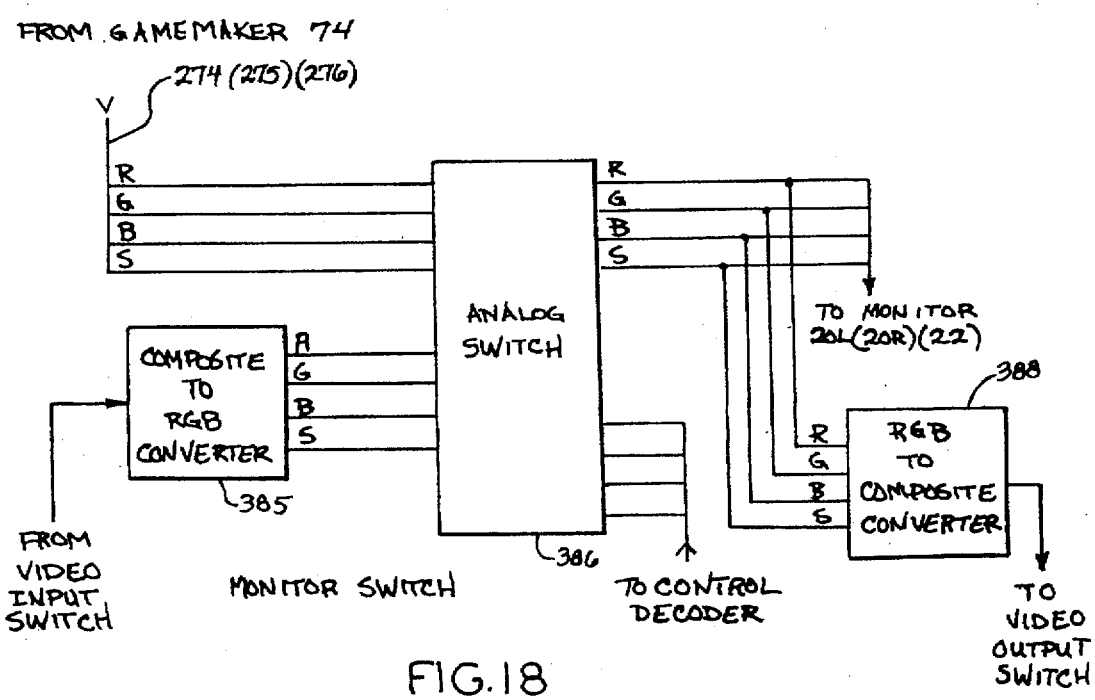
FIG. 18 is a block diagram of a circuit for the monitor switch blocks of FIG. 16.

The video switch 40 is operable using the monitor switches 372, see FIGS. 16 and 18, to transmit RGB video signals from the manager's computer 32 to the monitors 72. If it is desired to display score information from a particular gamemaker 74, then the video input switch 370 and the appropriate video monitor switch 372 are switched under the command of the manager's computer 32 to connect the particular video score transmission line 70 to one of the three monitors 72. Similarly, if it is desired to view a video program from one of the video sources 52, and if such video is received at one of the four VIDEO IN ports from the video driver circuit 56, then it can be switched in a similar manner to any of the monitors 72.

Although the video/audio control system 28 is described utilizing seven video source devices 52 and seven global video lines 61 and audio lines 68, additional sources and/or lines could be utilized. Particularly, additional source devices could be multiplexed through suitable switching devices for transmission over the seven lines. By adding additional driver circuits and the capacity of the switching circuits, the number of global lines could also be increased, if necessary or desired.

The bowler input stations 42 are identical in construction to the bowler input stations 18 associated with the lane pair controls 16. For a specific description thereof, reference can be made to the disclosure related to FIGS. 14 and 15 hereof. Specifically, one of the functions of the manager's bowler input station 42 is to remotely override the operation of the bowler input station 18 at the lane pair, as for score correction, or any other bowler input functions. Therefore, the keyboard overlay 328 at the bowler input station 42 generally includes the "Changes" key section 366 to enable score correction to be accomplished, as is discussed in greater detail below.

The printer 46 is a conventional graphics type printer interfaced to the manager's local COM line 29. The printer is used to print score sheets and other information in a character graphic format similar to that displayed on the monitor 72. The printer 46 is utilized to obtain a game score printout for any of the most recent ten current game score results from any of the lanes. The lane control 16 can be configured by the manager's computer 32 under the game control process, such that the latest game score results, or series of game score results, are automatically printed when the scoring information is uploaded to the manager's computer 32 and the lane is cleared. The specific print out is for the type of game which was in use at the lane. Up to ten such printers could be utilized. Also, up to ten coupon printers could be connected to the COM line 29 using converter circuits 38. The coupon printers could be utilized, for example, for prize awards.

The manager's computer 32 communicates with the DTS cash register 50 for handling charge control accounting information. This information relates to various manners of billing or payment for lane rental within the center. For lane set up and termination, the DTS cash register 50 transmits requests to set up lanes for use, to extend the current time period or allowed number of games or frames, or to clear current use. Responsive thereto, the manager's computer 32 handles the turning on and setting up of a selected gamemaker 34. For accounting purposes, the manager's computer 32 keeps track of the actual usage of the lane. The manager's computer accounts for time and games or frames bowled in the various modes of gamemaker operation and transmits same to the DTS cash register 50 for appropriate charge control of a bowler.

The DTS cash register 50 is a Data Terminal System model 521 electronic cash register which interfaces with the manager's computer 32 over the manager's local COM line 29 through the DTS interface board 48. The DTS interface board 48 comprises a Z-80 processor based terminal interface computer board connectable to the DTS interregister communications bus. The interface board 48 is RS232 compatible. The cash register 50 provides all information necessary to facilitate a convenient billing and charge control system. Particularly, the cash register 50 can be set up to operate in a prepaid mode or a post paid mode wherein a customer pays for bowling either before or after completion thereof. In the prepaid mode, a bowler pays the cashier either to play a specified bowling game or play from a preselected menu of bowling games for a preselected period of time. The particular bowling games selected would depend on the amount paid. Thereafter, the cash register transmits information to the manager's computer 32 indicating that the bowler should be allowed to play a bowling game on a given lane. Thereafter, the manager's computer 32 is operable to set up the specified lane for operation. The post paid mode operates similarly, except that payment is made when the bowler has completed playing.

Each of the three keyboards 44 is a conventional IBM PC AT type and generates a serial format signal. Each keyboard 44 includes a conventional typewriter style alphanumeric keypad as well as a plurality of function keys. The keyboard 44 is used as an operator input device to the manager's computer 32.

The video source devices 52 comprise video cassette recorders/players or laser disk players which provide for playback of video and audio signals to monitors within the system. One example is the Pioneer Laser Disc Player, Model LD-V6000 Version. 3, the User's Manual of which, number TP109 Version 3.2, dated Sep. 14, 1984, is hereby incorporated by reference herein. The Laser Disc player includes an RS232 interface circuit for connection to external control devices from which command signals are received. Via this interface, two way transfer of command signals is possible. These codes can be used to initiate the playback of a selected program stored on a video disk. In this sense the video disk acts as a memory device. The disk player reads video and audio data from the disk, converts the data to the appropriate format and generates video and audio signals representative thereof for transmission on the lines 53 and 54. The serial input circuit is operable to select the particular program or segment on the disk to be played for transmitting the necessary video and audio signals over the respective audio and video lines 53 and 54.

Manager's Computer Software

The manager's computer 32 utilizes a software system consisting of a group of processes or tasks executing under control of the Microware Systems Corporation OS-9/68000 operating system. This operating system provides real-time multi-processing capabilities in addition to a UNIX-like file system interface. During power up, the system runs through a series of diagnostic routines which are resident in the EPROM 204, see FIG. 12A. If the routines are completed successfully, then the diagnostics determine that the board is configured as a manager's computer 32 and passes control to the OS-9 routine resident in the EPROM 204. The boot routine then causes booting of the OS-9 operating system off of the floppy disk 272 or the hard disk 270, see FIG. 12D.

Interprocess communication is carried out using the standard features of the OS-9 operating system, in particular the "data module", the "pipe" and the "events signal" features. Data modules are a high speed method of sharing or transferring data between processes. Pipes are a method of connecting the output of one process with the input of another concurrently executing process in a FIFO manner. Event signals (semaphores) are a mechanism for synchronizing the activities of two or more processes and for protecting a shared system resource from being accessed simultaneously by several concurrent processes.

The manager's computer operating system has multiple processes running concurrently controlling various devices, such as the global and local COM lines, 27 and 29 respectively, the serial ports 266 and 267, the hard disk 270 and the floppy disk 272. Most processes are designed to place themselves into a suspended state via a "sleep" system call in order to take them out of the execution queue. The sleeping processes are awakened when they have available whatever data or conditions are needed to complete their tasks thereby loading down the main CPU 200 as little as possible with the execution of processes that have no useful work to accomplish. The high-level executive is awake and running at all times in order to coordinate the various sub-processes running under its control.

Figure 28:
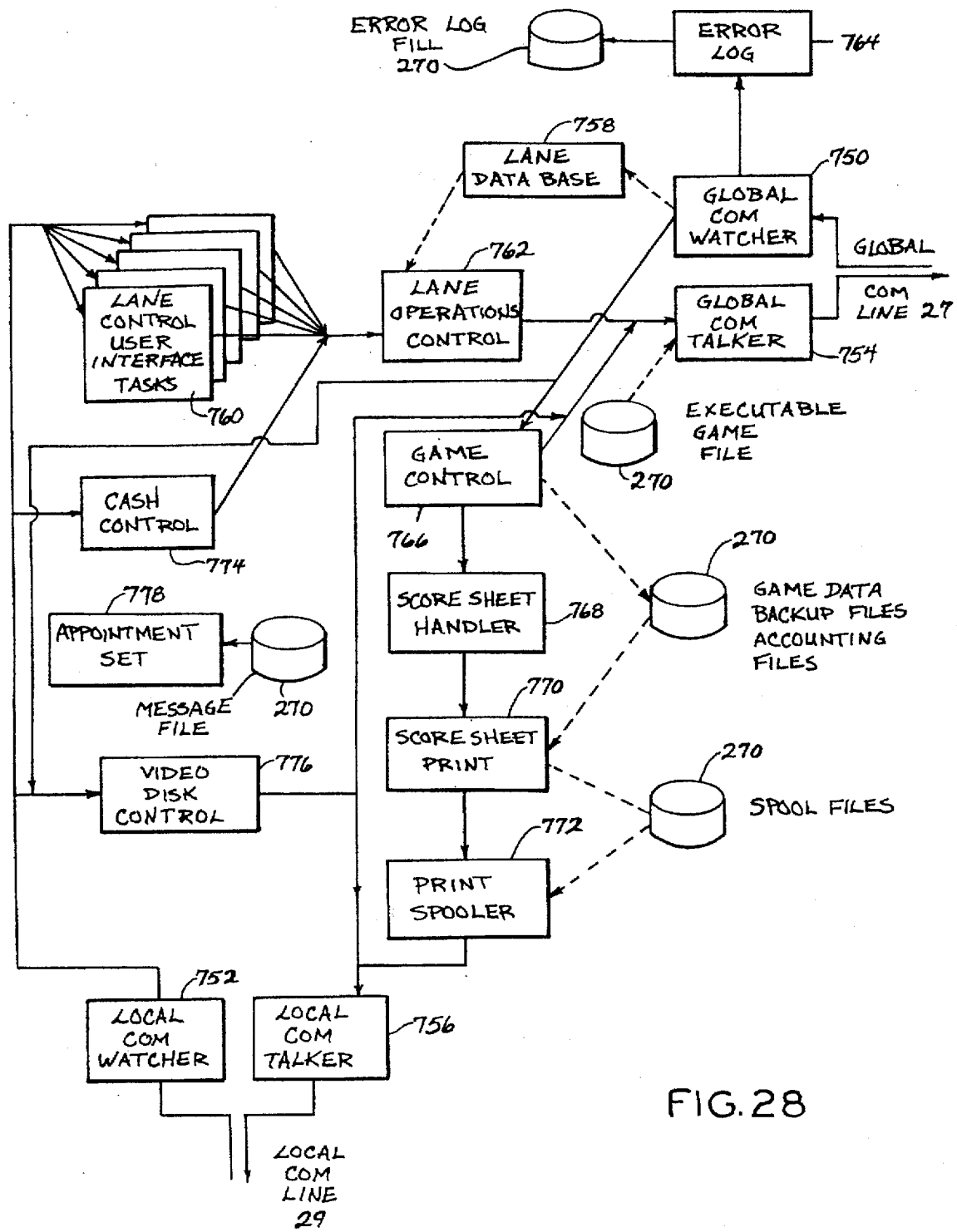
FIG. 28 is a block diagram representation of a process overview for software operations of the manager's computer.

With reference to FIG. 28, a block diagram represents a process overview for software operations of the manager's computer 32.

A number of individual processes constitute the manager's computer software. Many of the processes are not normally accessed directly by the main CPU 200 but instead operate in response to information received over either of the COM lines 27 or 29. The processes receive the information over their own private pipe. This pipe provides the queueing needed to allow the manager's computer to handle several similar operations at once such as multiple game down loads. The processes spend most of their time asleep. They are awakened by their respective global or local COM watcher sub-processes 750 and 752 when information for either has been received over its associated COM line 27 or 29. The awakened process then processes the received information. When the processing has been completed, the process checks for more data in its pipe, indicating that service requests had arrived while the last request was being serviced. If more data is found, then the cycle is repeated. If the read to the pipe is not successful, indicating that no request had arrived since the last one that had activated the process, then the process puts itself to sleep to remove itself from the execution queue.

The following is a list of major processes included in the system:

1. System start up/configuration;
2. Communications managers
3. Lane control
4. Game control
5. Score correction
6. Printing
7. Cash control
8. Modem control
9. Video switching
10. Video disk control
11. League record service The system start up/configuration process is run immediately after the OS-9 operating system has been booted off of disk, has been initialized, and is running. This process differs from all of the others in that it is actually a shell command file rather than an OS-9 task. It creates the various pipes and semaphores needed by the other tasks and also spawns the different processes needed on the manager's computer. Any needed information such as process ID numbers are passed to the created processes as required. This process terminates upon completion. The created processes are responsible for initializing themselves and for reading any required configuration data from the system configuration file.

The communications manager process includes global and local COM watcher sub-processes 750 and 752, respectively, which handle the receipt of information from the respective master and local COM lines 27 and 29 respectively. The process is awakened whenever any device on the associated COM line needs servicing. The process evaluates the request and passes the received information to the appropriate process. A global COM talker sub-process 754 is the only process that talks on the global COM line 27. All of the other processes must communicate on the global COM line 27 through this sub-process. The global COM talker sub-process 754 is normally asleep but is awakened by any other processes placing data into the global COM line data out pipe. When a packet transmission is completed, it checks for more data in the incoming pipe. If data is present, then the transmission sequence is repeated, otherwise the communications manager process puts itself to sleep. A local COM talker sub-process 756 operates in exactly the same manner as the global COM talker sub-process 754 except for obtaining data from a local COM line output pipe when talking to the local COM line 29.

A score back up sub-process records the pin falls and game state data of all games in progress throughout the bowling center automatically under control of the communications manager's process. The in progress data is saved to a lane data base block 758 of memory in the manager's computer CMOS RAM 206. This is a different process from the score back up which is done as part of closing out of a game since that data is recorded on the hard disk 270.

The lane control process, discussed more specifically below, consists of a set of user interface tasks 760 which interact directly with the user of a manager's computer 32, plus a lane operations control process 762 and an error logging process 764. Particularly, the user interface process 760 is responsible for receiving operator inputs from the local COM watcher 752, initiating or completing operations in progress at the lanes, and displaying various types of bowling center status information. All of the operator commands are processed through these tasks. The lane operations control process 762 provides a common control point for changes to lane operational data. Error logging 764 is a background process to maintain a history of system errors.

The game control process 766 is responsible for servicing game download requests from the gamemakers 74. It makes requests to the communications manager's process to do the actual download. It also handles the close out of lanes and data back up by saving accounting and score data to hard disk 270.

The score correction process allows the manager to interact with a bowler input station 42 connected to the manager's computer 32 as if it were connected to a gamemaker 74. Additional functions, such as score correction, which may not be available at the lanes, are available to the manager. This process makes use of the video line allocation task and video switching to display the lanes video to the manager's computer 32.

The printing control process includes a score sheet handler sub-process 768, a score sheet printing sub-process 770 and a print spooler sub-process 772. The score sheet handler sub-process 768 receives requests from the game control 766 to print a particular game score sheet using the game data from a lane. The handler passes the data to the correct score sheet printing task 770 to format the output data. The score sheet printing sub-process 770 is a custom program for each game to provide the unique format required for the game score sheet layout. The print spooler sub-process 772 provides disk spooling and output control for data being printed.

The cash control process 774 responds to requests from the DTS cash register 50 on the local COM line 29. Such responses are transmitted to the lane operations control sub-process 762. The operator is able to start up or extend lane operation by prepaying for a lane at the cash register.

Transfer of files from a remote computer and access to the manager's computer from a remote terminal via the modem 36 is provided through standard utilities supplied with the OS-9 operating system.

The video switching is handled under the video switching process by sending control characters through serial data converter circuits to a serial port on the video switches 73 or 40. No separate task is required for this. However, the allocation of video lines for use by a process is arbitrated by a video line allocation routine, discussed more specifically below. A video disk control process 776 handles the user access to video disk selections by providing a menu created by a menuing utility. The request for a particular menu selection is made to the video disk control process 776 which then sends out the proper control characters through the RS232 control circuit 38 to a serial port on the selected video source device 52.

Lane Control Process

The principal purpose of the manager's computer 32 is to provide computer-assisted control of bowling center operations. The lane control process accepts user commands, partitions the commands into logical functions, and initiates the required processes to perform these functions. In so doing, the lane operations control 762 performs three major functions:

1. Display of current bowling center conditions;
2. Operator alteration of center conditions; and
3. Communication to other tasks or to gamemakers 74 to perform the desired alterations.

The software to support lane control functions uses special function keys on the keyboard 44 to execute a specific function. Each function key is-associated with a specific software module. Specific functions utilized are:

1. Bowling center status
2. Bowling center activity accounting
3. Special bowling center support
4. System support and information back-up
5. Bowler support
1. Bowling Center Status The bowling center status function uses the monitors 72 to provide the operator with information on current center utilization, which is displayed in tabular form. Particular information provided relates to a lane number, operational status of the lane, current lane operation selections, such as type of payment and game in operation, and general information such as the current frame and the number of bowlers on the lane. This information is displayed in a variety of formats centered around a hierarchy of displays.

A general overview format is capable of displaying status for all lanes in the center, up to 128, on one screen and generally indicates using status codes and colors the lane operations selections and operational status of the lane. The next format is a lane usage format which shows information generally necessary for operation of the center for up to sixty lanes. In addition to showing lane status as in the overview format, charge information is also shown. A lane operation format provides information for up to twenty lanes. In addition to the lane usage format, information relating to the particular game being played is displayed. Lastly, the lane detail format shows all of the available information for a single lane on one display. The information is presented in text format. From any of the bowling center status format displays, the operator can progress to a lane set up display. Particularly, the operator enters either a single lane number or range of lanes that are to be changed to a common state. The display includes pertinent data and directions based on the current items of information that are selected. The operator may then enter the changes to be performed on the lane or lanes.

With the lane set up display, the operator can, for example, assign a lane as being in use or vacated, set up a payment mode for the lane, specify a game to be downloaded to the gamemaker 74 for a particular lane and set the lane to provide an automatic score print out at the end of each game or a series print out at the end of a game series, such as in league play.

2. Bowling center Activity Accounting

The bowling center activity accounting function provides the operator with a total accounting of the utilization of the center since the last instance when the accounting records were cleared. Information is displayed in tabular form on the monitors 72. Displays which are available under this function include lane usage, game usage, an error log, an access log and a score correction log. A lane pair utilization report can also be generated. The lane usage display shows the operator a break down of the use of the entire center on a lane by lane basis, broken down into categories for league games, practice games, prepaid bowling, postpaid bowling and lane totals. The game usage display shows the game and time usage of each game package installed in the system. It gives the summary of the payment type that was used for each game, along with a percentage of use by payment mode and total requests for the game. The error log is an accumulation of all errors detected by the system. The access log accumulates improper access to specified manager's computer functions, including attempts to access privileged functions and attempts to fault the system, such as detection of components being unplugged.

3. Special Bowling Center Support

The special bowling center support function allows the selection of functions that assist the operator in the general operations of the center. A menu display is provided which shows the sub-functions which can be selected:

1. Display on multiple lanes
2. Lane transfer
3. Gamemaker message display
4. Gamemaker color definition
5. Center control
6. Appointments set
7. Time set
8. View video The operator is prompted to enter the number of the sub-function to be executed.

The display on multiple lane sub-function is used for tournament display where it is desirable to display the scoring information from a single lane or lane pair on the displays on other lanes or lane pairs. Selection of this sub-function results in the manager's computer 32 controlling operation of the gamemaker video switch 73 associated with the single lane pair so that the video scoring data is transmitted therefrom on the video score transmission line 70. The manager's video switch 40 is controlled so that such video scoring information is retransmitted on one of the global video transmission lines 61. Lastly, the gamemaker video switches 73 at other lane pairs are switched so that the overhead displays 20L and 20R thereof receive the video scoring information from the global video transmission line 61, as discussed above.

The lane transfer sub-function enables the operator to transfer bowlers from one lane pair to another. This is used to move bowlers from a disabled lane without loss of their current information. The operator enters the lane number from which the information is to be moved and the lane number to which the operation is to be transferred. If cross lane operation is indicated on the lane information as being transferred from, then the operator may request that both lanes of the gamemaker should be transferred. The manager's computer 32 uploads all necessary bowler information from the gamemaker 74 specified. If this can not be done due to a system problem, then the information that the manager's computer 32 has in its own memory can be loaded to the new lane instead.

The gamemaker message display sub-function allows the operator to design and transmit a text screen to a lane or range of lanes. The operator can edit a message for display, save or load a message to or from disk storage, or send a message to selected gamemakers 74. This sub-function displays the names of available stored messages present on the system and the names currently loaded for transmission. Messages are transmitted to a gamemaker 74 from three temporary buffers which allow for a separate message to be sent to any of its three available displays.

The gamemaker color definition sub-function allows the operator to define operational conditions and color definition for use at the manager's computer monitor 72 and the gamemaker monitors 20 and 22. Particularly, the operator can designate a color combination for a specific use at the gamemaker, designate a league sequence which is a set of gamemaker color combinations, and select default conditions settings.

The bowling center control sub-function allows the operator to selectively turn specific lane facilities on or off. These facilities include, for example, the gamemaker overhead displays 20L and 20R, pinsetter peripherals, e.g., foul detector unit 92, see FIG. 6, and the ball trajectory unit 80. Also, this sub-function allows the operator to command the the pinsetter 14 to set a specific configuration of pins, or to inhibit video to the remote area monitor 22 or to disable the remote area keyboard 24. In the center control sub-function, the operator selects the lane or range of lanes to be altered. The current settings for each lane in the range is illustrated on the monitor 72 and the operator selects the lanes, the facility to be changed and the state to which it should be set.

The appointment set sub-function 778, see FIG. 24, is resident in the bowling center system to remind the operator of certain events that are to take place during center operation. The operator can set the system to have a message which is stored on the hard disk 270 appear on the error/message line allocated in the format of each display. This sub-function is used to set the entries used to display these messages. The calendar clock circuit 221, see FIG. 12A, provides the time and day necessary to generate such a reporting function.

The time set sub-function allows the operator to view or set the current time and date stored at the manager's computer 32.

The view video sub-function is used when it is desired to preview on a monitor 72 a video display segment from one of the video source devices 52 having their associated video output lines 53 connected directly to the video driver circuits 56. This sub-function can also be used to view the video score display from a particular gamemaker 74 when in the tournament mode. Particularly, this sub-function results in the video switch 40 being controlled to switch one of the video signals received at one of the seven VIDEO IN ports to one of the monitors 72 at the manager's control desk. Specifically, the video switch 40 is controlled, as discussed above, so that the selected monitor receives video signals from the selected score transmission line 70 or video line 61 rather than from the manager's computer video line 58.

4. System Support and Information Back-Up

The system support and information back-up function allows selections that assist the operator in controlling the system. The selection allows an operator to change system configuration, set default operation conditions, and access support facilities. Because the operation of the selections available under this function affect the system operation, security authorization is required before any selection is made. The operator must enter an identification and a corresponding password before the menu of selections can be accessed. The sub-functions which the operator may access include:

1. Manager's computer terminal set up
2. Gamemaker game support
3. Default function set up
4. System information back-up/restoration
5. Password entry
6. Center lane configurations
7. System shutdown
8. Remote diagnostics The manager's computer terminal set up sub-function allows the operator to alter terminal device information related to the manager's computer 32. Up to three monitors 72 and keyboards 44 can be connected to the manager's computer 32. If desired, the area of the center that can be controlled by a particular terminal may be specified. Thus, different operators would only be concerned with a portion of the center. Also, color definitions for manager's computer functions and global functions can also be specified under this function.

The gamemaker game support sub-function allows the operator to perform a variety of operations relating to the game modules that are downloaded to the gamemaker 74. Specifically, the operator may load a new game for use in the system from the floppy disk and define game options default settings for each game which includes any such options.

The default function setup sub-function permits default values to be predefined for various functions in the system. This allows the operator to define various parameters and a default setting of these parameters based on other parameters. For example, when setting up a lane, if prepaid time is selected, then a default print out selection or rate level may be defined.

The system information back up/restoration sub-function allows the operator to save or restore different areas or files on the manager's computer hard disk 270. For example, the operator can save activity accounting information relating to either lane or game utilization to floppy disk before clearing it from the system. Also, default parameter information can be saved. If new software updates become available, then the operator can install the new software off of a floppy disk for use in the system. Depending on the new program loaded, the operator might be instructed to restart the system to make use of the new program.

The password entry sub-function permits up to fifteen passwords to be defined. This allows up to fifteen individual operators to be defined to have privileged access to a variety of functions in the system, with each such operator being assigned a specific access level.

The lane configuration sub-function allows alteration to the configuration file which contains entries that define the characteristics of the bowling center for specific lanes.

The system shutdown sub-function is used when the manager's computer 32 is to be turned off, since the shut down must be done in a controlled and orderly fashion. This sub-function is used by the operator to perform all necessary operations previous to shutting off power on the manager's computer.

The remote diagnostics sub-function is used to access the results of any gamemaker's power up diagnostics. Also, this sub-function can be used to command the gamemaker 74 to perform diagnostic routines. Results received from the gamemaker 74 are used in generating the error log display discussed above under the bowling center activity accounting function.

5. Bowler Support

The bowling support function allows the operator to support bowlers at a gamemaker 74 from the manager's computer 32. Facilities available through this function include score sheet or ball trajectory printing on demand, change game options and gamemaker user interface operation. The score sheet on demand sub-function allows the operator to have a score sheet printed out. The ball trajectory raw data on demand sub-function allows the operator to have raw data from a ball trajectory record printed out. In either case, the operator enters the lane number from where the score sheet or trajectory data is to be printed. In the latter case the bowler name, frame and ball number must also be entered. The gamemaker user interface operation allows the operator to interface with gamemaker functions remotely from the manager's computer 32. An initial display requests the lane to which support is to be done. Details of this operation are discussed in greater detail below under remote bowler support.

Under the change game operation, various options may be selected which affect the overall operation of the game. For example, when a bowler sees a certain result, such as a strike or spare, an exciter graphic may be generated for display on the overhead display 20. In certain instances, it may be undesirable to use such exciter graphics. The change game options sub-function can be used therefore, for example, to set default parameters regarding the use of the particular option during game play.

To support the user interface tasks 760, two background tasks which run on the system provide for lane operation control 762 and error log 764.

The purpose of the lane operation control task 762 is to provide a common control point for all lanes on the system. When an operator task desires to make a change to lane operation, it alters a data module in memory and a hard disk image of that module. This information is also transmitted to the gamemaker 74 for that particular lane for backup purposes. The lane operations control 762 compares this set operation to the current condition of the lane, which is being automatically updated by the communications manager's process. The lane operations control 762 detects any alterations that need to be made, and transmits simple control oriented commands to the gamemaker 74 to perform such changes. For example, the lane operations control 762 watches the time remaining if a lane is in a prepaid time mode. When the time remaining is less than a preselected warning period, the proper color combination to indicate that condition at the lanes is sent to the gamemaker 74. When the time period is complete and the lane is to be automatically shut down, then the pinsetters 14 and bowler input station 18 are turned off. After the set amount of display time is depleted, then the video screens are turned off.

The error logging task 764 provides a central point for other tasks in the system to save error occurrence information. If an error is detected by a task in the system, then a specific code number associated with that error is passed into a named pipe so that the error occurrence can be saved. When a code is received this task reads the pipe and takes that number and saves it into the error log file on the hard disk 270. It also saves the time and date indicating when the code is stored into the log file.

Lane Control Information Structure

In general, all lane control operations deal with the display and alteration of information within the system, either at the manager's computer 32, or at the gamemaker 74. The information is stored in either the DRAM 202, the CMOS RAM 206 or on the hard disk 270.

The CMOS RAM 206 is used principally to retain gamemaker status information. The memory is subdivided into equal segments for the maximum number of lanes, one hundred and twenty eight, that can be attached to a manager's computer 32. Information stored in each segment is an image of an analogous segment held in each gamemaker 74. This information is the minimum information required for backing up the gamemaker operations on that lane.

A data module comprises an allocated memory section of the DRAM 202 which is used to retain information. The main purpose of storage in this manner is to hold information which is frequently accessed during manager's computer operation. In most cases, the information stored in this manner is a duplication of data stored on the hard disk.

The hard disk drive 270 attached to the manager's computer 32 is used for information that must be retained on the system.

The hard disk includes the following files:
1. Lane usage file
2. Game usage file
3. A terminal device configuration file
4. Gamemaker configuration and set up file
5. Game module configuration file
6. Message storage file
7. Reminder messages file
8. Global color/default lane set up data file
9. Gamemaker color combination file
10. Default gamemaker definition file
11. Video segment definition file
12. Password file
13. Game score back up file
14. Ball trajectory data back up file
15. Executable game files The lane usage file is an accounting of lane usage. It stores time, frame and pinsetter cycle information for each lane, with separate accumulation by mode. The game usage file is an accounting of game usage. It holds time, frame and pinsetter cycle information for each game, with separate accumulation by mode. The terminal device configuration file defines the range of lanes that can be accessed by each manager's computer terminal.

The gamemaker configuration and set up file contains information for the configuration on each lane in the system. It includes data on the peripheral components that are attached to each gamemaker 74 for each lane. The game module configuration file stores all information pertaining to a game module that is loaded onto the system for use on a gamemaker 74. This includes reference information, such as module file index and display name string, and operation information, such as lane configuration needs and charge rate definition. The message storage file stores text messages which are to be displayed at the gamemaker monitors. The reminder messages file stores messages which are accessed by the appointment set sub-function 778. The global color/default lane set up data file defines the colors that are displayed when a specific condition exists on a lane. The gamemaker color combination file contains the settings for the available color combinations to be used at the gamemaker 74 and the league sequence color definitions. The default gamemaker definition file contains gamemaker default operation information. This includes, for example, the selection of exciter graphics discussed above.

The video segment definition file includes address information for each video segment available from a gamemaker menu selection at the remote area terminal 21. Particularly, this address indicates the starting and ending position for the particular video segment on a disk loaded into a particular video source device 52. The password file includes the passwords for each of the individuals allowed access to the system.

The game score back up files and the ball trajectory data back up files include historical information for the last ten bowling games played on each lane. The executable game files comprise the actual game program files which are downloadable to a gamemaker 74 for game play.

Game Control

The purpose of the game control process 766 is to support the gamemaker 74 by initiating the download of game menu files, and executable game files. The game control process 766 also maintains a hard disk copy of game usage statistics for all games installed in the system, a hard disk copy of lane usage statistics for all lanes installed in the system and a hard disk record of pin fall data for the last ten games bowled on each of the lanes. The game control process maintains game scores for the purpose of printing score sheets of games in process and initiates the automatic printing of game score sheets.

The game control process responds to the following requests:
1. Request game code
2. End of game
3. Lane vacate
4. Print score
5. Request game menu
6. Trajectory data save
7. Database lane transfer The game code request is transmitted from a gamemaker 74 to the manager's computer 32 when a bowler has depressed the game select key or the manager's computer lane control process has requested the start of a game that is not currently loaded in the gamemaker's memory. This task then initiates transmission of the object file to the gamemaker and updates the game usage file. If the start of game play has been indicated by the gamemaker 74, then the lane database block of memory is also saved as a game fragment. When a bowling game has been completed, the gamemaker 74 automatically signals the end of the game. The game control process responsive thereto saves the attached lane database block to the hard disk 270. If automatic printing is selected for the lane sending the end of game signal and if the required number of games has been completed, then the game control process 766 initiates a game print of the specific game files using the score sheet handler sub-process 518.

The lane vacate request is used when the gamemaker 74 signals that the lane has been vacated. Responsive thereto, the game control process extracts usage information from the attached lane database block and updates the lane usage Upon command from the manager's computer 32, the gamemaker 74 signals that a print of current game status has been requested. The game control task then saves the attached lane database block to the hard disk 270 as a spool file and initiates a printing function of this spool file. When the gamemaker 74 is initialized on power up, the gamemaker 74 sends the request game menu signal to the manager's computer 32. The game control process responds by initiating the sending of the games menu file to the gamemaker 74.

The trajectory data save request is used for those games which include the ball trajectory data. A request indicates that the ball trajectory data should be saved. The database lane transfer request is initiated at the manager's computer 32 using the lane transfer sub-function under the lane control process. The game control process 766 responds by downloading the game which was in process to the new gamemaker 74 and by downloading the pin fall journal thereto so that the new gamemaker 74 can continue operation of the transferred game.

The last ten games bowled for each lane are stored on the hard disk 270 as a fixed length sequential file. This file contains the lane database block received from the gamemaker. Any other data is saved in a separate variable length sequential file. The game control process 766 is responsible for creating the files and maintaining a chronological index thereof. Fragments of games and temporary games are stored as a complete game but are flagged as a fragment for purpose of printing control.

The game control process 766 consists of one module that is executed at system start up. The process continues in operation until the system is shut down. Because the game control process 766 is only required to process gamemaker data when requested by the gamemaker 74, the program is asleep until it receives a signal that something requiring its attention has occurred, processes the waiting request, and then returns to sleep.

Video Line Allocation

The bowling center system includes seven global video lines 61 and audio lines 68 extending throughout the bowling center which may be used for various purposes, such as tournament display, VCR or laser disk playback to remote monitors 22, or remote bowler support at the manager's computer 32. The various devices in the system are interconnected utilizing the video switches 40 and 73. Nevertheless, it is necessary to manage these lines in such a way that it is not possible to place more than one video source on a single line at the same time, although several video display devices may be connected simultaneously to different lines.

The video line allocation routine is used by any system process which requires use of a video line. This routine does not send the necessary COM line commands to cause video line switching. Instead, it maintains a data base of the current status of all video lines. Particularly, the data base maintains an available/in-use status. When a program or function needs to use a video line, the video line allocation routine determines if any lines for the requested purpose are available, and returns to the requesting program the lowest numbered line available for the program or function. When a request is received, the routine searches its internal data base to find a line marked as available and returns the number of the first line found. When a process is finished with a line, a request is made to release the line.

GLOBAL COM LINE COMMUNICATIONS FORMAT

1. Manager's Computer Commands

The following table, No. 3, includes a listing of the commands which are entered in the first portion of the SDLC I-field, see FIG. 23, for transferring a command from the manager's computer main CPU 200 to the GCOM CPU 230. Selected ones of these commands result in transmission of data over the global COM line 27 to a gamemaker 74.

TABLE NO. 3

| No. | Command |
|-----|---------|
| 1 | Pass on thru |
| 2 | Vacate lane |
| 3 | Prepare for new game download |
| 4 | Lane control |
| 5 | Remote bowler support |
| 6 | Set colors on overhead |
| 7 | Send database for print out |
| 8 | Lane transfer |
| 9 | Game options |
| 10 | Switch video |
| 11 | Peripheral control |
| 12 | Control to game |
| 13 | LRS roster download |
| 14 | Video segment start |
| 15 | Video segment done |
| 16 | Video segment not available |

TABLE NO. 3-continued

| No. | Command |
|-----|---------|
| 17 | Video segment queue full |
| 18 | Remote terminal control |
| 19 | Trajectory parameters |
| 20 | Game download |
| 21 | Download remote area |
| 22 | Game database download block |
| 23 | Message to display on overhead |
| 24 | Message clear |

The "pass on thru" command, No. 1, is used when it is necessary to issue a command from the manager's computer 32 as though it was instead issued directly from a Gamemaker 74. Specifically, the command includes a pass thru station address which comprises the address on the particular gamemaker's local COM line 75. The remainder of this command comprises a gamemaker to slave station command as specified above in the section relating to gamemaker communications. For example, if it is necessary to immediately stop the operation of the pinsetter, the pass thru command can be used to halt operation of the pinsetter 14. This command also signals the gamesetter 76 to ignore any pinsetter game commands. Subsequently, this command is used to release the pinsetter from the emergency stop condition and allows the gamesetter 76 to resume accepting pinsetter game commands. The "vacate lane" command, No. 2, is used when it is desired for the manager to shut down the operation of a game.

The "prepare for new game download" command, No. 3, advises the gamemaker 74 that the active game is to be overwritten as by downloading a new game, as discussed in greater detail below.

The "lane control" command, No. 4, provides for starting, stopping and continuing the game operation. Particularly, this command includes options for starting and clearing the lane database, starting and resetting the operation of the game, stopping the operation of the game, continuing the operation of the game with the previous lane database and stopping the gamesetter.

The "remote bowler support" command, No. 5, causes the manager's remote bowler input station 42 to override a selected gamemaker bowler input station 18, as discussed in greater detail below. This command may instruct the selected gamemaker to start or stop remote bowler support, or may include a key code representing a key depressed at the bowler input station 42.

Command No. 6, the "set colors on overhead" sets the default for the colors which are to be displayed on the overhead monitors 20.

Command No. 7, the "send database for printout" command is used when it is necessary to provide a scoresheet print out while a game is still in progress.

The "lane transfer" command, No. 8, is used to transfer a game from one gamemaker 74 to a new gamemaker 74, as discussed above relative to the game control process 766.

The "game options" command, No. 9, is used to enable or disable options which may be used under control of the game program. Such options include the use of exciter graphics under control of the game program.

The "switch video" command, No. 10, is used to control operation of either the manager's computer video switch 40 or any of the selected gamemaker video switches 73. This command includes data formatted according to the particular switching arrangement desired.

The "peripheral control" command, No. 11, is used to turn the overhead monitors 20L and 20R on or off.

The "center control to game" command, No. 12, is used to turn various game peripheral devices, such as the foul detector unit 92, on or off, as discussed above. This command is also issued responsive to an operator request entered using the keyboard 44 under the bowling center control sub-function of the lane control process, discussed above, to instruct a gamemaker 74 to set a new set up of pins during game play. For example, if the setting table 108 inadvertently hocks over a pin during a pick up and sweep operation so that the pin fall data stored in the gamemaker memory does not accurately reflect the actual standing pins, then the center control to game command can instruct the gamemaker 74 to generate a sweep and set command to the gamesetter 76. The "sweep and set" command, command No. 3, from the gamemaker 74 to the gamesetter 76, contains pinsetting data entered at the manager's computer keyboard 44 to spot the last standing pin pattern on the deck.

The "league record service roster download" command, No. 13, is used to download the roster of team members for league bowling.

Command Nos. 14–17 are used in conjunction with the video subsystem, described below. Specifically, command numbers 14 and 15 indicate when a video segment is starting and is finished. Command No. 16 indicates when a requested video segment is unavailable, as when the video disk has been removed or the video source device 52 is unavailable. The "video segment queue full" command, No. 17, results when a particular video segment has been requested by more gamemakers 74 then is permitted under the queue.

The "remote terminal control" command, No. 18, is used to enable or disable various portions of the remote area terminal operation, such as the ball trajectory statistical support function.

Command No. 19, the "trajectory parameters" command, sends the gamemaker 74 those ball trajectory parameters to be displayed in raw form on the overhead monitor score sheet display screen.

Command No. 20, the "game download" command is utilized when a game program is downloaded. Specifically, this command instructs the COM talker sub-process 754 to retrieve the files for the new game and transfer them to the gamemaker 74. The transfer of a game program involves a multiple block transfer over the global COM line 27. The multiple block transfer is passed to the appropriate gamemaker 74. The gamemaker 74 receives the transfer as a complete continuous block.

The "download remote area" command, No. 21, is utilized to transfer the remote area terminal software which includes menu control and ball trajectory system control as well as a listing of available games for display by the gamemaker 74. Particularly, this software is transmitted responsive to the games menu request at power up.

The "game database download block" command, No. 22 is used to replace the specified lanes database block in a CMOS memory portion 758, see FIG. 24, from the manager's computer 32.

The "message to display" command, No. 23, is used to transmit a message, as discussed above, under the lane control process to a gamemaker 74 for display on an overhead monitor.

Command No. 24, is used to clear the message from the particular display.

2. Manager's Computer Data Types

The following table, number 4, lists the data type numbers, see FIG. 23, and their descriptions which are transmitted from a gamemaker's main CPU 200 to the GCOM CPU 230 for transmission to the manager's computer 32 to be read by the manager's computer main CPU 200 from the read FIFO circuit 240.

TABLE NO. 4

| No. | Data Type |
|---|---|
| 1 | Video segment request |
| 2 | Changing database upload block |
| 3 | Request for game selection menu |
| 4 | Request for game download |
| 5 | New game bowler database upload |
| 6 | End of game bowler database upload |
| 7 | Vacate bowler database upload |
| 8 | Print bowler database upload |

Data type No. 1, "video segment request", is generated responsive to a request from the remote area terminal 21 for the display of a video segment. The request includes a code associated with the requested segment which refers to the video segment definition file on the hard disk 270. This request is passed to the video subsystem, discussed below, which results in the display of the requested video segment at the remote area terminal 21.

During the playing of a game, pin fall and scoring and other information is periodically uploaded from the gamemaker 74 to the manager's computer 32.

Data type No. 2, "changing database upload block", is used to periodically transmit score and other data from the gamemaker 74 to the manager's computer 32 to replace the specified back up lane database block.

Data type No. 3, "request for game selection menu" is generated at power up and results in the manager's computer 32 transmitting the remote area terminal software to the gamemaker 74 as by issuing command No. 21.

Data type No. 4, "request for game download", is transmitted after a bowler has selected a new game number from the game selection menu.

If a different type of game is requested by a gamemaker 74, data type number 5 results in a lane database block being uploaded to the manager's computer 32 with an indication that this was caused by a new game request. If a game is completed by all bowlers, data type number 6 results in a full lane database block upload made to the manager's computer with an indication that this was caused by the end of a game. When the manager's computer 32 requests that the game be vacated, data type No. 7 results in a full lane database block upload game at the manager's computer 32 with an indication that this was caused by a lane vacate request. If a bowler wishes to have the game score printed on the printer 46, as when the game has ended, then data type No. 8 is a request to the manager's computer 32 to-print the score sheet based on the lane database which has been uploaded for the current game.

REMOTE AREA TERMINAL OPERATION

The remote area terminal 21 operates under the control of a remote area terminal program downloaded to the gamemaker 74 from the manager's computer 32, as discussed above. After the program is downloaded and initialized a remote terminal task is created for operating under the control of GMOS. During system initialization, the video switcher 73 is initialized, and the remote terminal manager task clears the remote area display 22, initializes the remote area keyboard 24, and the ball trajectory table manager task 400, see FIG. 21, is initialized.

The remote terminal manager task 404 is operable to respond to requests from the remote terminal keyboard 24 and pass control to suitable tasks according to a request made therefrom. Such tasks may involve the displaying of another menu to the remote area monitor 22, requesting a dynamic video segment from a video source device 52, or displaying a static ball trajectory display.

After initialization, and any time after the "ACTIVITIES" key on the keyboard 24 is depressed, the remote area monitor 22 displays the following activities menu:

1. New Games
2. How to Get Started
3. New Bowling System Overview
4. Access Ball Trajectory Display
5. How to Use the Ball Trajectory Unit
6. More Topics A user may request one of the listed activities by depressing the associated number key on the keyboard 24. Selection of activity numbers 1–3 or 6 provides access to a video subsystem, discussed in greater detail below, to cause a dynamic video display program to be shown at the remote terminal 21. Particularly, the "New Games" activity, No. 1, provides a video display which instructs the user how to play the various bowling games available in the bowling center system. The "How to Get Started" activity, No. 2, provides a user selection of training displays which are utilized for instructional purposes to provide techniques for improving bowling scores. Selection of the "New Bowling System Overview" activity, No. 3, provides a video display segment illustrating the overall features of the bowling center system according to the invention.

Selection of the "access ball trajectory display" activity, No. 4, provides access to the ball trajectory display management subsystem 402. Upon having selected the ball trajectory display activity, a ball trajectory display menu is generated comprising a list of bowlers at the lane pair and a number associated with each bowler. The user is requested to enter the number associated with one of the bowlers, and the frame and ball for which a trajectory display should be generated. The frame and ball qualifiers are game dependent variables which are retrieved by the trajectory table management system 400 from the game. The selected trajectory is displayed when the user depresses the "ENTER" key, unless the trajectory is not contained in the bowler's trajectory table, or is marked invalid, in which case a message to that effect is displayed. The ball trajectory display management menu is selected from the activities menu and remains displayed until a preselected period of time has elapsed in which there is no action taken at the remote area keyboard 24. The display then reverts back to the activities menu. Similarly, if a ball trajectory has been displayed for a preselected period of time, and no interaction is observed at the keyboard 24, the display reverts to the updated ball trajectory display menu.

Figure 29:
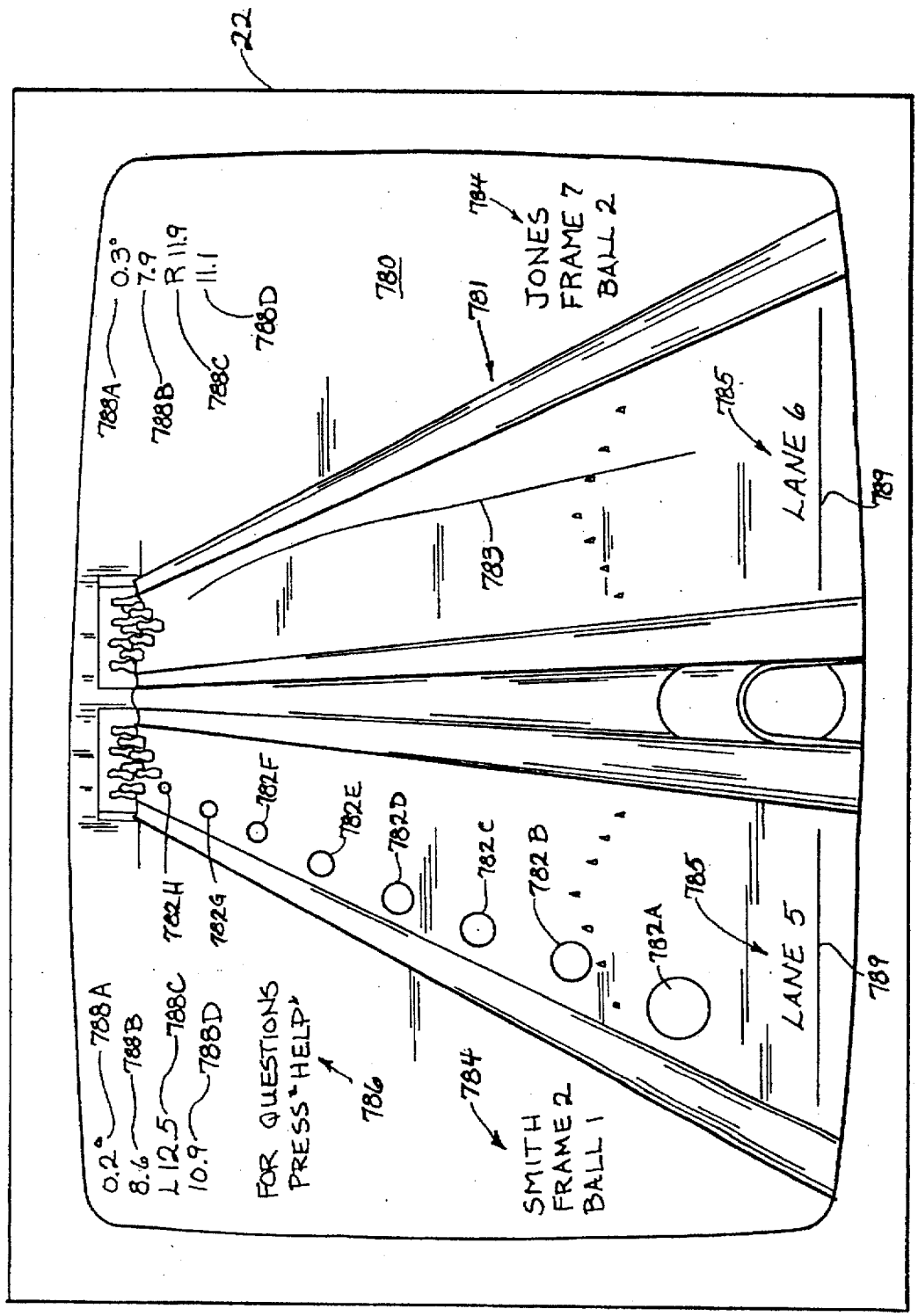
FIG. 29 illustrates a graphic display format for a ball trajectory display.

A ball trajectory graphic display 780 as shown on the remote area monitor 22 is illustrated in FIG. 29. The display 780 is composed of the following elements:

1. A digitized color image 781 depicting a lane pair;
2. The eight ball locations are indicated optionally by icons 782 a–h, see left lane, or a curve 783, see right lane, showing ball position as it traverses the length of a lane;
3. The bowler's name, frame and ball number displayed at the bottom 784 of the screen;
4. Actual lane numbers 785 superimposed graphically on the image;
5. A prompt 786 which enables the user to access a "help" menu; and
6. Up to four ball trajectory parameters 788a–d which may be displayed in numerical form on the trajectory display. These parameters are specified by the default configuration flags downloaded with the current game, or optionally, on an individual basis by bowler's using a special features/options menu, discussed below, at the remote area terminal 21. The four parameters are selected from the domain of values comprising a ball trajectory record. In the illustrated display the parameters are for the entry angle 788a, the background velocity in miles per hour 788b, the position of the ball 788c, in terms of lane boards from the left or right hand side of the bowling lane at a preselected distance, such as 45 feet from the foul line 789; and the foreground velocity, 788d.

The trajectory indication is plotted on the left or right lane image corresponding to the lane upon which the ball is actually thrown. Although the illustrated display includes information for both the left and right lanes, only information for one of the two lanes is displayed at any time. The group of four selected trajectory parameters is displayed on the side of the lane image that the ball was delivered on.

If from the activities menu, the user selects activity number 5, "How to use the ball trajectory unit", then the following menu is displayed:

How to Use the Ball Trajectory Unit

1. Demonstration
2. Fundamentals
3. Tips
4. Special Features/Options Menu options 1–3 cause informational video sequences to be displayed from one of the video source devices 52 using the video subsystem. Selection of option No. 4 results in the display of the following menu:

Special Features/Options

1. Statistical analysis at remote terminal
2. Overhead trajectory display
3. Hardcopy report generation
4. Change parameters at remote terminal
5. Change parameters for overhead display
6. Statistical analysis at MCD The bowling center system includes facilities to perform analysis of a statistical nature. These facilities are available for execution at the gamemaker 74, the manager's computer 32 or the league record service 34. The gamemaker based analysis is enabled optionally from the manager's control system 26, and is treated as game dependent. Each bowler may select a single analysis to be run before a game is started using option number 1 from the special features/options menu. Statistical analysis results may be viewed at the remote terminal 21. They are available for review on a request until a subsequent game requests analysis, or until the lane or lane pair is vacated. The results are printed optionally on the score sheet printers driven from the manager's computer 32. However, such printing could be accomplished automatically at the end of the game, as is obvious. If statistical analysis option is not available at the gamemaker 74, a message indicative of this fact is displayed.

Selection of the option No. 2, for overhead trajectory display, results in a video informational sequence being generated related to bowling games which utilize ball trajectory data for display or scoring. The "hard copy report generation" option, No. 3, results in a video display segment illustrating a facility to generate ball trajectory reports printed on the score sheet printers 46 driven by the manager's computer 32. These illustrated reports may contain raw data listings of trajectory information or results of statistical analysis. Selection of option No. 4, "Changing parameters at the remote terminal", enables the user to select the numerical trajectory parameters 788 a–d to be displayed in conjunction with the ball trajectory display. The initial menu includes a numbered list of bowler names, as with the ball trajectory display select menu, from which the user selects the appropriate bowler's name. A trajectory display option menu includes ten preselected groupings of four different ball trajectory parameters, from which a user may select. For example, one of the ten options may include a combination of four of the x-y grid location, or any combination of four grid locations and/or velocity indications and/or the entry angle. Additionally, the user may select whether the trajectory is to be marked with ball Icons 782a–h or a curve 783 connecting the eight measured ball locations. Once a selection has been made, depressing the return key exits the user from this function, and returns to the special feature/options menu.

Selection of option 5 from the special features/options menu, the score sheet display option, provides a video demonstration relative to how score sheet display options may be selected at the manager's control desk. Particularly, a function is provided which allows for the selection of specific trajectory parameters for display by any game score sheet routine. A score sheet trajectory parameter display/select menu on the manager's monitor prompts the manager to select three of the twelve ball trajectory parameters to be displayed as part of the game score sheet. An additional selection relates to the use of game default parameters. When used, the "use game default" option causes the facility manager to override manual selection of the display parameters, and automatically utilize the default group which is specified within to each game. If this option is enabled, then the selected parameters on the monitor are ignored, though they are still indicated as selected. This allows the manager to quickly and efficiently switch the score sheet parameter display between game dependent default and manual selection.

Option No. 6 results in the display of a video segment illustrating the features of the statistical analysis package which are accessible by a bowler.

Video subsystem

Figure 30:
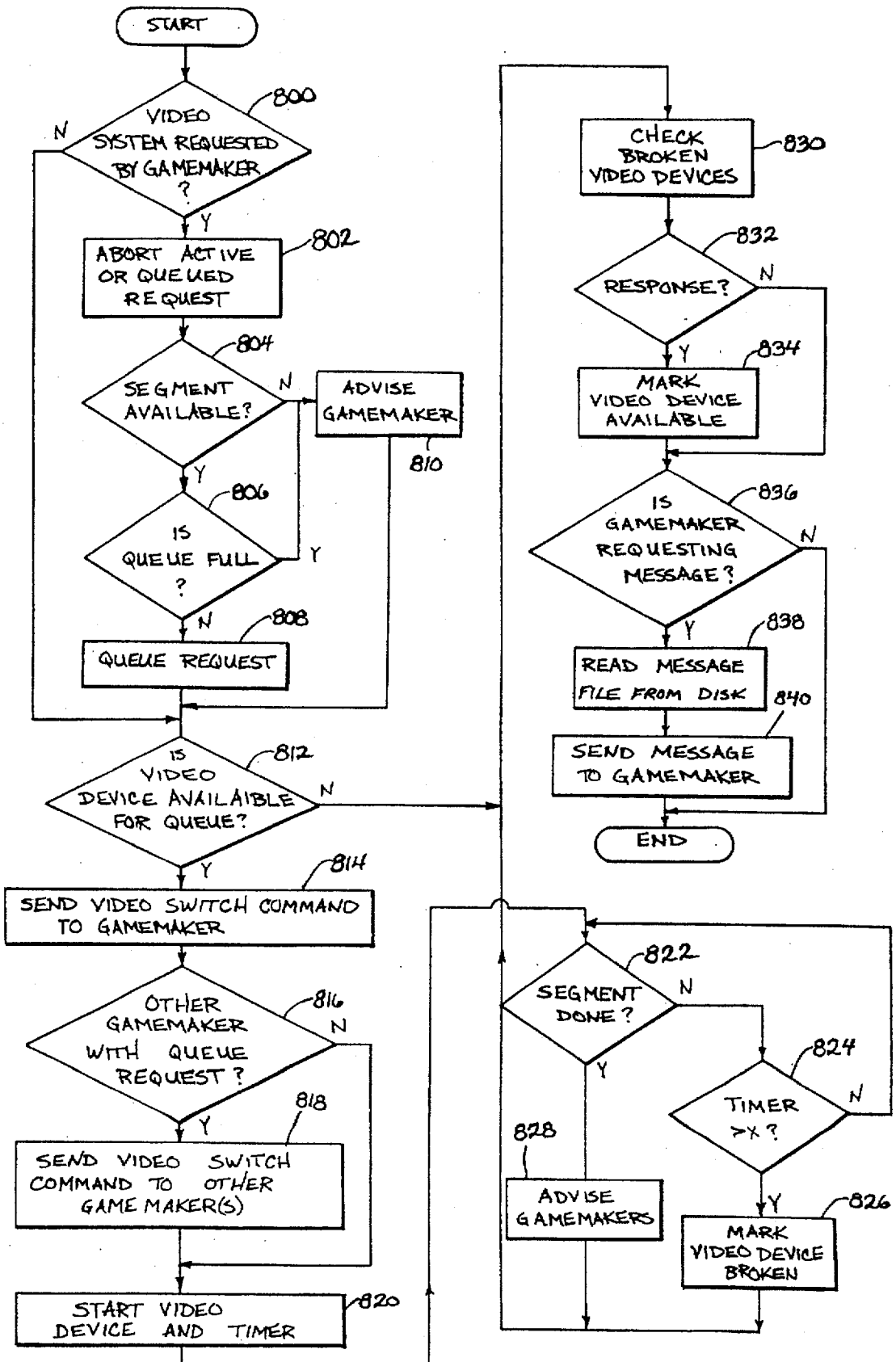
FIG. 30 is a flow diagram illustrating the operation of a video subsystem according to the invention.

If a video display program or segment, which is resident on a video disk or tape loaded in one of the video source devices 52, is requested, then the video subsystem, which is part of the manager's computer software, is utilized to transmit the video information from the particular video source device 52 to the remote monitor 22. This subsystem can also be used to transmit the video information to an overhead monitor 20. A flow diagram for the operation of the video subsystem is illustrated in FIG. 30.

The video subsystem starts at a decision block 800 which determines whether or not a video system request has been made by a gamemaker 74. Particularly, such a request is contained in a data type No. 1 request, discussed above, which includes information passed up from a gamemaker local COM device to the manager's computer 32. For example, requesting the "new games" activity from the activities menu above, at the remote terminal would generate such a request. If the video subsystem is requested, then the video subsystem aborts any active or queued requests from the particular gamemaker 74 at a block 802. Thereafter, a decision block 804 determines whether the selected segment or program is available at any of the video devices 52. If the segment is available, then a decision block 806 determines whether or not the queue for the particular segment is full. If not, then a queue request is made at a block 808. If a selected segment is not available, as determined at the decision block 804, or the queue is full, as determined at the decision block 806, then the particular gamemaker 74 is advised of either such occurrence at a block 810 as by the issuance of respective command Nos. 16 and 17.

If the video subsystem is not requested by the gamemaker as determined at the block 800, or after the gamemaker has been advised at the block 810, or after the queue request is made at the block 808, then a decision block 812 determines for any current queue request whether or not the video device is available. If the video device is available, then at a block 814, the manager's computer sends a video switch command, command No. 10, to the gamemaker 74. Particularly, the video switch command advises the game task operating in the gamemaker 74 as to which global video line 61 the selected segment is to be transmitted on. The gamemaker 74 responds to this command by operating its associated video switch 73 to couple the selected video and audio lines 61-68 to the remote terminal 21, as discussed above. Thereafter, at a decision block 816, the manager's computer determines whether or not any other gamemaker 74 has queued the particular segment. If so, then the manager's computer 32 sends the video switch command to the other such gamemakers 74 so that they can also operate their video switches 73 to connect the particular global video line 61 and audio line 68 to the remote terminal 21. Thereafter, at a block 820 the manager's computer commands the particular video device 52, over the local COM line 29, to start playing the video segment, and advises the gamemakers 74 that the segment has started using command No. 14. Also, a timer is started.

At a decision block 822, the video subsystem determines whether or not the segment has finished playing. If not, then a decision block determines whether or not the timer has exceeded a preselected time value X which is related to an expected duration of the particular video segment. If not, then control returns to the decision block 822. If the time: has exceeded the value X, then the video device is marked as "broken" at a block 826. If the segment is done, as determined at the decision block 822, then the gamemaker 74 is advised of this fact using command No. 15 at a block 828.

After the gamemaker has been advised that the segment is done at the block 828, or the device is marked as "broken" at the block 826, or the queued video device is not available as determined at the decision block 812, then a block 830 checks the status of any "broken" video devices. A decision block 832 determines whether any response is received from a "broken" video device. If a response is received, then at a block 834 the video device is marked as being available.

Subsequently, a decision block 836 determines whether or not a gamemaker 74 is requesting a message. If not, the subsystem ends. If the gamemaker is requesting a message, then the message file is read from the disk 270 at a block 838 and the particular message is sent to the gamemaker 74, using command No. 23, at a block 840. Subsequently, the subsystem ends.

Ball Trajectory Management System

Figure 31:
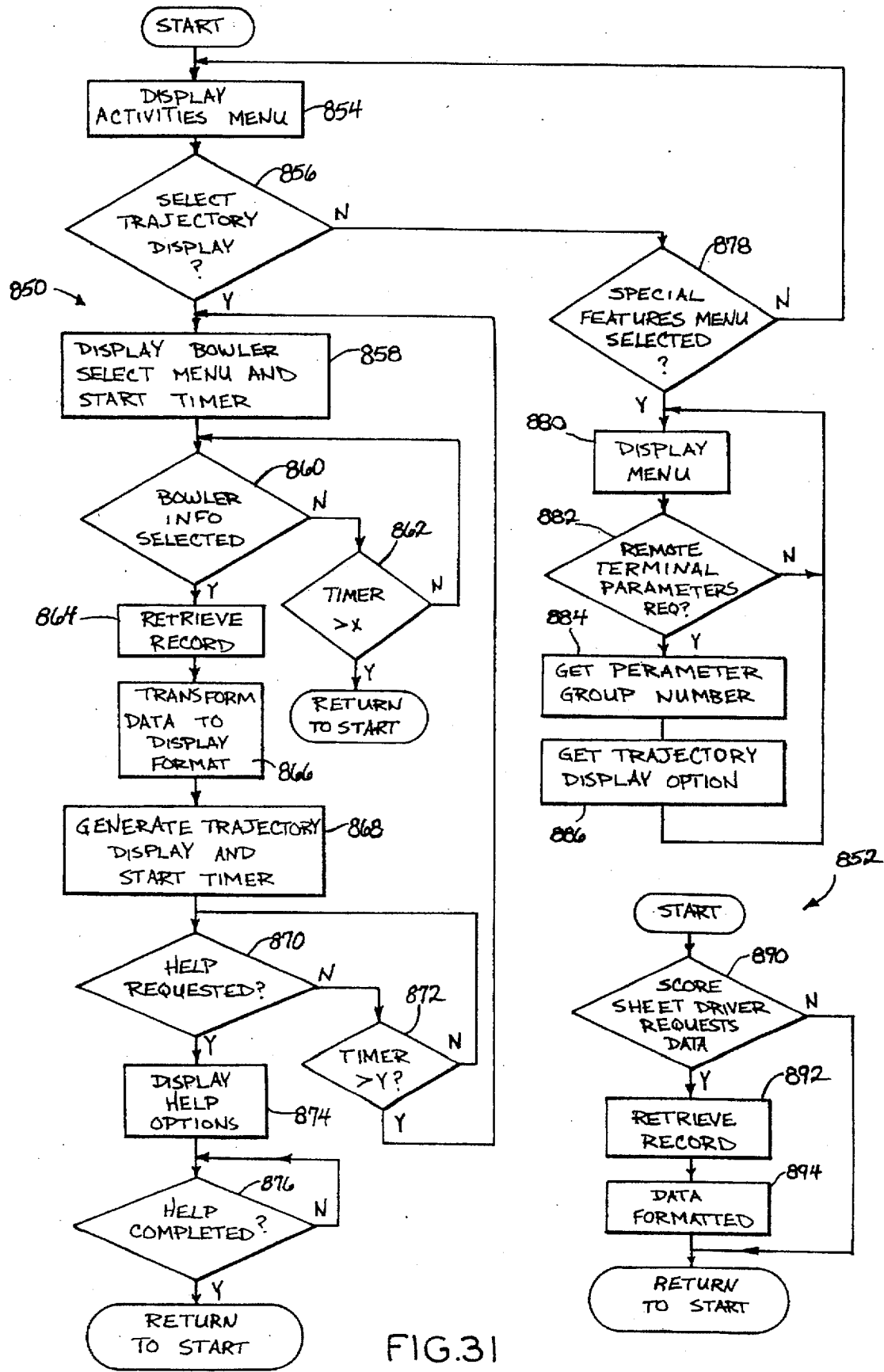
FIG. 31 is a flow diagram illustrating the operation of a ball trajectory management subsystem according to the invention.

With reference to FIG. 31, a flow diagram illustrates the operation of the ball trajectory management subsystem. Particularly, the ball trajectory management subsystem includes an operation 850 for displaying trajectory information on a remote monitor 22 using the ball trajectory display manager task 402, see FIG. 21, and an operation 852 performed under a game task for retrieving trajectory data for display on an overhead monitor score sheet display.

The remote monitor trajectory display operation 850 begins at a block 854 which generates the activities menu, discussed above, for display on the remote monitor 22. A decision block 856 determines whether from the activities menu a user has selected activity No. 4, the access ball trajectory display. If so, then at a block 858 the bowler select menu is displayed and a timer is started. A decision block 860 then determines whether or not the bowler selection information has been entered. Particularly, a user must enter the bowler number, frame number and ball number for a particular trajectory display. If the selected information has not been entered, then a decision block 862 determines whether or not the timer has exceeded the preselected value X. If not, control returns to the decision block 860. If the timer has exceeded the preselected value X, then the system times out and the ball trajectory management subsystem returns to start to display the activities menu.

If the bowler information has been entered as determined at the decision block 860, then the ball trajectory record associated with selected information is retrieved at a block 864. This record includes the eight x-y grid locations, the x location at 45 feet, the foreground and background ball velocities, and the entry angle. The trajectory data is transformed to a display format at a block 866 and the ball trajectory display is generated, as discussed above, at a block 868 and is thereafter displayed on the remote monitor 22, see FIG. 29. Also, a timer is started at the block 868.

The ball trajectory display remains displayed on the remote monitor 22 for a preselected period of time. Also, the user may request a help function which instructs the user how to proceed. A decision block 870 determines whether or not the help function has been requested. If not, then a decision block 872 determines whether or not a preselected time period Y has been exceeded. If not, then control returns to the decision block 870. If the preselected time period has been exceeded, then control returns to the block 858 to display the bowler select menu and enables the user to select a subsequent trajectory display. If help is requested at the decision block 870, then the various help options are displayed at a block 874. Thereafter, the subsystem awaits at a decision block 876 until the help function is completed, and the system subsequently returns to start.

If at the decision block 856, the trajectory display has not been been selected, then a decision block 878 determines whether or not the special features menu has been selected. If not, then the display activities menu remains displayed at the block 854. If the special features menu has been selected, then the special features/options menu is displayed at a block 880. A decision block 882 then determines if the remote terminal parameters option has been requested. As discussed above, the remote terminal parameters option enables the user to select one trajectory display option from a list of ten predefined groups of four trajectory parameters and one of two display options. At a block 884, the subsystem gets the particular parameter group number as entered on the remote keyboard 24 and at a block 886 gets the trajectory display option. Thereafter, control returns to the block 880. This information is subsequently use when a trajectory display is generated. In order to exit the special features section, the user depresses the ACTIVITIES key on the remote keyboard 74 in order to return to the activities menu.

As discussed above, during game play the gamemaker score sheet video system may be operable to display three ball trajectory parameters on the overhead display 20 under control of the game program task. The particular parameters may be selected under the control of the game program or be manually overridden by the manager's computer 32. The retrieving trajectory display option 852 is used to implement the transfer of data from the ball trajectory management subsystem to the score sheet video system. The operation begins at a decision block 890 which determines whether or not the score sheet system has requested trajectory data. This request is made as pan of the "game in progress" task 411, see FIG. 21, after a ball has been thrown. If no request has been made, then the subsystem returns If data is requested, then at a block 892 the requested record is retrieved, and the data is formatted for display at a block 894. This formatted data is transferred to the score sheet video system. Thereafter, the operation returns to start.

GAME FILE DOWNLOADING

Game program files are downloaded from the manager's computer 32 to the gamemaker 74 in multiple blocks. Each block is contained in the I-field of an SDLC information frame, see FIG. 22. The downloading of a new game can be initiated from the bowler input station 18, the manager's keyboard 44 or bowler input station 42, or via the cash register 50.

Figure 32:
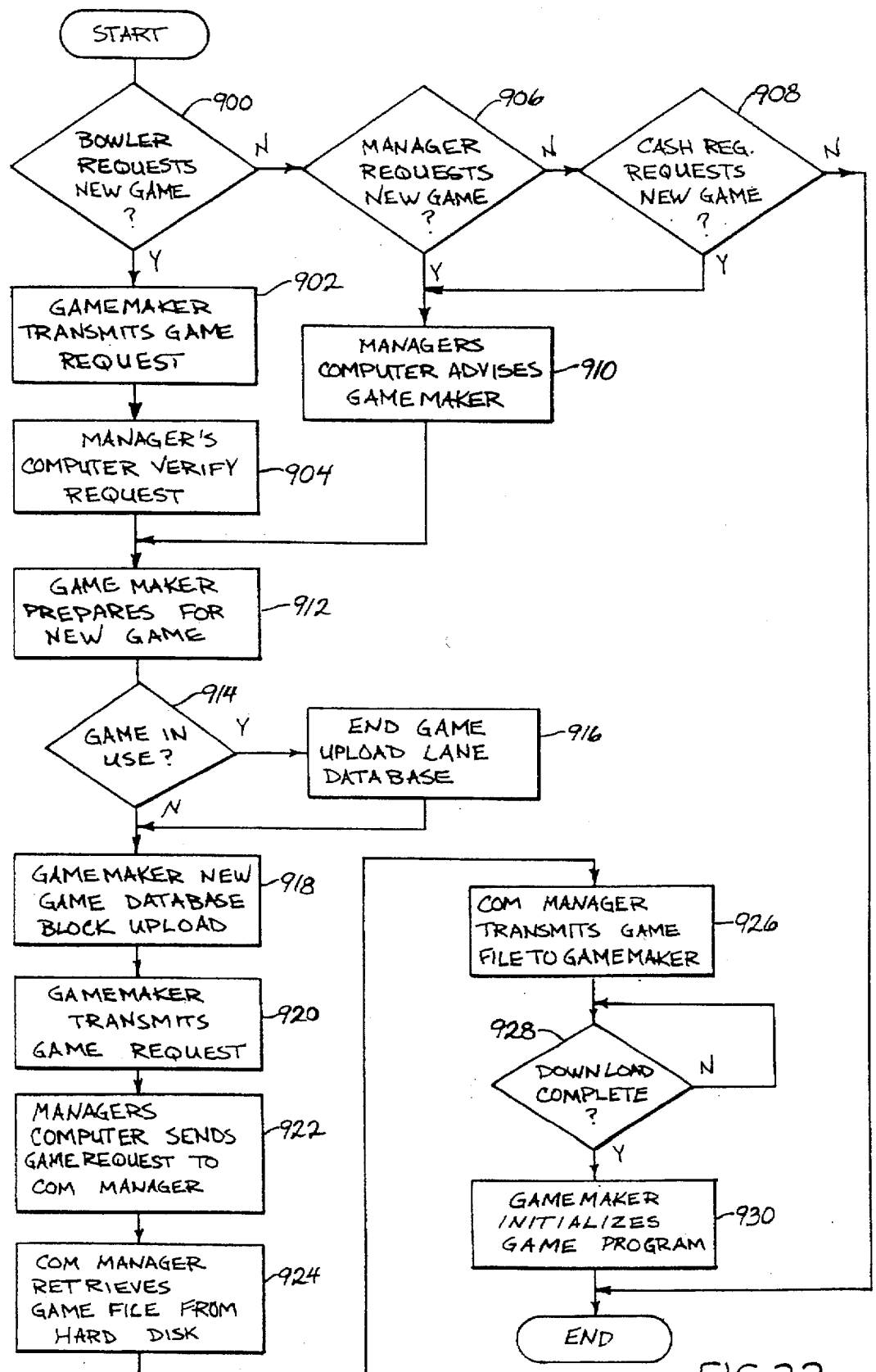
FIG. 32 is a flow diagram illustrating the operation of a game file downloading procedure according to the present invention.

With reference to FIG. 32, a flow diagram illustrates the operation of the bowling center system for downloading a game file from the hard disk 270 to a gamemaker 74. Control begins at a decision block 900 which determines whether or not a bowler has requested a new game. The bowler requests a new game by depressing the games menu key on the local bowler input station keyboard 328, and subsequently selecting a game from the game's menu. If the bowler requests a new game, then the gamemaker 74 sends a download request to the manager's computer 32 included in a data type number 4. At a block 904 the manager's computer 32 verifies the download request as by sending the command No. 3 instructing the gamemaker 74 to prepare for a new game download.

If the bowler has not requested a new game, as determined at the decision block 900, then a decision block 906 determines whether or not an operator at the manager's computer 32 has requested a new game for a particular gamemaker 74. The operator may request a new game as by implementing a lane set up operation under the bowler center status function as part of the manager's computer lane control process, discussed above or using the remote bowler input station 42 under the remote bowler support operation, discussed below. If the manager has not requested a new game, then a decision block 908 determines whether or not a new game has been requested from the DTS cash register 50 responsive to payment from the bowler. If not, then the game downloading operation ends. If a new game has been requested as determined at either decision block 906 or 908, then the manager's computer by issuing command No. 3, at a block 910, advises a selected gamemaker 74 to prepare for a new game download.

Once the manager's computer has issued the prepare for a new game download command at either block 904 or 910, then the gamemaker prepares itself for the new game. This preparation includes performing any functions necessary according to the particular game control program to halt operation of the game and close out any files relative thereto. Thereafter, at a decision block 914 the gamemaker determines whether or not the current game program is currently in use, indicating that a game is still being played. If so, then the game operation is terminated at a block 916 and the lane database block is uploaded to the manager's computer 32 using data type No. 6. In either case, control then advances to a block 918 where the gamemaker 74 transmits the new database upload block, data type No. 5, to the manager's computer 32. Responsive thereto, the manager's computer 32 under the control of the game control process initiates a new lane database block for the subsequent game. At a block 920, the gamemaker transmits another request for game download, data type No. 4, to the manager's computer 32. This signal is transmitted in order to advise the manager's computer 32 that all necessary activity has been completed to close out the current game file. At a block 922, the manager's computer 32 sends a game download command, command No. 20, to the communication manager process. This request includes the name of the selected game and the address of the gamemaker 74 to which the file is to be transmitted. At a block 924, the communications manager process retrieves the file associated with the selected game from the hard disk 270, and then performs the actual transmission of the game file using the global COM talker sub-process 754, see FIG. 28, to the selected gamemaker 74 at a block 926. At a decision block 928, the gamemaker waits until the download of the game file is complete. Once the download is complete, then at a block 930, the gamemaker 74 is operable to initialize the game program. Subsequently, the bowler's may initiate operation of the game as by entering their respective names and pressing the start bowling key, as discussed above. Thereafter, the game file downloading operation ends.

REMOTE BOWLER SUPPORT

Under the manager's computer lane control process, discussed above, the operator has the ability to switch the bowler interface capability from the bowler input station 18 located at the staging area 19 to the remote bowler input station 42 located at the manager's control desk. Under the remote bowler support function the manager or operator can perform any functions which would normally be done by a bowler. A common usage for this operation relates to performing score correction. This is particularly true in bowling centers where it is desired to provide score correction which can be implemented only at the manager's control desk and not at the lane pair itself.

The bowler score correction feature is a function of the actual game being implemented by a particular gamemaker 74. The gamemaker 74 may be configured to permit score correction using the bowler input station 18 at the bowler staging area. Normally, however, the score correction is done remotely using the manager's bowler input station 42. In the score correction operation, the remote bowler input station 42 becomes a remote terminal to the gamemaker 74, in that it does not directly effect any manager's computer lane control operations. The manager's computer lane database is ultimately affected by the corrections, but the changes come from the gamemaker 74 itself.

The action of remote bowler support, including score correction, involves altering data, not only in the game database, but on the game display screen as well. Remote bowler support is invoked from a menu selection and/or function key press using the manager's computer lane control process. Since so much data must be transferred to reproduce a single gamemaker screen, it is more efficient to literally switch the manager's monitor 72 directly to the video output from the gamemaker 74. This is accomplished using one of the three score video transmission lines 70 which interconnect the video switches 40 and 73. The gamemaker 74 must be instructed which video line to drive, and the manager's computer video switch 40 must be switched from the manager's computer video outputs on the lines 58 to the score transmission line 70 selected for the gamemaker 74. The gamemaker 74 is instructed to temporarily ignore its associated bowler input station 18 and accept commands over the global COM line 27 as though the data was coming directly from the bowler input station 18. The manager's computer 32 then routes key strokes from the manager's bowler input station 42 over the global COM line 27 to the gamemaker 74, and remote bowler support is accomplished. When this operation is completed, all video and bowler input station operations are restored to their normal states.

The actions discussed herein to be performed at the gamemaker 74 are discussed above relative to the game software. Particularly, reference therefor is made to the description relative to FIGS. 25 A–H.

After providing the initial commands to start the remote bowler support operation, the manager's computer does nothing more than act as a link between the manager's bowler input station and the gamemaker 74. Since the manager's bowler input station 42 includes lights for illuminating keys to guide the user through operations, it is necessary during this operation for the gamemaker 74 to send switch light control commands up to the manager's computer 32.

Figure 33:
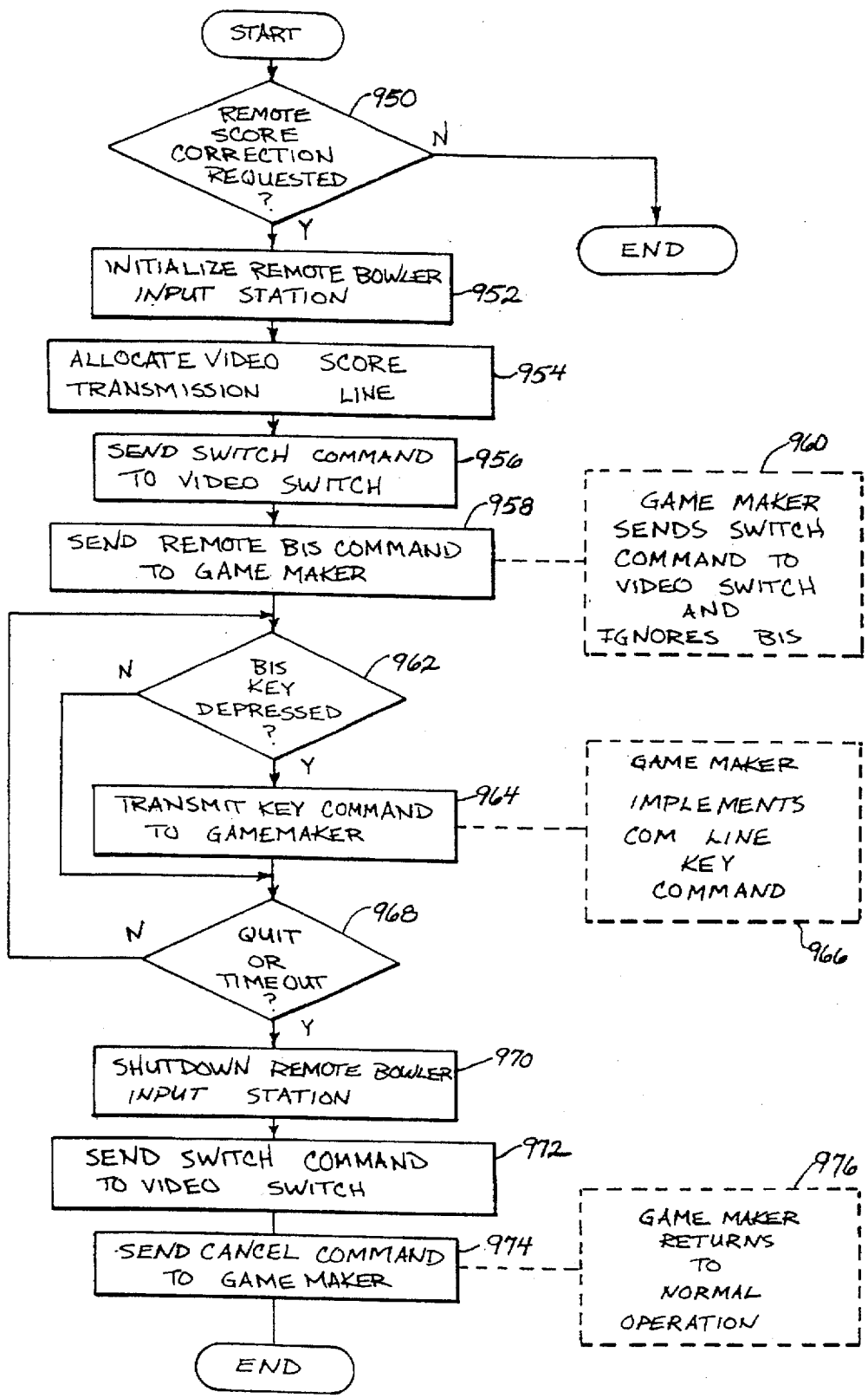
FIG. 33 is a flow diagram illustrating the operation of a remote score correction operation according to the present invention.

With reference to FIG. 33, a flow diagram illustrates the operation of the remote bowler support operation. The remote bowler support operation begins at a decision block 950 which determines whether or not this operation has been requested. Remote bowler support is requested under the lane control process, particularly the bowling support operation function. The manager or operator under the lane control process depresses the bowler support function key and indicates the lane to which the bowler support is to be done. If the remote bowler support is not requested, then the operation ends. If remote bowler support is requested, than at a block 952, the manager's computer 32 initiates a remote bowler input station 42. The bowler input station 42 is initiated by enabling the function key lights and sending suitable configuration commands to the bowler input station 42 over the manager's local COM line 29.

Using the video allocation routine, the manager's computer allocates a video score transmission line 70 at a block 954. Subsequently, at block 956, the manager's computer 32 sends a command over the local COM line 29 to the video switch 40 instructing the video switch to connect the selected video score transmission line 70 with one of the three monitors 72. Particularly, this command causes the video switch 40, see FIG. 16, to operate the video input switch block 370 to connect the input coupled to the allocated video score transmission line 70 to the output channel associated with the selected monitor. Also, the monitor switch 372 associated with the monitor is switched so that RGB video data is transmitted thereto from the video monitor switch composite to RGB converter 385, see FIG. 18, instead of from the manager's computer 32.

At a block 958 the manager's computer transmits a remote bowler support command, command No. 5, to the gamemaker 74 at which remote bowler support is to be implemented. This command includes a start remote bowler support command and a command for operating the gamemaker's video switch 73. At a block 960, the gamemaker responds to this command by sending a suitable command to its video switch 73 commanding the video switch 73, see FIG. 16, to switch the video output switch block 374 to connect the selected video driver and selected video score transmission line, as discussed above. Also, the gamemaker 74 is operable to ignore any key commands from its bowler input station 18. The result of this command is that the bowler input station 18 is inoperative and the video score sheet display on the overhead monitor 20 is also transmitted for display on the selected manager's monitor 72.

In the flow diagram of FIG. 28, those blocks related to gamemaker functions are illustrated in dashed lines, as they relate to functions performed at the gamemaker as opposed to the manager's computer 32.

At a decision block 962, the remote bowler support operation determines whether or not a key at the manager's bowler input station 42 has been depressed. If a key has been depressed, then at a block 964 the key command is transmitted over the global COM line 27 to the selected gamemaker 74. The key is transmitted using the remote bowler support command, No. 5, which includes information relating to a code for the depressed key. At a block 966 the gamemaker responds to the key command received over the global COM line 27 as if the key was depressed at the local bowler input station 18.

To implement the score correction function, the operator uses the "Changes" key section 366 of the bowler input station key pad 328. The arrow directional keys are used to move a cursor on the monitor and, the "change score" key, the "move score" key, or the "skip bowler" key and the alphanumeric key pad 358 are used to effect a change on the score sheet. The actual score change is done in the gamemaker memory, and then is retransmitted to the manager's computer 32 as part of the lane database block upload function.

If no key has been depressed as determined at the decision block 962, or after the key command has been transmitted to the gamemaker 74, then a decision block 968 determines whether or not a "quit" function key has been depressed or the remote bowler support operation has timed out due to inactivity. If not, then control returns to the decision block 962 to await key commands. The system therefore remains in the remote bowler support operation until the quit key is depressed or the operation times out.

If the quit function is called for, or the operation times out, as determined at the decision block 968, then at a block 970 the manager's computer 32 transmits a command to the bowler input station 42 to stop sending data and to disable all of the key lights. Subsequently, at a block 972 the manager's computer 32 sends a command to the video switch 40 over the local COM line 29 for the particular video monitor switch 372 to switch back to the normal operation to display video from the manager's computer 32, instead of the video score transmission line 70. Also, at a block 974 the manager's computer 32 sends a remote bowler support command, No. 5, to the gamemaker 74, instructing the gamemaker to stop the remote bowler support operation.

Responsive thereto, at a block 976 the gamemaker returns to normal operation as by commanding the video switch 73 to return to normal operation so that no further score video data is sent over the allocated video score transmission line 70, and also enabling the bowler input station 18. Thereafter, the remote bowler support operation ends and the score transmission line is indicated as available.

We claim:

1. A trajectory display system operable to display discrete positions of an object moving in a continuous path comprising:

a control unit including a processor in communication with a display device, an operator input device and a memory means for storing data, said data including a program to operate said processor;

means for generating discrete trajectory data representing a path of movement of an object;

means coupled to said generating means for transmitting said trajectory data to said control unit for storage in said memory means; and means coupled to said memory means and responsive to a user request at said operator input device for generating a display signal in accordance with said stored discrete trajectory data to convey information relating to the path of movement of the object for display on said display device.

2. A bowling ball trajectory display system comprising:

a control unit including a central processing unit in communication with a display device, an operator input device and a memory means for storing data, said data including a program to operate said central processing unit;

means for generating trajectory data representing a path of a bowling ball during a time when a bowling ball is in motion on a bowling lane;

means coupled to said generating means for transferring said trajectory data to said control unit for storage in said memory means; and means coupled to said memory means and responsive to a user request at said operator input device for transmitting a display signal to said display device, said display signal using said stored trajectory data to convey information relating to the path of the bowling ball on the bowling lane.

3. The bowling ball trajectory display system of claim 2 wherein said transmitting means transmits a display signal for illustrating discrete positions of the path of the bowling ball on the bowling lane.

4. The bowling ball trajectory display system of claim 2 wherein said transmitting means transmits a display signal for illustrating a continuous curve showing the path of the bowling ball on the bowling lane.

5. The bowling ball trajectory display system of claim 2 wherein the information conveyed by said display signal includes numerical indicia corresponding to preselected trajectory data.

6. The bowling ball trajectory display system of claim 5 wherein said numerical indicia includes the velocity of the bowling ball while in motion on the bowling lane.

7. A bowling ball trajectory display system comprising:

a control unit including a central processing unit in communication with a display device, an operator input device and a memory means for storing data said data including a program to operate said central processing unit;

means for generating trajectory data representing a path of a bowling ball during a time when a bowling ball is in motion on a bowling lane;

means coupled to said generating means for transferring said trajectory data to said control unit for storage in said memory means; and means operating under the control of said central processing unit for generating a display signal to transmit to said display device, said generating means for accessing data stored in said memory means, including said trajectory data, to convey trajectory information relative to the path of the ball on the bowling lane.

8. The bowling ball trajectory system of claim 7 wherein said trajectory information comprises numerical indicia corresponding to said stored trajectory data.

9. The bowling ball trajectory display system of claim 7 further comprising means operatively associated with said control unit for determining scoring data responsive to the playing of a bowling game, and wherein said generating means develops said display signal to convey information relative to said scoring data and said ball trajectory data.

* * * * *